(12) United States Patent
Yoshimuta et al.

(10) Patent No.: US 11,722,786 B2
(45) Date of Patent: Aug. 8, 2023

(54) IMAGING APPARATUS WITH REMOVABLE VARIABLE NEUTRAL DENSITY FILTER

(71) Applicant: Sony Group Corporation, Tokyo (JP)

(72) Inventors: Junki Yoshimuta, Tokyo (JP); Tetsuo Morimoto, Tokyo (JP); Koji Morioka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/610,273

(22) PCT Filed: Apr. 3, 2020

(86) PCT No.: PCT/JP2020/015304
§ 371 (c)(1),
(2) Date: Nov. 10, 2021

(87) PCT Pub. No.: WO2020/235232
PCT Pub. Date: Nov. 26, 2020

(65) Prior Publication Data
US 2022/0224814 A1 Jul. 14, 2022

(30) Foreign Application Priority Data

May 21, 2019 (JP) ................................. 2019-095173
Aug. 23, 2019 (JP) ................................. 2019-152689

(51) Int. Cl.
*H04N 5/335* (2011.01)
*H04N 23/75* (2023.01)
(Continued)

(52) U.S. Cl.
CPC ............. *H04N 23/75* (2023.01); *H04N 23/71* (2023.01); *H04N 23/55* (2023.01)

(58) Field of Classification Search
CPC ......................................................... G02B 5/20
See application file for complete search history.

(56) References Cited

U.S. PATENT DOCUMENTS 9,794,473 B2 * 10/2017 Irie ................... H04N 5/232127
2018/0299663 A1 * 10/2018 Sato ................... G02B 27/0018

FOREIGN PATENT DOCUMENTS

| JP | 9-331474 A | 12/1997 |
|----|------------|---------|
| JP | 2002-40515 A | 2/2002 |
| JP | 2008-304536 A | 12/2008 |

OTHER PUBLICATIONS

International Search Report dated Jun. 16, 2020 in PCT/JP2020/015304 filed on Apr. 3, 2020, 2 pages.

* cited by examiner

*Primary Examiner* — Gary C Vieaux
(74) *Attorney, Agent, or Firm* — Oblon, McClelland, Maier & Neustadt, L.L.P.

(57) ABSTRACT

A filter insertion/removal unit that is capable of removing and inserting a variable neutral density filter having a variable transmittance from and into the incident light path of object light to an imaging device unit is instructed to insert the variable neutral density filter, and a variable transmittance drive unit is instructed to lower the transmittance of the variable neutral density filter, both on the basis of detection of a transmittance lowering operation of an operating unit. Also, the variable transmittance drive unit is instructed to raise the transmittance of the variable neutral density filter, and the filter insertion/removal unit is instructed to remove the variable neutral density filter from the incident light path, both on the basis of detection of a transmittance raising operation of the operating unit.

20 Claims, 28 Drawing Sheets

(51) Int. Cl.
*H04N 23/71* (2023.01)
*H04N 23/55* (2023.01)

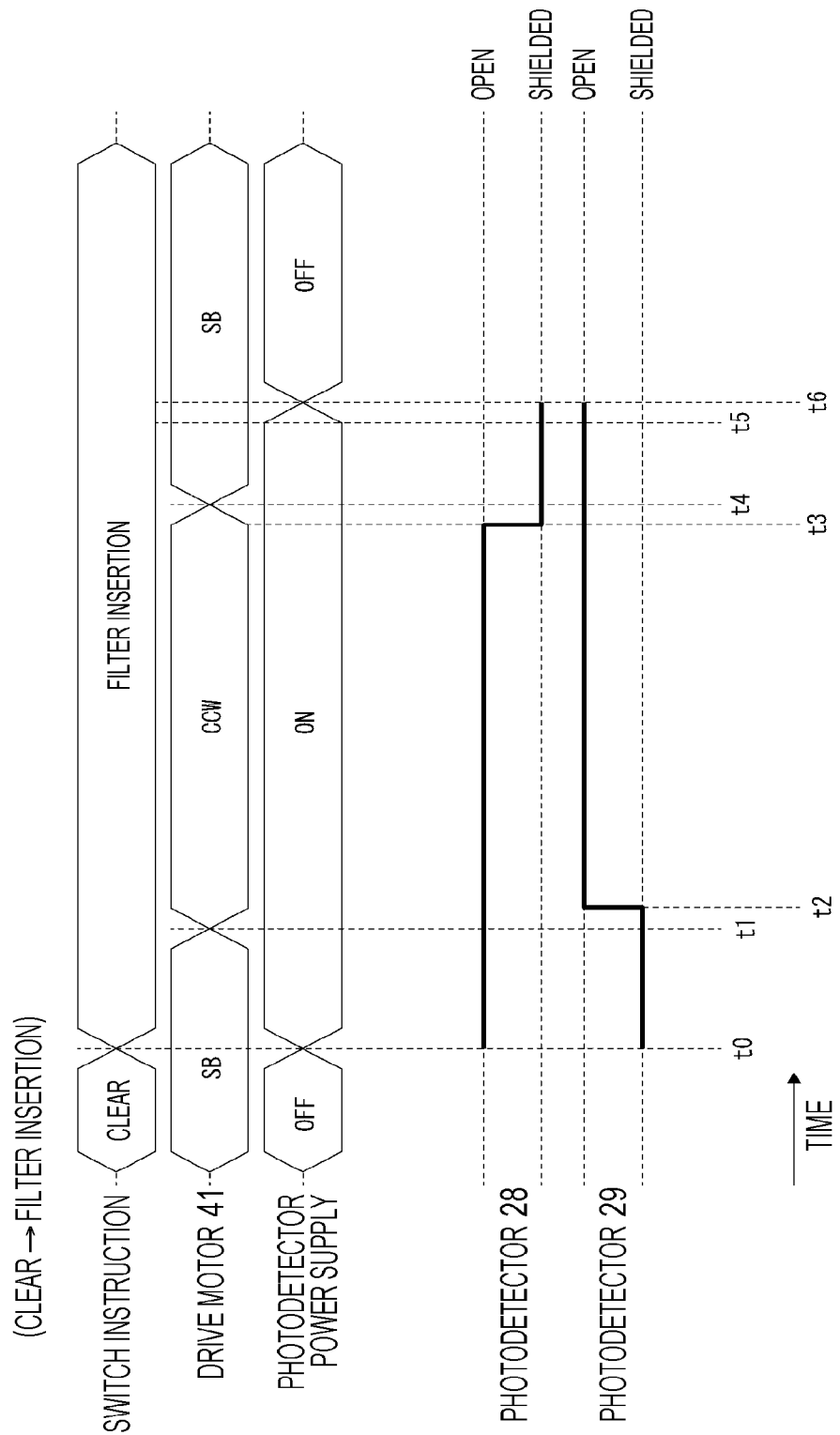

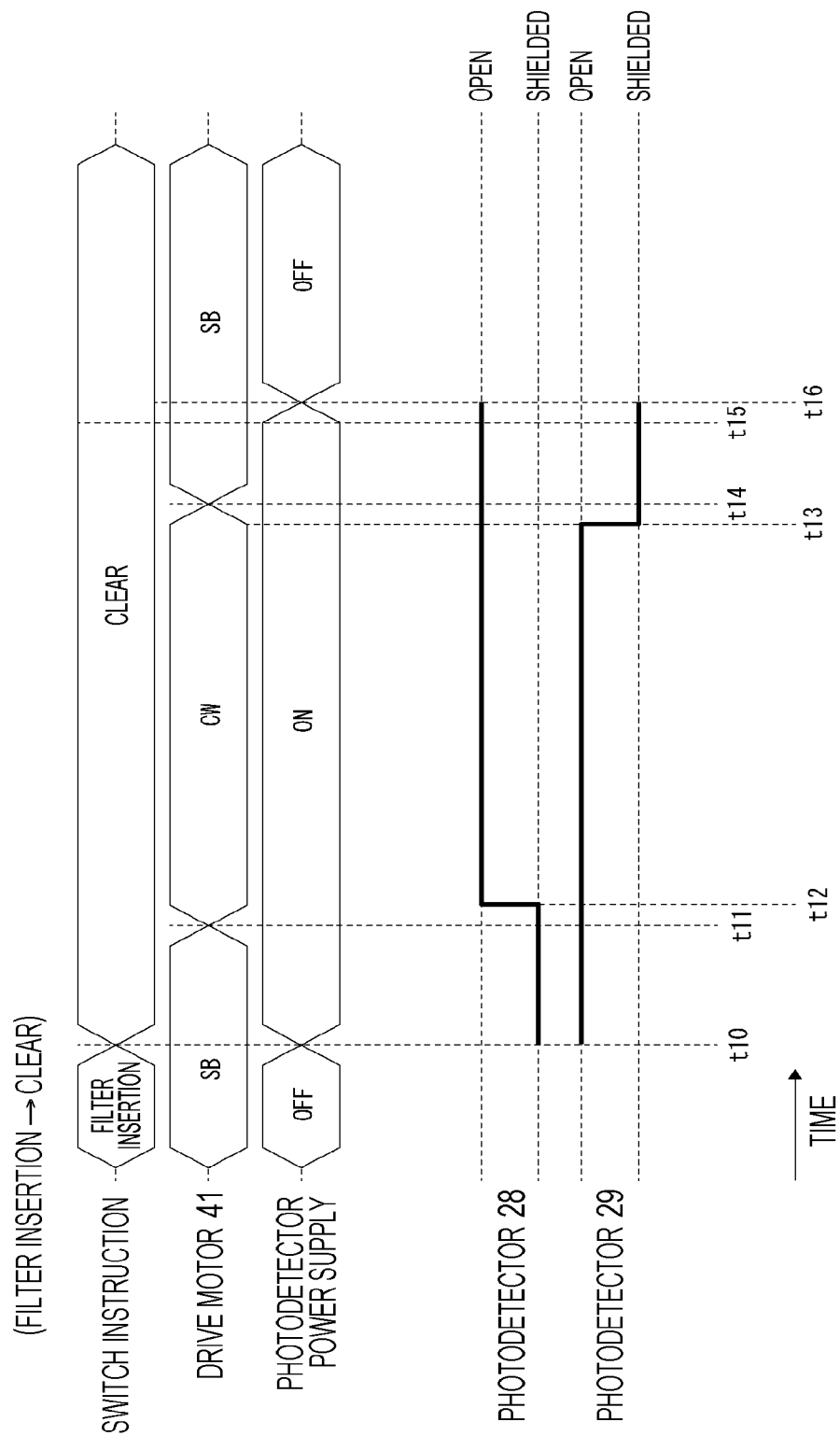

IMAGING APPARATUS WITH REMOVABLE VARIABLE NEUTRAL DENSITY FILTER

TECHNICAL FIELD

The present technology relates to an imaging apparatus, a control device, a filter control method, and a program, and more particularly, to a technology for controlling the quantity of light entering an imaging apparatus.

BACKGROUND ART

In capturing a still image or a moving image, brightness of an object varies with imaging environments. Also, there are cases where the object is intentionally moved out of an exposed state from the viewpoint of image creation, and the brightness of the object plays a big role as an expression means. Movement from the outdoors to the indoors is an example. While the sunlight on a sunny day is about 100,000 [lm/m$^2$], an indoor fluorescent lamp is about 500 [lm/m$^2$], the sunlight being 100 times or more greater in illuminance than the indoor fluorescent lamp.

For imaging that is subject to such a great change in illuminance, there are neutral density filters as one of means for adjusting exposure. One of the kinds of neutral density filters is a variable neutral density filter as disclosed in Patent Document 1, and, by applying a voltage to the filter, it is possible to control the molecular direction inside the filter, and variably control the light reduction rate (transmittance).

CITATION LIST

Patent Document

Patent Document 1: Japanese Patent Application Laid-Open No. 2002-40515

SUMMARY OF THE INVENTION

Problems to be Solved by the Invention

However, the transmittance of a variable neutral density filter has not successfully reached 100[%], and even the maximum transmittance thereof does not bring sufficient brightness in a dark environment such as an indoor scene, compared with a situation without any variable neutral density filter. To solve this problem, a mechanism for inserting and removing a filter is required. Therefore, when a variable neutral density filter is used in an imaging apparatus, two operating members are conventionally required to issue an instruction to insert/remove a variable neutral density filter, and issue an instruction to change the transmittance.

In this case, the need for operations of a plurality of operating members as operations for the purpose of incident light quantity adjustment does not necessarily provide the camera operator or the like with high operability.

In view of such circumstances, the present disclosure suggests a technology for enabling insertion/removal of a variable neutral density filter and a transmittance designating operation only with a single operating member.

Solutions to Problems

An imaging apparatus according to the present technology includes: a variable neutral density filter that has a variable transmittance; an imaging device unit on which object light via the variable neutral density filter forms an image; a variable transmittance drive unit that changes the transmittance of the variable neutral density filter in accordance with a transmittance control value; an operating unit that is capable of a transmittance lowering operation and a transmittance raising operation; a filter insertion/removal unit that is capable of removing the variable neutral density filter from an incident light path of the object light and inserting the variable neutral density filter into the incident light path; and a filter control unit that instructs the filter insertion/removal unit to insert the variable neutral density filter into the incident light path and instructs the variable transmittance drive unit to lower the transmittance of the variable neutral density filter, both on the basis of detection of the transmittance lowering operation of the operating unit, and instructs the variable transmittance drive unit to raise the transmittance of the variable neutral density filter and instructs the filter insertion/removal unit to remove the variable neutral density filter from the incident light path, both on the basis of detection of the transmittance raising operation of the operating unit.

To adjust the quantity of light entering the imaging device unit, the variable neutral density filter is provided, and insertion/removal of the variable neutral density filter is enabled. In this case, the transmittance of the variable neutral density filter is controlled, and the variable neutral density filter is inserted/removed into/from the incident light path, so that the quantity of incident light changes. In this case, by a transmittance lowering operation of the operating unit, the variable neutral density filter is inserted into the incident light path, and the transmittance of the variable neutral density filter is lowered. Also, by a transmittance raising operation of the operating unit, the transmittance of the variable neutral density filter is raised, and the variable neutral density filter is removed from the incident light path.

In the above imaging apparatus according to the present technology, the filter control unit may: instruct the filter insertion/removal unit to insert the variable neutral density filter into the incident light path, in response to the transmittance lowering operation at a time when the variable neutral density filter is in a state in which the variable neutral density filter has been removed from the incident light path; instruct the variable transmittance drive unit to lower the transmittance of the variable neutral density filter, in response to the transmittance lowering operation at a time when the variable neutral density filter is in an inserted state in the incident light path; instruct the variable transmittance drive unit to raise the transmittance of the variable neutral density filter, in response to the transmittance raising operation at a time when the variable neutral density filter is in an inserted state in the incident light path and does not have the maximum transmittance; and instruct the filter insertion/removal unit to remove the variable neutral density filter from the incident light path, in response to the transmittance raising operation at a time when the variable neutral density filter is in an inserted state in the incident light path and has the maximum transmittance.

As a result, in the case of a transmittance lowering operation, control is performed in a direction from insertion of the variable neutral density filter toward a transmittance decrease in an inserted state.

Meanwhile, in the case of a transmittance raising operation, control is performed in a direction from a transmittance increase in an inserted state of the variable neutral density filter toward removal of the variable neutral density filter.

In the above imaging apparatus according to the present technology, the filter control unit may set a dead zone that invalidates an operation related to the transmittance raising operation at a time when the variable neutral density filter is in an inserted state in the incident light path and has the maximum transmittance.

A dead zone is set for the transmittance raising operation, and any operation in the dead zone is invalidated. Only in a case where the transmittance raising operation outside the dead zone is performed, this operation is regarded as a valid variable neutral density filter removal operation, and the filter insertion/removal unit is instructed to remove the variable neutral density filter from the incident light path.

In the above imaging apparatus according to the present technology, the filter control unit may set a dead zone that invalidates an operation related to the transmittance lowering operation at a time when the variable neutral density filter is in a removed state in which the variable neutral density filter has been removed from the incident light path.

A dead zone is set for the transmittance lowering operation, and any operation in the dead zone is invalidated. Only in a case where the transmittance lowering operation outside the dead zone is performed, this operation is regarded as a valid operation for insertion of the variable neutral density filter, and the filter insertion/removal unit is instructed to insert the variable neutral density filter into the incident light path.

In the above imaging apparatus according to the present technology, the dead zone may be set as the operation amount range of the transmittance raising operation.

For example, a dead zone is set as the operation amount of the transmittance raising operation. When the transmittance raising operation is performed by a certain operation amount, the operation is regarded as a valid operation for removal of the variable neutral density filter.

In the above imaging apparatus according to the present technology, the dead zone may be set as a time to invalidate an operation for the transmittance raising operation.

For example, the transmittance raising operation is invalidated depending on a time condition in some cases.

In the above imaging apparatus according to the present technology, the dead zone may be set as the operation amount range of the transmittance lowering operation.

For example, a dead zone is set as the operation amount of the transmittance lowering operation. When the transmittance lowering operation is performed by a certain operation amount, the operation is regarded as a valid operation for insertion of the variable neutral density filter.

In the above imaging apparatus according to the present technology, the dead zone may be set as a time to invalidate an operation for the transmittance lowering operation.

For example, a transmittance raising operation is invalidated depending on a time condition for a transmittance lowering operation in some cases.

In the above imaging apparatus according to the present technology, a warning that the variable neutral density filter will be removed from the incident light path due to the transmittance raising operation, or that the variable neutral density filter will be inserted into the incident light path due to the transmittance lowering operation may be displayed at a predetermined timing.

For example, with a certain image or message display, the user is notified that the variable neutral density filter will be removed or inserted if the transmittance raising operation or the transmittance lowering operation is continued even a little longer.

In the above imaging apparatus according to the present technology, the filter control unit may set a dead zone that invalidates an operation for at least one of the transmittance raising operation at a time when the variable neutral density filter is in an inserted state in the incident light path and has the maximum transmittance, or the transmittance lowering operation at a time when the variable neutral density filter is in a state in which the variable neutral density filter has been removed from the incident light path. The imaging apparatus may further include a vibration generator that applies vibration to the operating unit, and the vibration generation unit may generate predetermined vibration when an operation is performed in the dead zone.

Regarding an operation in the dead zone, vibration applied to the operating unit can be perceived by the user.

In the above imaging apparatus according to the present technology, the predetermined vibration may be vibration that is generated when a short pulse is applied to an actuator in the vibration generation unit at the natural frequency of the actuator.

A single pulse is applied, using the natural frequency of the actuator as an input signal.

In the above imaging apparatus according to the present technology, the filter control unit may set a dead zone that invalidates an operation for at least one of the transmittance raising operation at a time when the variable neutral density filter is in an inserted state in the incident light path and has the maximum transmittance, or the transmittance lowering operation at a time when the variable neutral density filter is in a state in which the variable neutral density filter has been removed from the incident light path, and make the dead zone larger during image recording than the dead zone during a non-recording time.

For example, during recording of an image such as a moving image, the amount of operation as the dead zone is made larger, or the time length as the dead zone is made greater than that during a non-recording time (when image recording is not being performed).

In the above imaging apparatus according to the present technology, the filter control unit may not cause the filter insertion/removal unit to insert the variable neutral density filter into the incident light path or remove the variable neutral density filter from the incident light path, during image recording.

For example, during recording of an image such as a moving image, insertion and removal of the variable neutral density filter are prohibited even when the operating unit is operated.

In the above imaging apparatus according to the present technology, during a process of inserting the variable neutral density filter into the incident light path and during a process of removing the variable neutral density filter from the incident light path, the filter insertion/removal unit may detect that the variable neutral density filter has reached a detection position before reaching a stop position, and perform a stop operation.

During an insertion process and a removal process, the filter position is detected at the detection position before the stop position, and brake control is performed.

The above imaging apparatus according to the present technology may further include: a first movable unit that includes the variable neutral density filter, and is movable between a light transmission position at which light can be transmitted toward an imaging device and a retraction position at which retraction from the imaging device is performed; a second movable unit that includes a transparent filter, and is movable between the light transmission position and the retraction position; and a drive mechanism that synchronously moves the first movable unit and the second movable unit in opposite directions. In this imaging apparatus, one of the first movable unit and the second movable unit is moved to the light transmission position, while the other one of the first movable unit and the second movable unit is moved to the retraction position.

When the first movable unit is moved to the light transmission position by the drive mechanism, the second movable unit is moved to the retraction position. When the second movable unit is moved to the light transmission position by the drive mechanism, the first movable unit is moved to the retraction position.

In the above imaging apparatus according to the present technology, the first movable unit and the second movable unit may pass each other, to be moved to the light transmission position or the retraction position.

Through movement in the vicinity, the first movable unit and the second movable unit are moved to the light transmission position or the retraction position.

In the above imaging apparatus according to the present technology, the thickness direction of the variable neutral density filter in the first movable unit may match the optical axis direction, the thickness direction of the transparent filter in the second movable unit may match the optical axis direction, and the first movable unit and the second movable unit may be moved in a direction orthogonal to the optical axis direction.

While the thickness direction matches the optical axis direction, the first movable unit and the second movable unit are moved in a direction orthogonal to the optical axis direction.

A control device according to the present technology includes a filter control unit that: instructs a filter insertion/removal unit to insert a variable neutral density filter having a variable transmittance into an incident light path of object light to an imaging device unit, and instructs a variable transmittance drive unit to lower the transmittance of the variable neutral density filter, both on the basis of detection of a transmittance lowering operation of an operating unit, the filter insertion/removal unit being capable of removing the variable neutral density filter from the incident light path and inserting the variable neutral density filter into the incident light path, the variable transmittance drive unit being designed to change the transmittance of the variable neutral density filter in accordance with a transmittance control value; and instructs the variable transmittance drive unit to raise the transmittance of the variable neutral density filter, and instructs the filter insertion/removal unit to remove the variable neutral density filter from the incident light path, both on the basis of detection of a transmittance raising operation of the operating unit.

It is assumed that a device such as a microcomputer in the imaging apparatus, an operation device (such as a remote controller, for example) independent of the imaging apparatus, or the like may function as the control device.

A filter control method according to the present technology is a filter control method that is implemented in an imaging apparatus and includes: instructing the filter insertion/removal unit to insert the variable neutral density filter into the incident light path, and instructing the variable transmittance drive unit to lower the transmittance of the variable neutral density filter, both on the basis of detection of the transmittance lowering operation of the operating unit; and instructing the variable transmittance drive unit to raise the transmittance of the variable neutral density filter, and instructing the filter insertion/removal unit to remove the variable neutral density filter from the incident light path, both on the basis of detection of the transmittance raising operation of the operating unit.

As a result, the transmittance of the variable neutral density filter in an inserted state can be controlled, and switching between an inserted state and a removed state is enabled, by an operation of a single operating unit.

A program according to the present technology is a program for causing an information processing device to perform: a process of instructing a filter insertion/removal unit to insert a variable neutral density filter having a variable transmittance into an incident light path of object light to an imaging device unit, and instructing a variable transmittance drive unit to lower the transmittance of the variable neutral density filter, both on the basis of detection of a transmittance lowering operation of an operating unit, the filter insertion/removal unit being capable of removing the variable neutral density filter from the incident light path and inserting the variable neutral density filter into the incident light path, the variable transmittance drive unit being designed to change the transmittance of the variable neutral density filter in accordance with a transmittance control value; and a process of instructing the variable transmittance drive unit to raise the transmittance of the variable neutral density filter, and instructing the filter insertion/removal unit to remove the variable neutral density filter from the incident light path, both on the basis of detection of a transmittance raising operation of the operating unit.

It is assumed that an information processing device such as a microcomputer in the imaging apparatus, an information processing device in an operation device (such as a remote controller, for example) independent of the imaging apparatus, or the like operates according to such a program.

BRIEF DESCRIPTION OF DRAWINGS

FIG. 28 is a chart for explaining an operation at a time of insertion of a variable neutral density filter according to an embodiment.

FIG. 29 is a chart for explaining an operation at a time of removal of a variable neutral density filter according to an embodiment.

MODES FOR CARRYING OUT THE INVENTION

Embodiments will be described below in the following order.

<1. First Embodiment>
<2. Second Embodiment>
<3. Third Embodiment>
<4. Fourth Embodiment>
<5. Fifth Embodiment>
<6. Optical Block Mechanism Including a Variable Neutral Density Filter>
<7. Summary and Modifications>

1. First Embodiment

Figure 1:
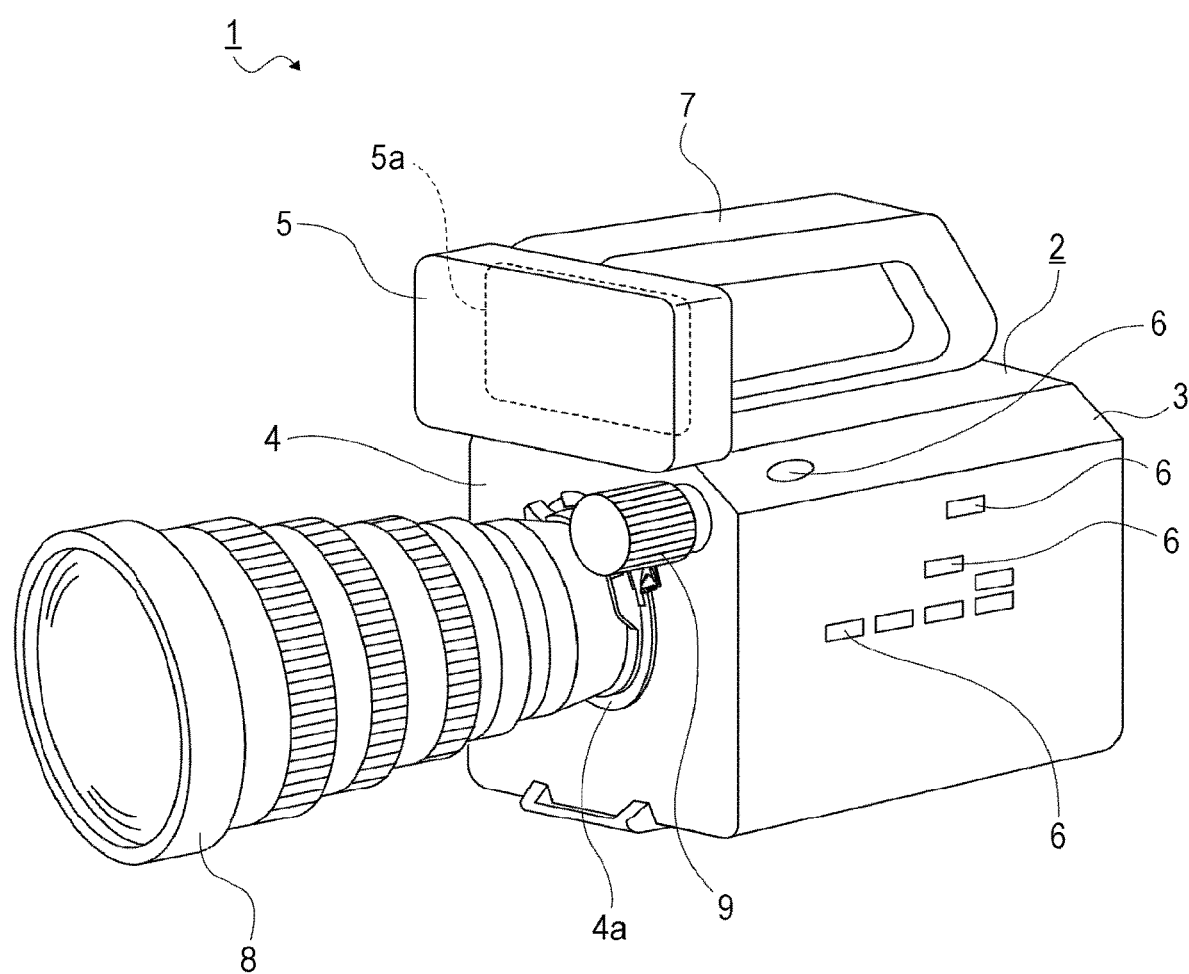
FIG. 1 is a diagram for explaining an example exterior of an imaging apparatus according to an embodiment of the present technology.

FIG. 1 shows an example exterior of an imaging apparatus 1 according to an embodiment. The imaging apparatus 1 is formed with the respective necessary components disposed inside and outside a housing 2.

The housing 2 includes a box-like main frame unit 3 that is open on its front side, and a panel unit 4 attached to the front end portion of the main frame unit 3. A mount portion 4a is attached to the panel unit 4, and a lens barrel 8 can be detachably attached to the panel unit 4 with the mount portion 4a.

Note that the mount portion 4a may be formed integrally with the panel unit 4 and be provided as a part of the panel unit 4.

Various operating units 6, 6, . . . are disposed on the main frame unit 3. As the operating units 6, 6, . . . , a power button, an imaging button, a zoom knob, a mode switching knob, and the like are provided, for example.

A grip portion 7 is provided on the upper surface side of the main frame unit 3.

A display 5 such as a liquid crystal display (LCD) or an organic electro-luminescence (EL) panel is rotatably supported, for example, on the upper surface of the front end portion of the housing 2. The display 5 has a display surface 5a that faces rearward.

A user (a camera operator) can perform imaging and the like while gripping the grip portion 7 and visually recognizing an image displayed on the display surface 5a of the display 5.

Note that a viewfinder such as an electronic viewfinder or an optical viewfinder may be provided instead of or together with the display 5.

For example, a transmittance operator 9 is provided on the panel unit 4 on the front surface side of the housing 2. The transmittance operator 9 is an operating unit for the user to give an instruction to change the transmittance of the variable neutral density filter described later, and to insert/remove the variable neutral density filter into/from the incident light path.

As an example, the transmittance operator 9 is formed with a cylindrical rotating member so that the user can perform a rotating operation. A rotating operation in one direction (clockwise, for example) is an operation for increasing the transmittance, and a rotating operation in another direction (counterclockwise, for example) is an operation for lowering the transmittance.

The rotating member as the transmittance operator 9 is steplessly rotatable. Further, the rotating member does not have any rotating end, and can rotate unlimitedly in both the clockwise and counterclockwise directions. Note that, as a modification, the rotating member may have a rotating end.

Figure 2:
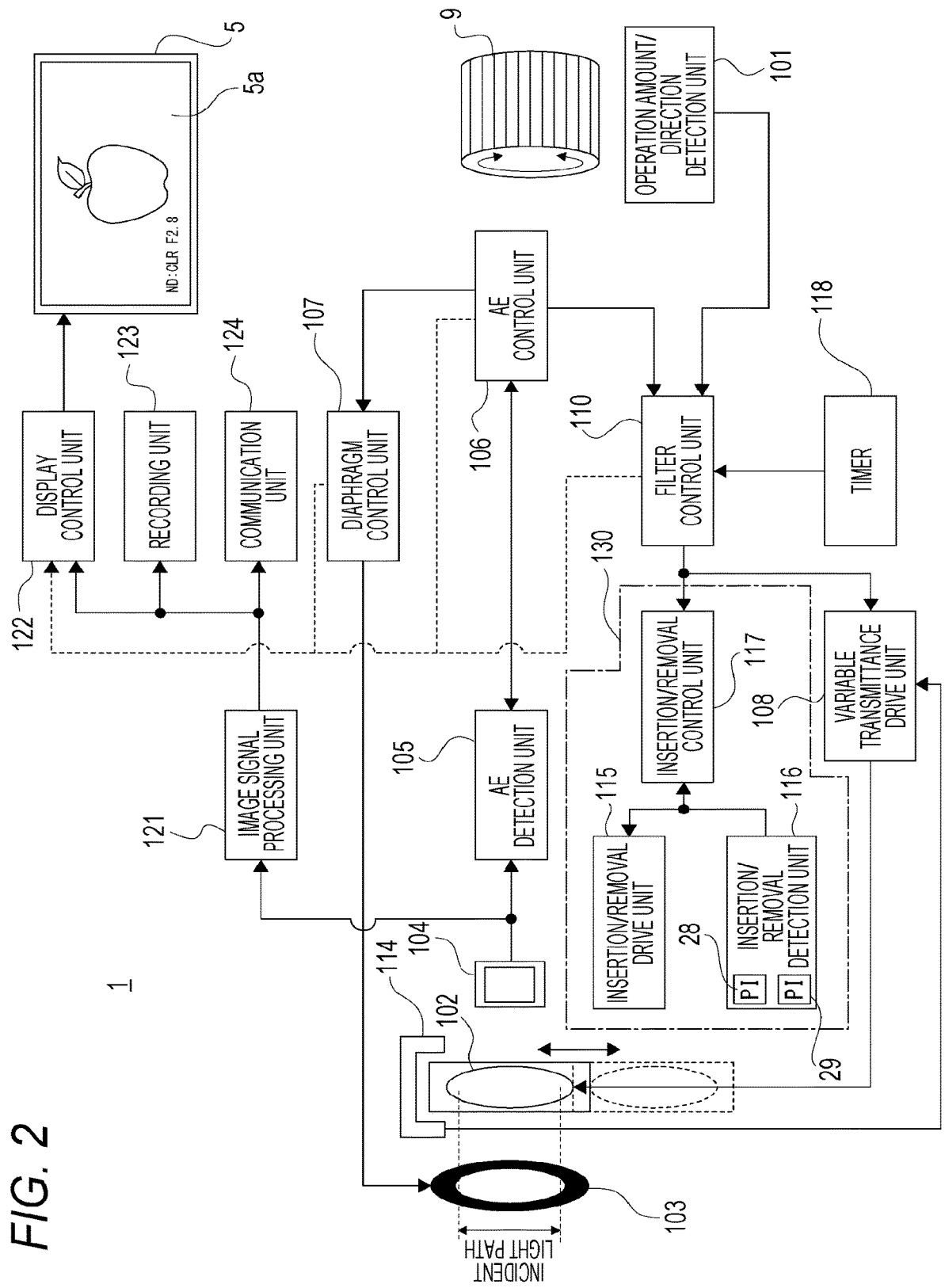
FIG. 2 is a block diagram of an example internal configuration of an imaging apparatus according to a first embodiment.

FIG. 2 is a block diagram of the internal configuration of the imaging apparatus 1.

In the imaging apparatus 1, object light condensed through an optical system (such as a cover lens, a zoom lens, and a focus lens) not shown in the drawing is further limited in light flux in accordance with the aperture size of a diaphragm 103, is reduced while passing through a variable neutral density filter 102 (or without passing through the variable neutral density filter 102), and then forms an image on an imaging device unit 104.

The variable neutral density filter 102 is a device capable of variably controlling filter transmittance by changing the voltage to be applied to the terminal.

For example, when the incident light quantity is set at "1", the variable neutral density filter 102 can reduce the light quantity from "¼" to a desired brightness of "¹⁄₁₂₈".

There are physically two fixed positions of the variable neutral density filter 102. One of the two fixed positions is a position (hereinafter referred to as the "insertion position") at which the variable neutral density filter 102 is in contact with the incident light path of the object light connecting the aperture plane of the diaphragm 103 and the imaging device unit 104, as shown in the drawing.

The other is a position (hereinafter referred to as the "removal position") at which the incident light path and the variable neutral density filter 102 are not in contact with each other, as indicated by a dashed line in the drawing.

Note that the insertion position will be described below on the assumption that the entire surface of the incident light path is in contact with (passes through) the variable neutral density filter 102. However, there will be no problems even in a case where the variable neutral density filter 102 is only partially in contact with the light path, and the present technology is not limited in this aspect.

A filter insertion/removal unit 130 removes/inserts the variable neutral density filter 102 from/into the incident light path of the object light. Therefore, the filter insertion/removal unit 130 moves the physical position of the variable neutral density filter 102 and manages the position thereof.

In this example, the filter insertion/removal unit 130 has a configuration that includes an insertion/removal control unit 117, an insertion/removal drive unit 115, and an insertion/removal detection unit 116.

The insertion/removal drive unit 115 is a drive actuator. The actuator is mechanically connected, and the variable neutral density filter 102 moves in the rotating direction of the actuator to the insertion position or the removal position.

The insertion/removal control unit 117 performs drive control on the insertion/removal drive unit 115, in accordance with an instruction from the filter control unit 110 described later. During the drive control, the insertion/removal control unit 117 refers to a detection signal from the insertion/removal detection unit 116.

The insertion/removal detection unit 116 is a sensor that detects the current position of the variable neutral density filter 102, and a circuit system thereof. In this example, the following two sensors are used: a photodetector 28 as a photointerrupter in which the high/low voltage level changes when the variable neutral density filter 102 moves to the insertion position; and a photodetector 29 as a photointerrupter in which the high/low voltage level changes when the variable neutral density filter 102 moves to the removal position.

Here, if the voltage level change positions of the photodetectors 28 and 29, which are photointerrupters, are strictly defined, the voltage level change positions do not necessarily coincide with the insertion position and the removal position.

The insertion position is now explained with reference to FIG. 3.

Figure 3:
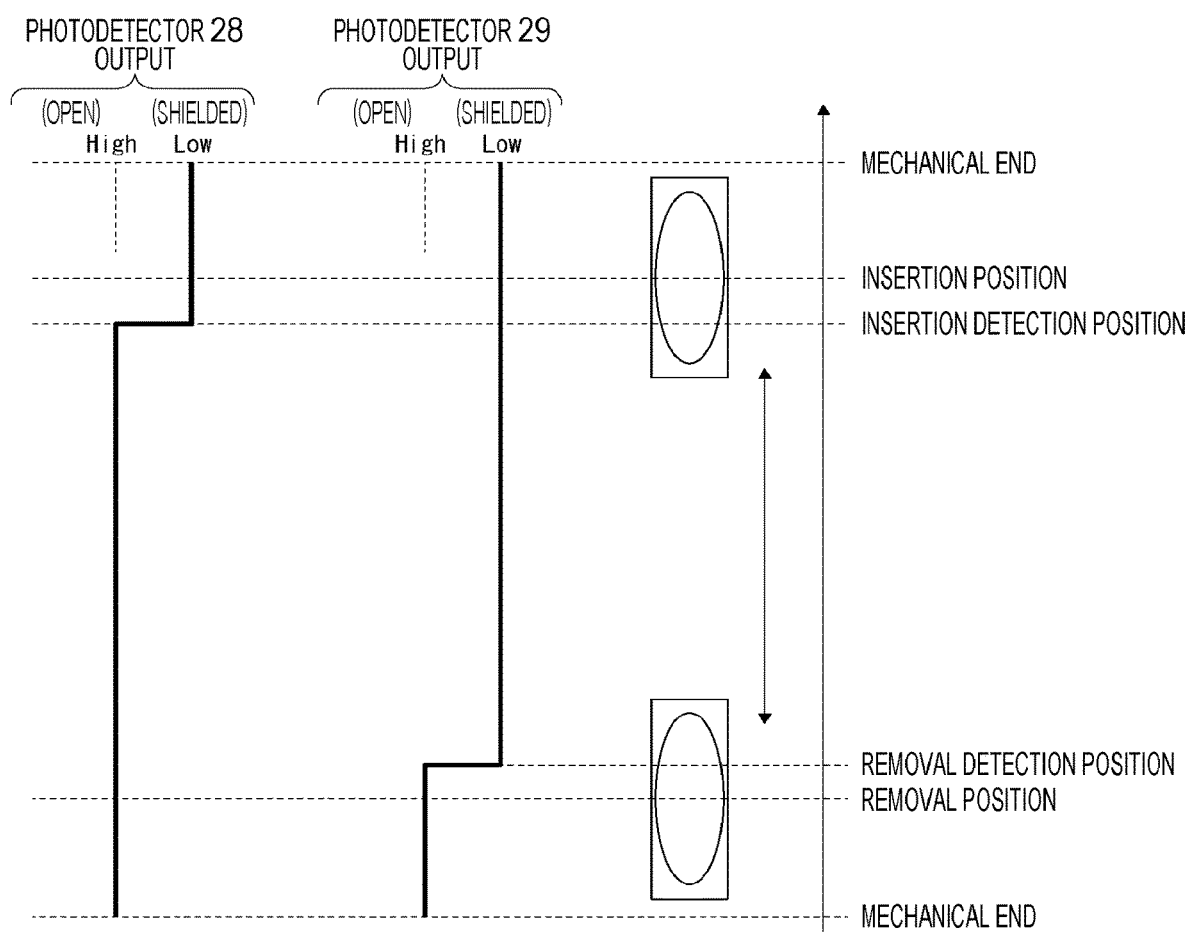
FIG. 3 is a diagram for explaining position detection at times of insertion and removal of a variable neutral density filter according to an embodiment.

Note that, in FIG. 3, the detection outputs of the photodetectors 28 and 29 are at the high level when being open (when there is not an object that blocks light), and are at the low level when being shielding from light. Accordingly, when the variable neutral density filter 102 is at the removal position, the photodetector 28 on the insertion position side is in an open state (the high level), and the photodetector 29 on the removal position side is in a light-shielded state (the low level).

When the variable neutral density filter 102 moves from the removal position to the insertion position, the variable neutral density filter 102 moves upward in the drawing, but the output of the photodetector 28 switches to the low level at the insertion detection position before the variable neutral density filter 102 reaches the insertion position.

This is because a predetermined time is required from the detection of the change to the low level till the issuance of a stop instruction to the insertion/removal drive unit 115, and from the reception of the stop instruction till the deceleration and stop of the insertion/removal drive unit 115.

If the output of the photodetector 28 switches to the low level when the variable neutral density filter 102 reaches the insertion position (the position at which the variable neutral density filter 102 should stop), the stop cannot be made in time, and the variable neutral density filter 102 collides with a mechanical end, which might lead to damage of a member, or failure or a change in the characteristics of the variable neutral density filter 102. However, this can be avoided in the operation described above.

How far ahead the insertion detection position should be set from the insertion position depends on the driving speed of the insertion/removal drive unit 115, the deceleration efficiency until a stop, and the control response from sensor detection to stop command issuance, and therefore, is determined by the control system and the mechanical mechanism configuration. In a case where the insertion/removal drive unit 115 and the insertion/removal detection unit 116 have elements dependent on environments such as temperature characteristics, it is necessary to take these elements into consideration at the time of designing.

Referring back to FIG. 2, explanation continues. An absolute position detection sensor may be used as the insertion/removal detection unit 116. In that case, the insertion/removal detection unit 116 may also be used as a position feedback sensor for the insertion/removal drive unit 115, separately from determination information as to whether the variable neutral density filter 102 has reached the target position.

As described above, the transmittance of the variable neutral density filter 102 is variable. When the variable neutral density filter 102 is at the insertion position, it is possible to adjust the quantity of incident light entering the imaging device unit 104 by setting the transmittance of the variable neutral density filter 102.

Voltage application for variable transmittance driving of the variable neutral density filter 102 is performed by a variable transmittance drive unit 108. The variable transmittance drive unit 108 changes the value of the voltage to be applied to the variable neutral density filter 102 so that the transmittance becomes a transmittance corresponding to a designated transmittance control value.

The current transmittance of the variable neutral density filter 102 is detected by a transmissive sensor 114 formed with a transmissive photointerrupter, for example. The variable transmittance drive unit 108 controls the value of the voltage to be applied to the variable neutral density filter 102, using a feedback system, so that the transmittance converges to the designated transmittance on the basis of an output of the transmissive sensor 114.

The diaphragm 103 is a member in which a plurality of diaphragm blades operates in conjunction with driving of an actuator, and the aperture size can be changed freely. As the diaphragm 103 is formed with a plurality of diaphragm blades, an aperture shape closer to a precise circle can be provided.

The imaging device unit 104 includes an image sensor of a complementary metal oxide semiconductor (CMOS) type or a charge coupled device (CCD) type, for example.

In this imaging device unit 104, a correlated double sampling (CDS) process, an automatic gain control (AGC) process, or the like, for example, is performed on an electric signal obtained by photoelectrically converting light received with the image sensor, and an analog/digital (A/D) conversion process is further performed on the electric signal. An imaging signal as digital data is then output to an image signal processing unit 121 and an automatic exposure (AE) detection unit 105 in the stages that follow.

The image signal processing unit 121 is formed as an image processor, such as a digital signal processor (DSP), for example. This image signal processing unit 121 performs various kinds of signal processing on the digital signal (a captured image signal) from the imaging device unit 104. For example, the image signal processing unit 121 performs preprocessing, a synchronization process, a YC generation process, a resolution conversion process, a codec process, and the like.

A recording unit 123 performs recording/reproduction on a recording medium formed with a nonvolatile memory, for example. The recording unit 123 performs processing of recording image files such as moving image data and still image data, thumbnail images, and the like on a recording medium, for example.

The recording unit 123 can take various forms. For example, the recording unit 123 may be formed as a write/read circuit for a flash memory included in the imaging apparatus 1, or may be in the form of a card recording/reproducing unit that makes recording/reproducing access to a recording medium that can be detachably attached to the imaging apparatus 1, such as a memory card (a portable flash memory or the like), for example. Alternatively, as a component to be included in the imaging apparatus 1, the recording unit 123 may be formed as a hard disk drive (HDD) or the like.

A display control unit 122 causes the display 5 or a viewfinder in the housing of the imaging apparatus 1 to perform a display operation, for example.

For example, the display control unit 122 causes the display 5 or the like to display a reproduced image of image data read from a recording medium by the recording unit 123.

The display control unit 122 also causes the display 5 or the like to display the image data of a captured image whose resolution has been converted for display by the image signal processing unit 121. As a result, a so-called through-the-lens image (an object monitoring image) that is a captured image during picture composition confirmation is displayed.

The display control unit 122 also causes the display 5 or the like to display various operation menus, icons, messages, and the like, which are displays as graphical user interfaces (GUI) on the screen.

A communication unit 124 performs data communication, network communication, or the like with an external device in a wired or wireless manner. For example, captured image data (a moving image or a still image) processed by the image signal processing unit 121 is transmitted/output to an external information processing device, display device, recording device, reproduction device, or the like.

Operations of the image processing unit 121, the display control unit 122, the recording unit 123, and the communication unit 124 described above are controlled by a microcomputer (an arithmetic processing device) (not shown) that performs overall control in the imaging apparatus, for example.

The microcomputer includes a central processing unit (CPU), a read only memory (ROM), a random access memory (RAM), a non-volatile memory, an interface unit, and the like, and executes a program stored in the ROM, the flash memory, or the like, in accordance with a user operation through an operating unit 6 or the like, or various kinds of sensor information, for example. By doing so, the microcomputer performs various kinds of control for necessary camera operations.

For example, the microcomputer controls necessary operations of the respective components, such as the shutter speed of the imaging device unit 104, instructions as to various kinds of signal processing in the image signal processing unit 121, imaging operations and recording operations according to user operations, operations of the lens system such as zooming, focusing, and diaphragm adjustment in the lens barrel 8, and user interface operations.

Further, it is conceivable that the AE detection unit 105, an automatic exposure (AE) control unit 106, a diaphragm control unit 107, the filter control unit 110, and a timer 118 that will be described later are designed as control/arithmetic functions of the microcomputer described above.

Note that each of these units is designed as a control/arithmetic function of the microcomputer in an example, and each of these units may be formed with an individual processor, a logic circuit, or the like.

Light quantity information about the object image formed on the imaging device 104 is also input to the AE detection unit 105. The AE detection unit 105 performs numerical conversion on the input light quantity.

The user can set the area of photometry, the presence/absence of an emphasized area, and the like as desired, and the AE detection unit 105 performs a detection process in accordance with the user settings.

The AE control unit 106 receives an input of the quantity of light detected by the AE detection unit 105, and automatically controls exposure so as to achieve an appropriate brightness.

In this example, the AE control unit 106 comprehensively controls the diaphragm 103 and the variable neutral density filter 102 as an exposure adjusting means.

The AE control unit 106 sends a control instruction to the diaphragm control unit 107 in the case of operating the diaphragm 103, and sends a control instruction to the filter control unit 110 in the case of operating the variable neutral density filter 102 (to change transmittance or switch between insertion and removal).

Note that the aperture size control range of the diaphragm 103, the inserted/removed state of the variable neutral density filter 102, the transmittance control range, and the current states of the diaphragm 103 and the variable neutral density filter 102 can all be managed by the AE control unit 106, and control is performed inclusive of all of these conditions.

Further, the AE control unit 106 may also control the shutter speed that controls the exposure time, and a gain circuit that internally performs signal amplification.

The diaphragm control unit 107 receives a control instruction from the AE control unit 106, and performs drive control on the diaphragm 103.

In a case where the AE control unit 106 determines that the exposure is darker/brighter than appropriate exposure, the AE control unit 106 designates a target F value for the diaphragm control unit 107. The diaphragm control unit 107 converts an F value into a drive signal, and operates a diaphragm drive actuator (not shown). The diaphragm 103 is controlled to open in a case where the exposure is darker than the appropriate exposure, and the diaphragm 103 is controlled to be narrowed in a case where the exposure is brighter.

The filter control unit 110 receives a control instruction from the AE control unit 106, and performs drive control on the variable neutral density filter 102.

In a case where the AE control unit 106 determines that the exposure is darker/brighter than the appropriate exposure, the AE control unit 106 issues a target transmittance and inserted/removed state instruction to the filter control unit 110. The filter control unit 110 sends a transmittance control value to the variable transmittance drive unit 108, and an insertion/removal instruction value to the insertion/removal control unit 117.

The variable transmittance drive unit 108 performs voltage control on the variable neutral density filter 102 so that the transmittance becomes equal to the transmittance designated by the filter control unit 110.

The insertion/removal control unit 117 causes the insertion/removal drive unit 115 to drive in the designated direction so as to be in the inserted/removed state designated by the filter control unit 110, and issues a stop command to the insertion/removal drive unit 115 when the insertion/removal detection unit 116 detects the insertion detection position or the removal detection position.

The above is the configuration of automatic exposure (AE).

The transmittance control (control on the quantity of light entering the imaging device unit 104) can be performed not only by the above automatic exposure but also by a user operation.

The imaging apparatus 1 includes an operation amount/direction detection unit 101 in conjunction with the transmittance operator 9. The operation amount/direction detection unit 101 detects the operation direction and the rotation amount of the transmittance operator 9, and notifies the filter control unit 110 of the operation direction and the rotation amount.

Note that there are no restrictions on the internal structure, as long as the operation amount/direction detection unit 101 can detect the rotation amount and the rotation direction of the rotating member of the transmittance operator 9, for example.

For example, the operation amount/direction detection unit 101 may be any of various examples, such as one that uses an MR sensor and one that detects an amount of change at a constant cycle with an optical rotary encoder.

The filter control unit 110 also receives a notification from the operation amount/direction detection unit 101, in addition to the instruction from the AE control unit 106 described above. From the notification information received from the operation amount/direction detection unit 101, the filter control unit 110 interprets the value of an instruction from the user through the transmittance operator 9, and instructs the insertion/removal control unit 117 and the variable transmittance drive unit 108 to change the transmittance and issue an insertion/removal instruction.

Note that, in a case where an instruction from the AE control unit 106 and a user instruction from the transmittance operator 9 conflict with each other in the filter control unit 110, priority is given to the user instruction.

The timer 118 measures the time to be referred to in the control of the filter control unit 110, or particularly the time related to the dead zones.

Figure 4:
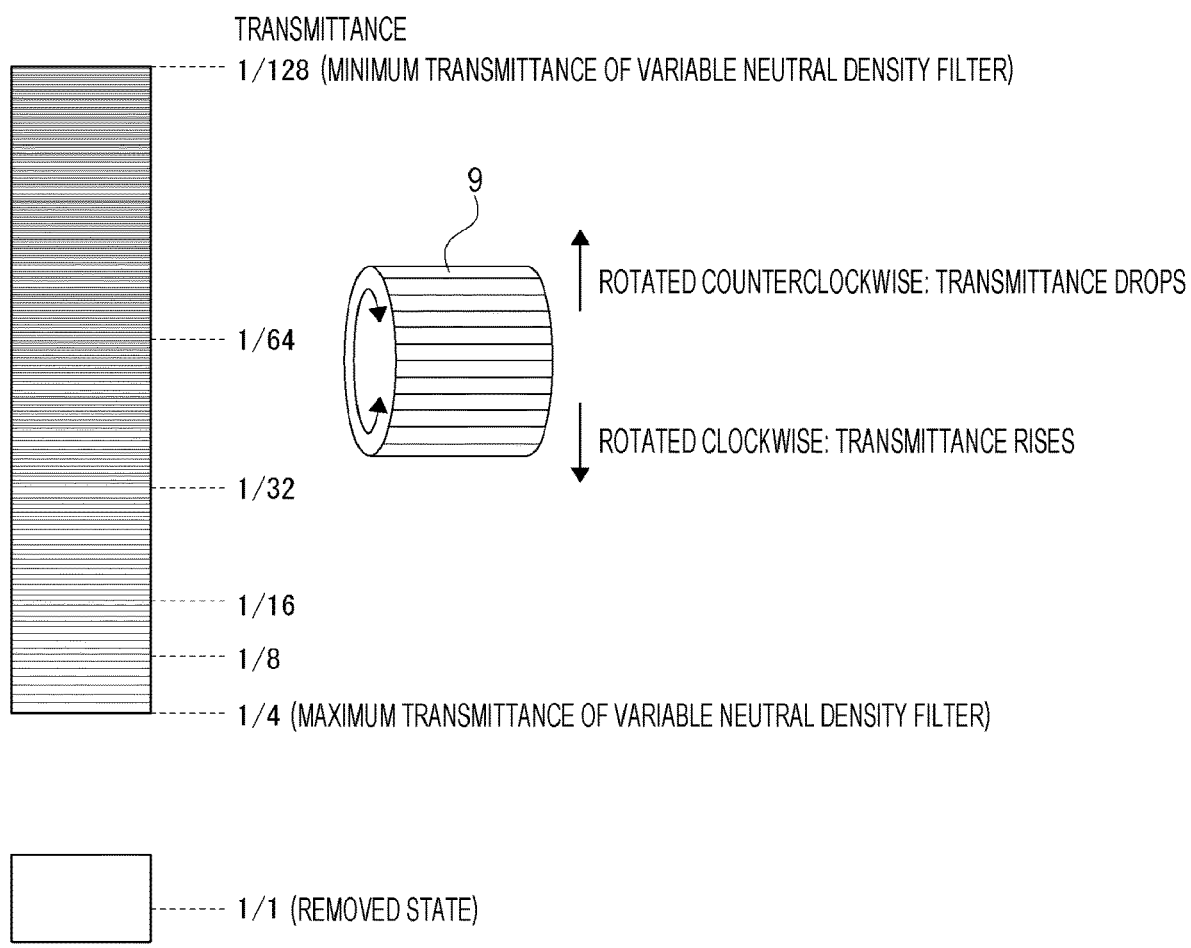
FIG. 4 is a diagram for explaining the transmittance control range according to an embodiment.

The relationship between the operation of the transmittance operator 9 and the transmittance is now described, with reference to FIG. 4.

The transmittance operator 9 is a dial member that includes a rotating member as described above and is capable of clockwise and counterclockwise rotating operations, and has no operation ends. Therefore, the absolute position of the dial and the transmittance are not associated with each other. Relative control is performed by detecting how far a rotating operation has been performed from the current position, and changing the current transmittance by the amount equivalent to the operation amount.

For example, when the transmittance operator 9 (the dial) is rotated counterclockwise, the transmittance becomes lower. When the transmittance operator 9 (the dial) is rotated clockwise, the transmittance becomes higher.

In a case where the transmittance at a time when the variable neutral density filter 102 is located at the removal position is "1/1", the minimum transmittance of the variable neutral density filter 102 in this example is "1/128", and the maximum transmittance is "1/4".

Between the minimum transmittance "1/128" and the maximum transmittance "1/4", the transmittance becomes lower when the transmittance operator 9 is rotated counterclockwise, and the transmittance becomes higher when the transmittance operator 9 is rotated clockwise.

The transmittances ("1/32", "1/64", . . . ) shown in FIG. 4 are representative values, and other values can be set. That is, the transmittance is continuously changed between "1/128" and "1/4" in accordance with rotation of the transmittance operator 9.

When the transmittance operator 9 is rotated clockwise from the state of "1/4", which is the maximum transmittance, the transmittance cannot be further increased in the inserted state, and therefore, the variable neutral density filter 102 is removed.

This state is the state with the highest transmittance (transmittance "1/1"). The transmittance cannot be lower than "1/1" while being higher than "1/4", and the incident light quantity control in this example is discontinuous in this zone.

Figure 5:
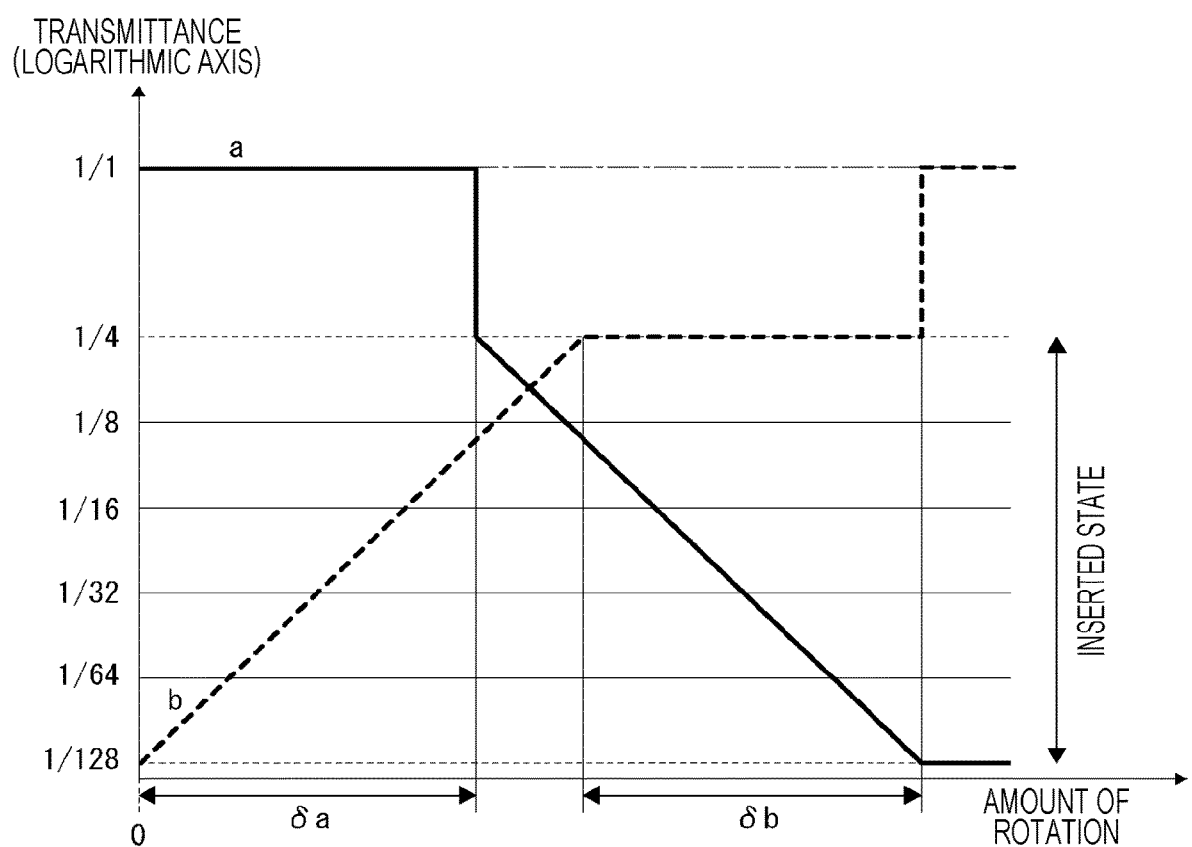
FIG. 5 is a graph for explaining the transmittance changes associated with operation rotation amounts according to an embodiment.

The graph shown in FIG. 5 is a graph of the relationship between the rotation amount and the transmittance, the abscissa axis indicating the amount of rotation of the transmittance operator 9, the ordinate axis indicating the transmittance of the variable neutral density filter 102.

A trajectory a indicated by a solid line is first described. The rightward direction on the abscissa axis is equivalent to a counterclockwise operation of the dial of the transmittance operator 9.

At 0 on the abscissa axis, the transmittance is "1/1", and the variable neutral density filter 102 is in a removed state. When the transmittance operator 9 in this state is rotated counterclockwise, the transmittance does not change at all until the rotation amount reaches δa. Once the rotation amount exceeds δa, the transmittance changes to "1/4". This is synonymous with insertion of the variable neutral density filter 102.

After that, the transmittance changes at log 10 (transmittance) in proportion to the rotation amount. Once the transmittance reaches "1/128", the transmittance does not change even if the transmittance operator 9 is further operated counterclockwise.

Next, a trajectory b indicated by a dashed line is described. The rightward direction on the abscissa axis is equivalent to an operation of the dial of the transmittance operator 9 in the clockwise direction.

At 0 on the abscissa axis, the transmittance is "1/128", and the variable neutral density filter 102 is in an inserted state. When the transmittance operator 9 in this state is rotated clockwise, the transmittance changes at log 10 (transmittance) in proportion to the rotation amount, and increases to "1/4".

When the transmittance operator 9 is further operated in the clockwise direction, the transmittance does not change at all from the time when the transmittance reaches "1/4" till the rotation amount reaches δb. When the rotation amount exceeds δb, the variable neutral density filter 102 is removed.

Here, the zones 6a and 5b in which the transmittance does not change even when the transmittance operator 9 is operated are dead regions in this embodiment.

The variable neutral density filter 102 has an advantage that different transmittances can be achieved with one filter, but there is a limit to the variable range of transmittances. Particularly, on the side where the transmittance is high, ambient light hinders acquisition of a quantity of light in a dark scene. Therefore, a mechanism to be inserted and removed is required as well as a fixed transmittance filter.

A transmittance change and an insertion/removal operation have the same purpose in terms of exposure adjustment using a filter, but there is a clear difference between them from the user's point of view.

Figure 6:
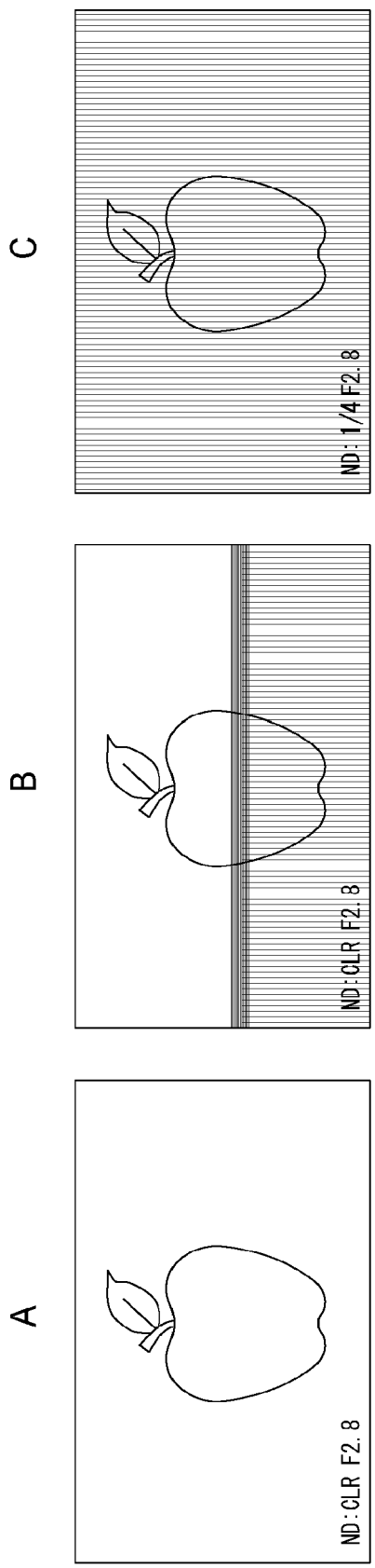
FIG. 6 is a diagram for explaining reflection at times of insertion and removal of the variable neutral density filter.

FIG. 6 shows an image that is received by the imaging device unit 104 when the variable neutral density filter 102 is inserted/removed. FIG. 6A shows a removed state, FIG. 6B shows a state in which insertion is in progress, and FIG. 6C shows a state in which insertion has been completed.

As is apparent from FIG. 6B, the variable neutral density filter 102 (more precisely, the holding member of the variable neutral density filter 102) is reflected. If such an image becomes visible during imaging, the quality is poor, and a retake cannot be avoided for a production-related video.

As for changes in the transmittance of the variable neutral density filter 102, on the other hand, the transmittance can be smoothly changed without causing a feeling of strangeness during imaging. Accordingly, degradation of image quality as in an insertion/removal operation does not occur.

To avoid reflection due to insertion/removal of the variable neutral density filter 102, it is conceivable that separate operating members may be provided for transmittance changes and insertion/removal operations, for example. As separate operating members are provided, the variable neutral density filter 102 is not inserted/removed, unless the user consciously operates the variable neutral density filter 102. However, with separate operating members, the degree of difficulty of user operations becomes higher. Particularly, a camera operator who is capturing an image gazes at the display 5 or a viewfinder image, and normally operates a transmittance operating member by touch. Therefore, with a plurality of operating members, it is difficult for the user to adjust the quantity of incident light as desired in a timely manner.

In view of this, this embodiment enables both a transmittance change and insertion/removal of the variable neutral density filter 102 with the use of a single operating member serving as the transmittance operator 9, and thus, increases operability.

Further, in this case, the dead regions are formed between the transmittance changing operation and the insertion/removal operation, so that an image like the one shown in FIG. 6B will not be generated by an operation not intended by the user during imaging.

In this embodiment, in addition to the rotation amount, a time concept is also provided for the dead zones.

Insertion and removal are not performed in a case where the operation amount within a predetermined time Δt is smaller than the rotation amounts δa and δb. Thus, the risk is further lowered.

The timer 118 shown in FIG. 2 is used in the time measurement for setting the dead zones, and the filter control unit 110 detects the rotation amount from the time of the start of an operation in the counterclockwise direction in a removed state or an operation in the clockwise direction in an inserted state and a ¼ transmittance state, till time Δt, and determines whether or not to accept the rotation amount as an operation amount. Note that the rotation amounts δa and δb may have the same value, or may have different values.

Figure 7:
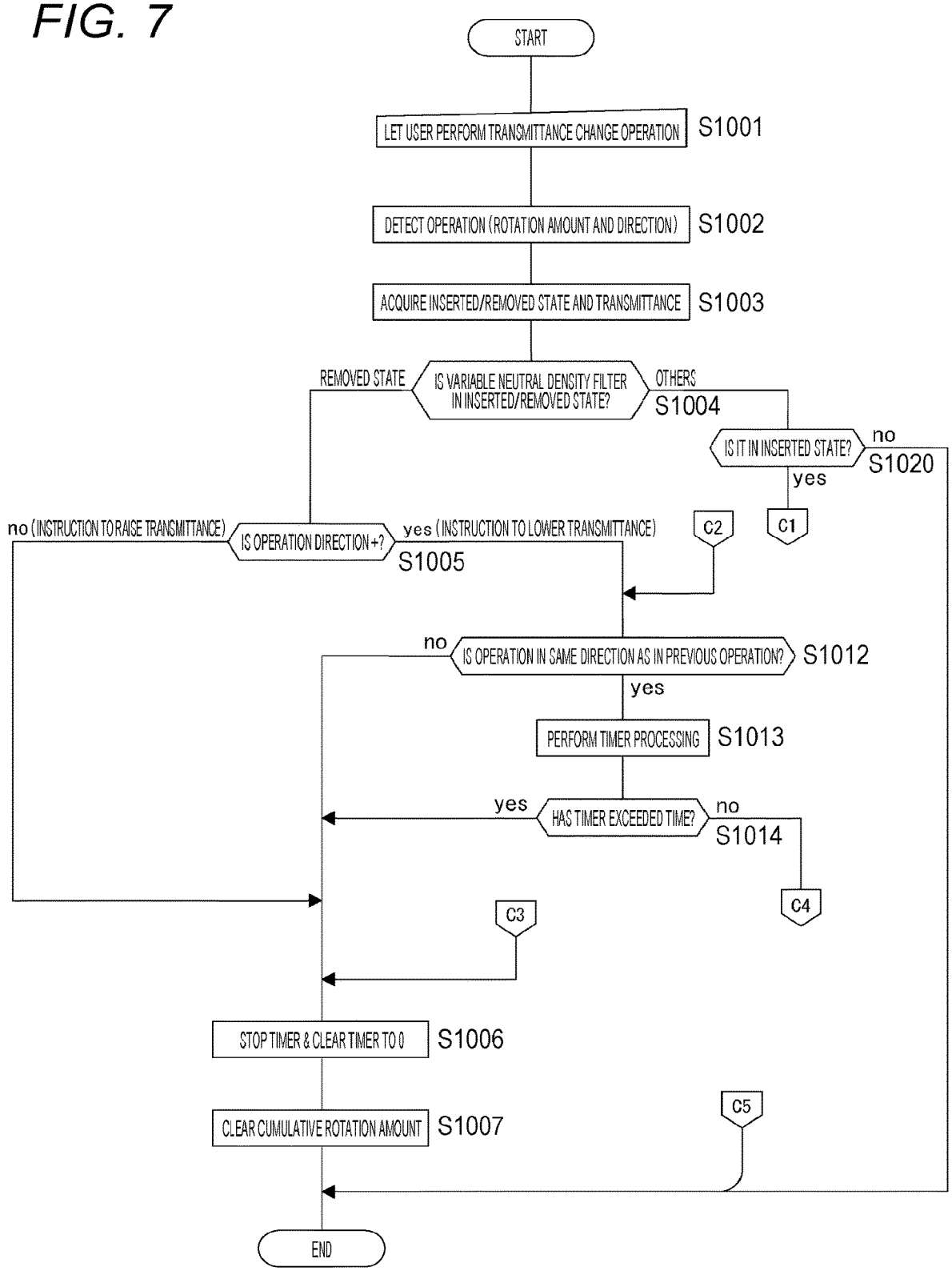
FIG. 7 is a flowchart of an operation handling process according to the first embodiment.
Figure 8:
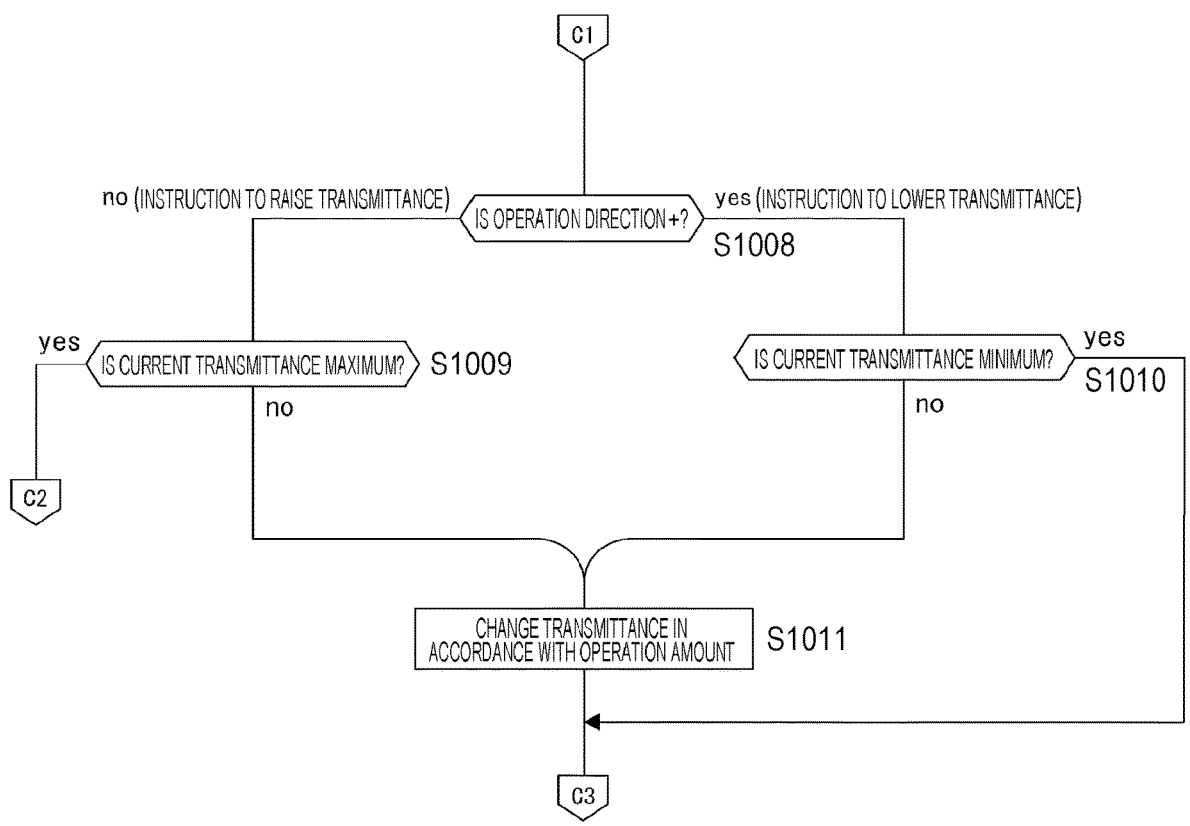
FIG. 8 is a flowchart of an operation handling process according to the first embodiment.
Figure 9:
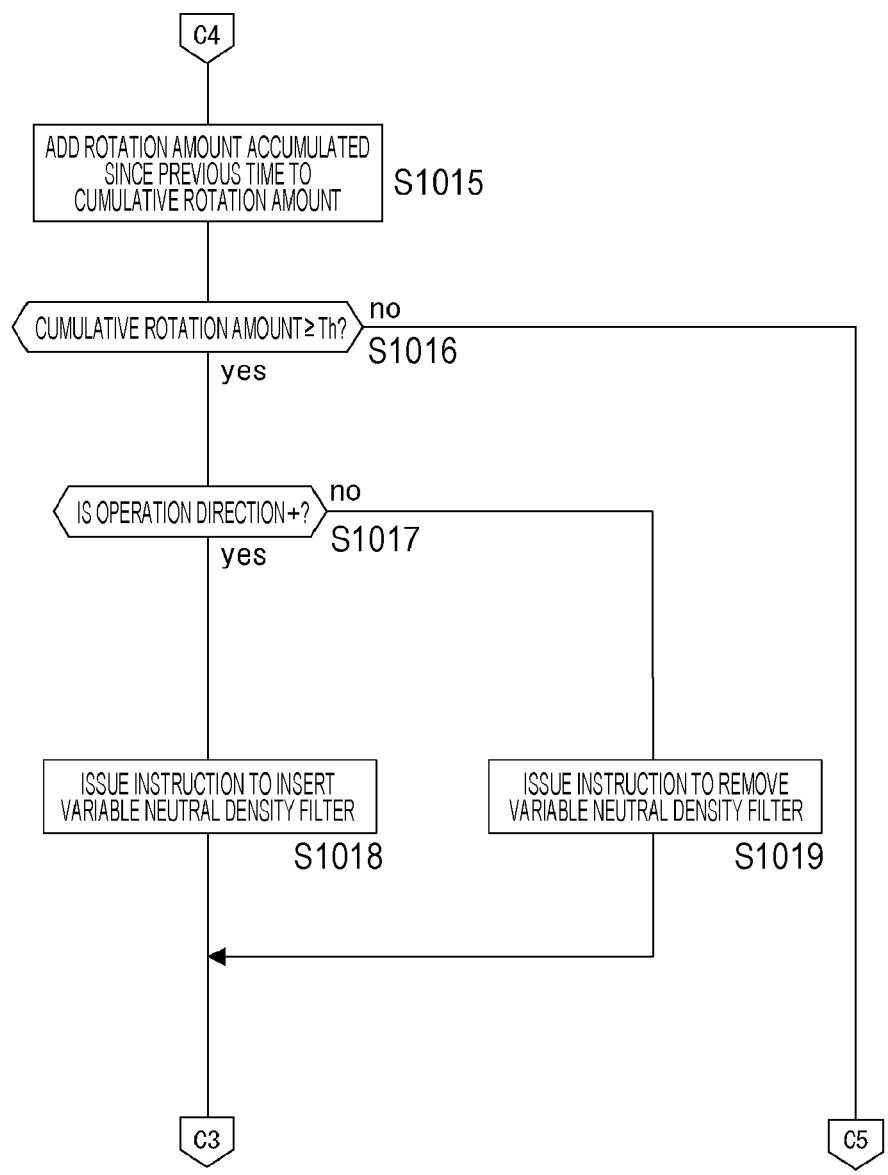
FIG. 9 is a flowchart of an operation handling process according to the first embodiment.

Example processes as the first embodiment, or example processes to be performed by the filter control unit 110 in response to an operation of the transmittance operator 9 are now described, with reference to FIGS. 7, 8, and 9.

Note that FIGS. 7, 8, and 9 show a series of flowcharts in a divided manner, and "C1", "C2", "C3", "C4", and "C5" each represent a continuing portion.

The filter control unit 110 performs polling control at regular time intervals throughout the flowchart in FIGS. 7, 8, and 9. The polling intervals are sufficiently shorter than a user operation or time determination (one second, for example) in a dead zone. For example, a polling cycle herein is 50 msec.

In step S1001 in FIG. 7, the filter control unit 110 checks an input action (an operation of the transmittance operator 9) from the user. Even in a case where the input value is 0, the processes that follow are performed, but the state does not change.

In step S1002, the filter control unit 110 acquires the operation amount (the rotation amount and the rotation direction) of the transmittance operator 9 via the operation amount/direction detection unit 101. In this case, the rotation direction and the rotation amount of the transmittance operator 9 as the amount of change after the previous polling process time are input to the filter control unit 110.

In step S1003, the filter control unit 110 acquires the current state (the inserted/removed state and the transmittance) of the variable neutral density filter 102 via the insertion/removal control unit 117 and the variable transmittance drive unit 108. The filter control unit 110 determines the target value of the transmittance and the presence/absence of insertion/removal, on the basis of the information acquired herein and the amount of relative change in the operation amount.

In step S1004, the filter control unit 110 determines the current inserted/removed state of the variable neutral density filter 102, from the information acquired in step S1003.

If the variable neutral density filter 102 is in a removed state at the removal position, the filter control unit 110 moves on to step S1005.

If the variable neutral density filter 102 is not in a removed state, on the other hand, the filter control unit 110 moves on to step S1020, and determines whether or not the variable neutral density filter 102 is in an inserted state at the insertion position. If the variable neutral density filter 102 is in an inserted state, the filter control unit 110 moves on to step S1008 in FIG. 8.

If the variable neutral density filter 102 is neither in a removed state nor in an inserted state, or insertion or removal is in progress, this polling process comes to an end after step S1020 in FIG. 7.

If the variable neutral density filter 102 is in a removed state, and the filter control unit 110 moves on to step S1005, the filter control unit 110 determines the direction of rotation of the transmittance operator 9 operated by the user.

Note that, in each flowchart, the counterclockwise direction is written as the + direction, and the clockwise direction is written as the − direction.

If the rotation is in the + direction (the counterclockwise direction: the direction for lowering the transmittance) in step S1005, the filter control unit 110 moves on to step S1012. If the rotation is in the—direction (the clockwise direction: the direction for raising the transmittance), the filter control unit 110 moves on to step S1006.

In the case of the − direction, the variable neutral density filter 102 is in a removed state, and the operation is in the direction for raising the transmittance. However, the removed state of the variable neutral density filter 102 in this case is the maximum transmittance state, and cannot change any more. Therefore, the operation of the transmittance operator 9 is ignored, and the process moves on to the end process.

In steps S1006 and S1007, the filter control unit 110 resets the timer and the cumulative rotation amount for determining a dead zone.

In this example, a dead zone is "a rotation amount smaller than a predetermined amount within a predetermined time", and the two parameters of time and the rotation amount are used. However, in steps S1006 and S1007, a process of clearing these two parameters is performed.

As for time, a compare and match function of the timer 118 is stopped in step S1006, which will be described later in detail. In step S1007, the cumulative rotation amount obtained by accumulating operation amounts (rotation amounts) of rotating operations is cleared.

After steps S1006 and S1007 are sequentially carried out, the sequence of one polling process comes to an end.

If the variable neutral density filter 102 is in an inserted state at the time of step S1004, and the process moves on to step S1008 in FIG. 8 via step S1020, the filter control unit 110 determines the direction of rotation of the transmittance operator 9 operated by the user.

The filter control unit 110 then moves on to step S1010 if the operation is in the + direction (the counterclockwise direction: the direction for lowering the transmittance), and moves on to step S1009 if the operation is in the − direction (the clockwise direction: the direction for raising the transmittance).

In a case where the operation is in the—direction, and the process moves on to step S1009, the filter control unit 110 determines whether or not the current transmittance of the variable neutral density filter 102 is the maximum transmittance ($\frac{1}{4}$). If the transmittance is the maximum transmittance, the filter control unit 110 moves on to step S1012 in FIG. 7. If not, the filter control unit 110 moves on to step S1011 in FIG. 8.

In a case where the operation is in the + direction, and the process moves on to step S1010, the filter control unit 110 determines whether or not the current transmittance of the variable neutral density filter 102 is the minimum transmittance ($\frac{1}{128}$). If the transmittance is the minimum transmittance, the filter control unit 110 moves on to step S1006 in FIG. 7. If not, the filter control unit 110 moves on to step S1011 in FIG. 8.

If the transmittance is the minimum transmittance in step S1010, the transmittance cannot be lowered any further. Therefore, the operation of the transmittance operator 9 is ignored. After sequentially carrying out steps S1006 and S1007 in FIG. 7, the filter control unit 110 ends the sequence of one polling process.

In step S1011 in FIG. 8, the filter control unit 110 calculates the transmittance change amount corresponding to the operation amount, and issues a target transmittance setting instruction to the variable transmittance drive unit 108.

In this case, when the operation amount is large with respect to the margin for the transmittance setting, and the transmittance reflecting the operation amount exceeds the maximum or minimum transmittance, the limit is set at the maximum or minimum transmittance, and the overflow operation amount is discarded.

For example, in a case where the current transmittance is "$\frac{1}{8}$", the transmittance operator 9 reaches the maximum transmittance "$\frac{1}{4}$" through a $\frac{1}{4}$ rotation in the − direction, and a $\frac{1}{2}$ rotation is detected in the − direction, the transmittance "$\frac{1}{4}$" is set in the variable transmittance drive unit 108, and the operation instruction for the excess "$\frac{1}{4}$" ($=\frac{1}{2}-\frac{1}{4}$) rotation is discarded.

It might be possible to add the excess amount as the cumulative amount during the time of a dead zone. However, in a case where the time of a polling cycle is sufficiently short as in this example, the excess rotation amount can be almost ignored, and does not give the user a feeling of strangeness.

After completing step S1011, the filter control unit 110 sequentially carries out steps S1006 and S1007 in FIG. 7, and then ends the sequence of one polling process.

Steps S1012, S1013, and S1014 in FIG. 7 are processes related to a dead zone.

The transition route to step S1012 is only from step S1005 and from step S1009 in FIG. 8.

The transition from step S1005 occurs in a case where the variable neutral density filter 102 is in a removed state and is operated in the direction for lowering the transmittance.

The transition from step S1009 occurs in a case where the variable neutral density filter 102 is in an inserted state and in the maximum transmittance state and is operated in the direction for raising the transmittance.

An outline of control related to a dead zone is as follows: timer measurement is started after it enters a dead region; the transmittance operator 9 continues to be operated in an insertion instruction direction in a removed state or in a removal instruction direction in an inserted state within a predetermined time (three seconds, for example); and, in a case where an operation with a predetermined rotation amount (one rotation of the dial of the transmittance operator 9, for example) is performed, it is determined to have moved out of the dead zone, and an insertion instruction or a removal instruction is issued. In a case where the predetermined time has passed, or the transmittance operator 9 is operated in the reverse direction even once during measurement, the cumulative rotation amount is cleared, and the timer is stopped and cleared.

In step S1012, the filter control unit 110 determines whether or not the operation has been performed in the same direction as the previous polling.

Therefore, the filter control unit 110 stores the previous rotation direction detected by the operation amount/direction detection unit 101, and determines whether or not the previous rotation direction matches the current detection result. If the operation direction of the transmittance operator 9 is the same as the previous operation direction, the filter control unit 110 moves on to step S1013. If not, the filter control unit 110 moves on to step S1006. If any amount of operation has not been generated since the previous time, the previous direction is held, and the process moves on to step S1013.

In step S1013, the filter control unit 110 performs timer processing. If the timer is in a stopped state at this point of time, the timer is started.

The timer 118 has a compare and match function, and all the timer processing in this example uses the compare and match function. In step S1013, if the compare and match timing is not set, the compare and match timing is set three seconds after the current time. At the time of compare and match, only a time excess flag is set by interrupt processing. After completion of this process, the filter control unit 110 moves on to step S1014.

In step S1014, the filter control unit 110 determines whether or not the time excess flag is set through the compare and match by the timer 118 (whether or not three seconds have passed).

If the timer has not exceeded three seconds, the filter control unit 110 moves on to step S1015 in FIG. 9. If the timer has exceeded three seconds, the filter control unit 110 moves on to step S1006.

If an operation in a different direction from the previous time is detected in step S1012, or if it is determined that the timer has exceeded three seconds in step S1014, the filter control unit 110 sequentially carries out steps S1006 and S1007, and then ends the sequence of one polling process. In this case, the timer is stopped and cleared to zero, and the cumulative rotation amount is cleared, so that the process related to determination of a dead zone is returned to the initial state.

In a case where the timer has not exceeded three seconds, and the process moves from step S1014 on to step S1015 in FIG. 9, the filter control unit 110 adds the operation amount accumulated since the previous time (the displacement amount of the rotation amount) to the cumulative rotation amount, and moves on to step S1016.

In step S1016, the filter control unit 110 determines whether or not the cumulative rotation amount is equal to or larger than a predetermined dead zone threshold Th. For example, the dead zone threshold Th is one rotation of the dial of the transmittance operator 9 or the like.

If the cumulative rotation amount is neither equal to nor larger than the dead zone threshold Th, the filter control unit 110 ends the polling process. In this case, the filter control unit 110 ends the process, without carrying out steps S1006 and S1007 in FIG. 7. That is, the dead zone determination is continued.

If the cumulative rotation amount is equal to or larger than the dead zone threshold Th, the filter control unit 110 moves on to step S1017 in FIG. 9. The transition to step S1017 is synonymous with giving an insertion instruction or a removal instruction after exiting a dead region.

In step S1017, the filter control unit 110 determines the rotation direction of the transmittance operator 9 operated by the user. If the rotation direction is the + direction, the filter control unit 110 moves on to step S1018. If not, the filter control unit 110 moves on to step S1019.

If the filter control unit 110 moves on to step S1018, the filter control unit 110 issues an instruction to the insertion/removal control unit 117 to insert the variable neutral density filter 102.

If the filter control unit 110 moves on to step S1019, on the other hand, the filter control unit 110 issues an instruction to the insertion/removal control unit 117 to remove the variable neutral density filter 102.

After performing the process in step S1018 or S1019, the filter control unit 110 stops and clears the timer to zero, and clears the cumulative rotation amount in steps S1006 and S1007 in FIG. 7. The filter control unit 110 then ends the polling process.

As the above processes in FIGS. 7, 8, and 9 are performed, transmittance control and insertion/removal of the variable neutral density filter 102 are performed in accordance with user's operations of the transmittance operator 9. Furthermore, the control is performed by one operating unit (the transmittance operator 9) as described above with reference to FIG. 5, and dead zone setting is realized.

2. Second Embodiment

Figure 10:
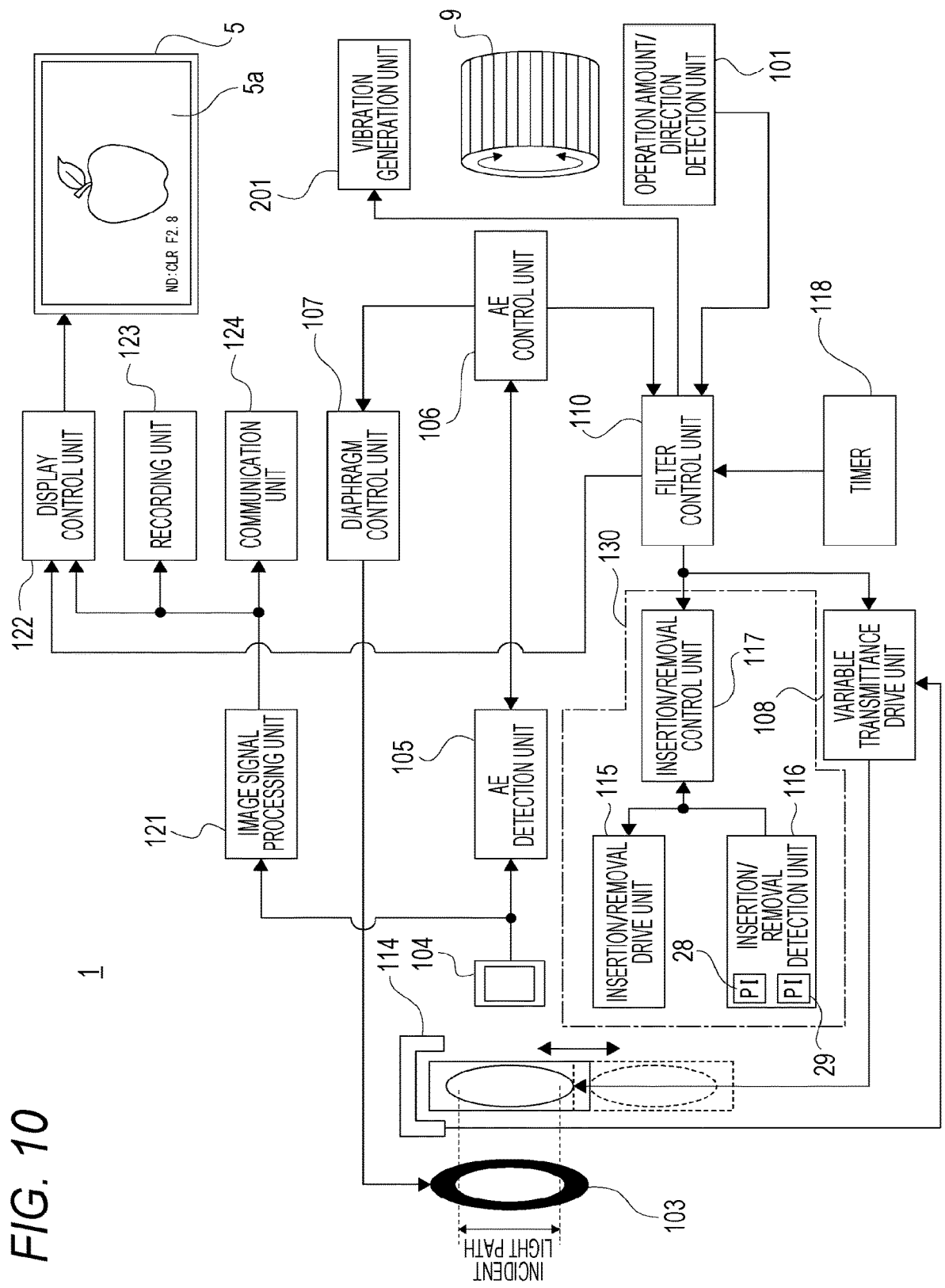
FIG. 10 is a block diagram of an example internal configuration of an imaging apparatus according to a second embodiment.

FIG. 10 shows the configuration of an imaging apparatus 1 according to a second embodiment. Note that the same components as those in FIG. 2 are denoted by the same reference numerals as those used in FIG. 2, and explanation of them is not repeated herein.

The configuration in FIG. 10 is substantially similar to that shown in FIG. 2, but includes a vibration generation unit 201 as an additional element. In the second embodiment, a clicking feeling is given to the transmittance operator 9 at a time of a dial operation of the transmittance operator 9 in a dead region, to tactilely notify the user that the operation can be an insertion/removal operation.

Note that the dial of the transmittance operator 9 is an operation system that does not have a clicking feeling and can be steplessly adjusted.

The vibration generation unit 201 is a rotary actuator, for example. The vibration generation unit 201 has nothing connected to its rotating shaft, and is used for applying vibration. The vibration generation unit 201 is disposed at a position at which rotation of the dial of the transmittance operator 9 is not hindered, and is preferably disposed inside the rotating member of the transmittance operator 9. Alternatively, the vibration generation unit 201 may be disposed on a side surface of the rotating member of the transmittance operator 9, the back surface of the housing in the vicinity of the transmittance operator 9, or the like.

However, vibration of the vibration generation unit 201 must adversely affect image capturing (particularly, moving image capturing). For example, it is necessary to prevent images from blurring due to vibration, and prevent direct sound due to vibration or vibration sound due to housing resonance from entering recorded sound. Therefore, it is necessary to take such influence into consideration when selecting the actuator as the vibration generation unit 201 and determining the installation position of the vibration generation unit 201.

The natural frequency of an actuator is given as an input signal to the vibration generation unit 201, so that large vibration can be easily generated. When a short pulse is applied to this, short-wave vibration is generated, and thus, the user can feel clicking in the transmittance operator 9. The polling cycles are shortened, and a short pulse is applied every predetermined rotation amount (every $\frac{1}{32}$ rotation, for example), a clicking feeling is caused in the transmittance operator 9.

Figure 11:
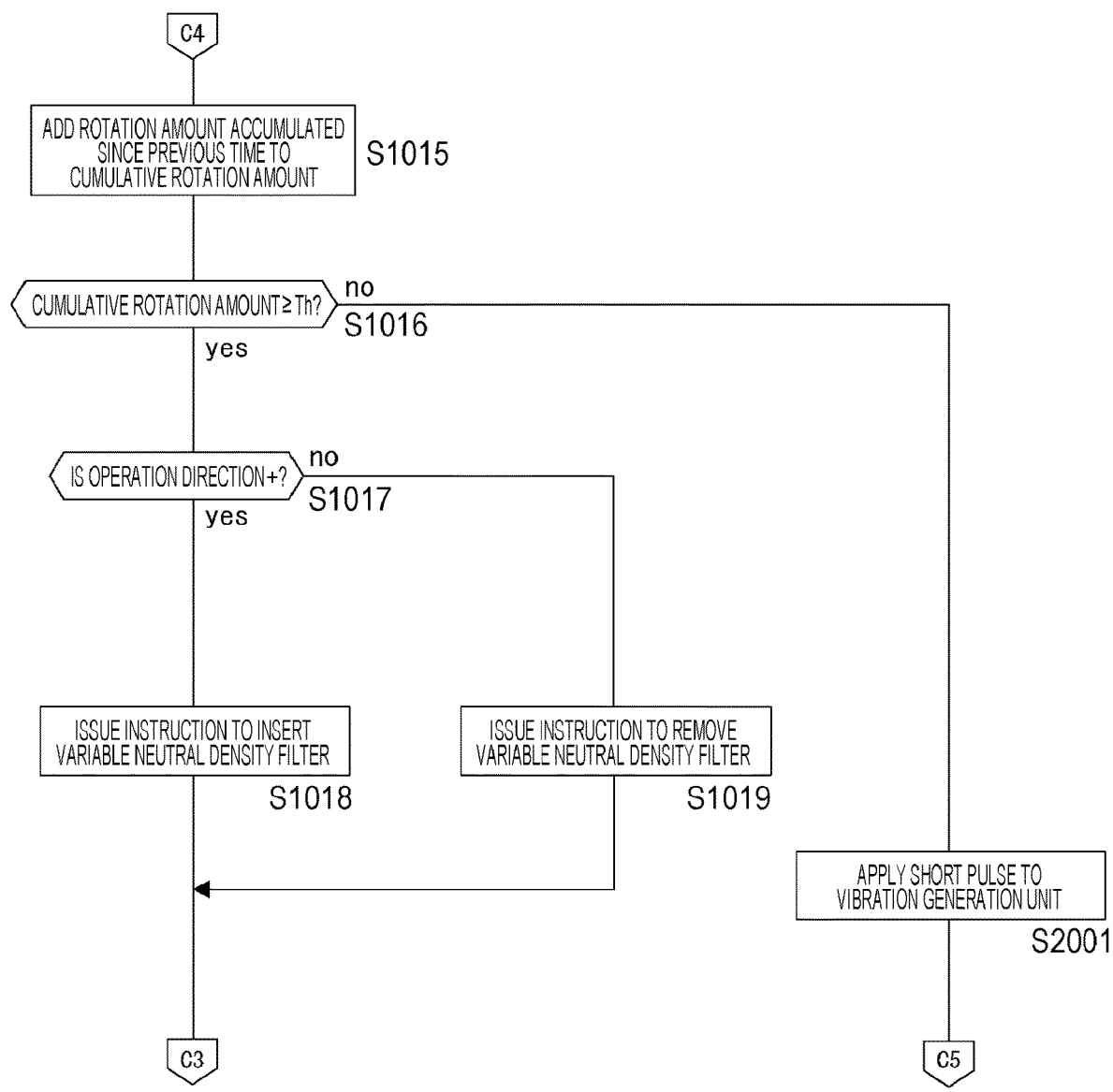
FIG. 11 is a flowchart of an operation handling process according to the second embodiment.

FIG. 11 shows part of example processes according to the second embodiment. Note that FIG. 9 is replaced with FIG. 11 in the processes shown in FIGS. 7, 8, and 9 of the first embodiment. That is, the flowcharts shown in FIGS. 7, 8, and 11 show example processes to be performed by the filter control unit 110 according to the second embodiment.

In the first embodiment described above, the polling process is ended when the cumulative rotation amount is smaller than the predetermined value Th in step S1016 in FIG. 9. In the second embodiment, however, the process in step S2001 is performed in this case, as shown in FIG. 11.

The process being performed by the filter control unit 110 moves from step S1016 on to step S2001 in FIG. 11 in a case where the transmittance operator 9 is operated in the + direction while the variable neutral density filter 102 is in a removed state, and in a case where the transmittance operator 9 is operated in the—direction while the variable neutral density filter 102 is in an inserted state and has the maximum transmittance. That is, these cases are situations where the transmittance operator 9 is operated in a dead region.

However, strictly speaking, the cases include a case where the operation amount is 0 in a dead region. This is because, in a case where the operation amount is 0 in step S1012 in FIG. 7, the previous state is kept, and the process moves on to step S1013.

In step S2001 in FIG. 11, the filter control unit 110 gives the vibration generation unit 201 the number of pulses proportional to the operation amount of the transmittance operator 9 from the previous polling, and gives vibration (=a clicking feeling) to the transmittance operator 9.

For example, in a case where one click is given to a 1/32 rotation of the dial of the transmittance operator 9, and one click corresponds to one pulse of 1-2 phase excitation of the actuator of the vibration generation unit 201, when a rotation amount of 1/16 is detected, two pulses are applied to the vibration generation unit 201, to generate vibration equivalent to two clicks.

Preferably, the polling cycles are such that polling can be performed every 1/32 rotation or less with respect to the rotation speed of the transmittance operator 9 that can be operated by the user.

This is because a clicking feeling in this example is caused electrically, instead of mechanically. Therefore, generation of clicking feelings is restricted by the polling cycles, and a clicking feeling might give a feeling of strangeness in an operation when the polling cycle is long.

Although a clicking feeling is generated by the vibration generation unit 201 with respect to an operation in a dead region by the process in step S2001 described above, there are various other methods for notifying the user of a dead region. For example, it is possible to perform various kinds of transmission, such as providing a display unit to display a warning to the user (visual transmission), or providing an electromagnetic brake in the transmittance operator 9 and applying a sense of resistance to a rotating operation with the brake, to achieve tactile transmission to the user.

3. Third Embodiment

Next, a third embodiment in which a warning of a dead zone is transmitted to the user by a warning display (visual transmission) on a display unit is described.

For example, FIGS. 12A and 12B show example displays on a display 5.

For example, as shown in FIG. 12A, a transmittance display 300 normally indicates a transmittance of "1/1" (a removed state) as "ND: CLR" or the like related to transmittance, and the F value as "F2.8" or the like.

When the transmittance operator 9 is operated in a direction for lowering the transmittance in a dead region in the removed state shown FIG. 12A, a warning is displayed with a pop-up display 301 as shown in FIG. 12B.

For example, a message such as "ND Filter Insert in a little more . . . " is displayed. That is, an insertion warning is displayed to warn the user that the variable neutral density filter 102 will be inserted if the current operation is continued.

When the user operates the transmittance operator 9 further in the same direction, the variable neutral density filter 102 is inserted, and the warning display disappears.

Note that a warning is displayed in a manner similar to the above at a time of an operation in a dead region to switch from an inserted state to a removed state. In that case, a removal warning such as "ND Filter Remove in a little more . . . " is displayed, for example.

The configuration of the imaging apparatus 1 may be similar to that in FIG. 2 (or FIG. 10). However, as indicated by dashed lines in FIG. 2, the filter control unit 110, the diaphragm control unit 107, and the AE control unit 106 notify the display control unit 122 of information for display.

The diaphragm control unit 107 notifies the display control unit 122 of the F value.

The AE control unit notifies the display control unit 122 of information about the automatic mode and the manual mode regarding exposure control.

The filter control unit 110 notifies the display control unit 122 of information about the transmittance and the insertion/removal warning.

Note that, in practice, a microcomputer that has the functions of the filter control unit 110, the diaphragm control unit 107, and the AE control unit 106 may notify the display control unit 122 of these pieces of information. Alternatively, in a case where the filter control unit 110, the diaphragm control unit 107, and the AE control unit 106 are separate chips, the display control unit 122 may be notified of the respective pieces of the above information via mutual communication.

Figure 13:
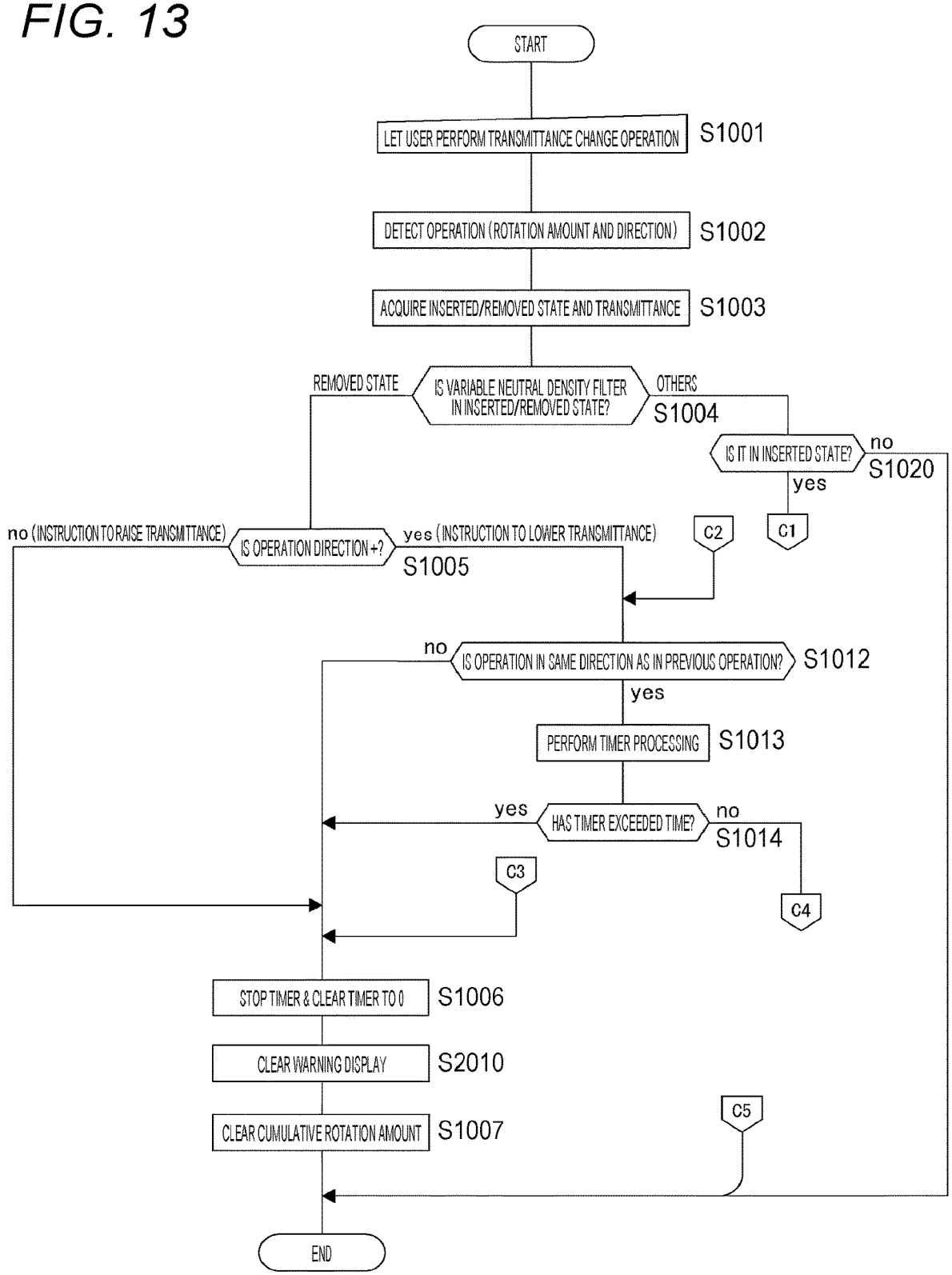
FIG. 13 is a flowchart of an operation handling process according to the third embodiment.
Figure 14:
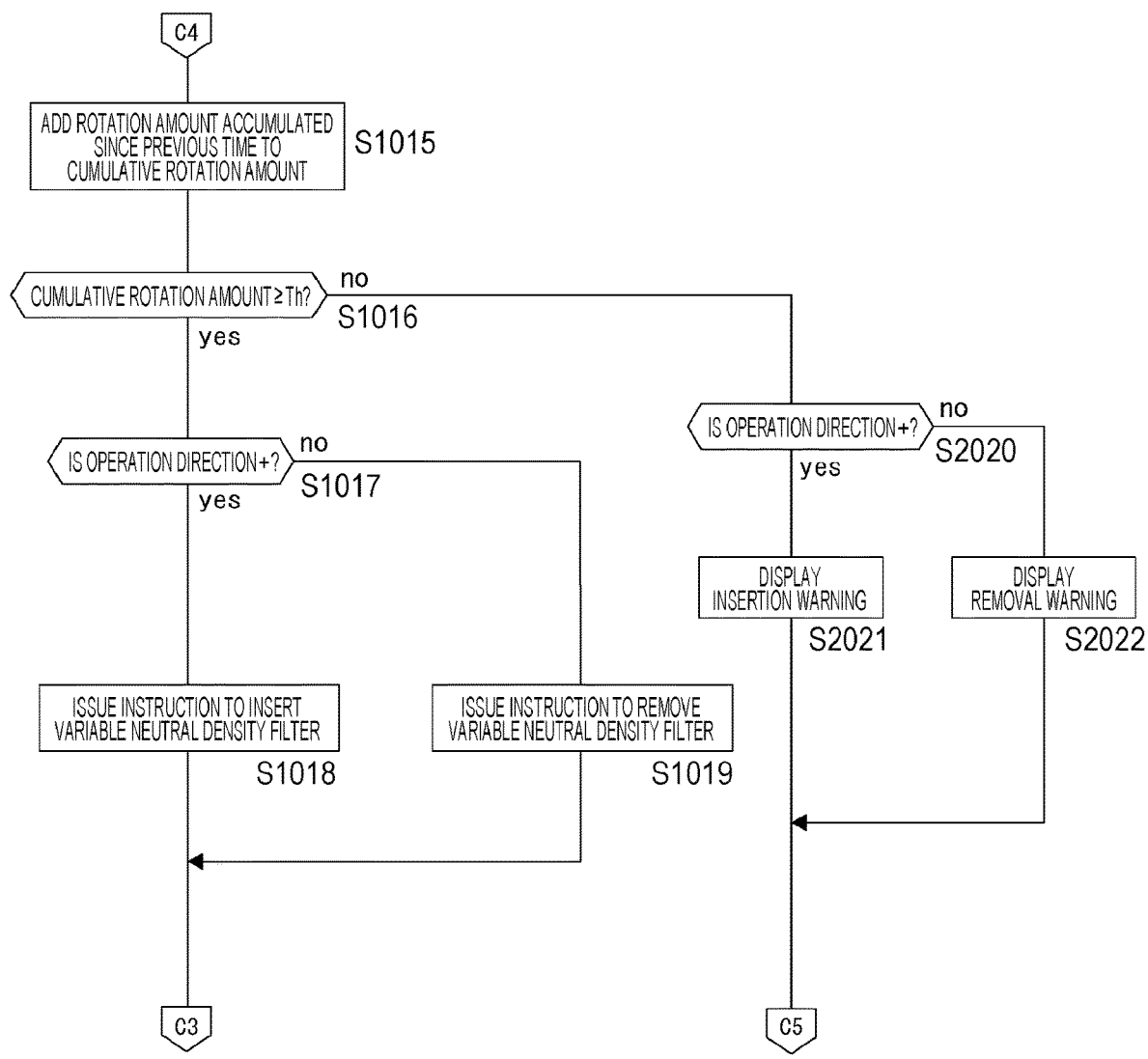
FIG. 14 is a flowchart of an operation handling process according to the third embodiment.

Example processes for displaying such a warning are shown in FIGS. 13 and 14.

Note that FIG. 13 shows a process replacing FIG. 7, and FIG. 14 shows a process replacing FIG. 9. Accordingly, example processes according to the third embodiment are shown in the flowcharts in FIGS. 13, 8, and 14.

In FIG. 9 of the first embodiment, the polling process is ended when the cumulative rotation amount is smaller than the predetermined value Th in step S1016. In the third embodiment, however, the processes in steps S2020, S2021, and S2022 are performed in this case, as shown in FIG. 14.

The filter control unit 110 moves from step S1016 on to step S2020 in FIG. 14 in a case where the transmittance operator 9 is operated in the + direction while the variable neutral density filter 102 is in a removed state, and in a case where the transmittance operator 9 is operated in the − direction while the variable neutral density filter 102 is in an inserted state and has the maximum transmittance. That is, these cases are situations where the transmittance operator 9 is operated in a dead region.

In step S2020, a check is made to determine whether or not the operation direction is +, and the process branches.

If the operation direction is +, the filter control unit 110 moves on to step S2021, and causes the display control unit 122 to perform an insertion warning display as shown in FIG. 12B.

If the operation direction is −, the filter control unit 110 moves on to step S2022, and causes the display control unit 122 to perform a removal warning display.

The process in FIG. 13 is substantially similar to that in FIG. 7, except that step S2010 is added. That is, even if a warning display is being performed, the warning display is ended in the polling process that leads to step S2010.

For example, when a warning display has been performed by a dead zone operation so far, the operation is further continued. When the variable neutral density filter 102 is inserted or removed as a valid operation, the process moves from step S1018 or S1019 in FIG. 14 on to steps S1006, S2010, and S1007 in FIG. 13, and the warning display is ended at that time.

Further, in a case where the process moves from step S1012 on to step S2010, the user operation switches to an operation in the direction opposite to the direction leading to insertion or removal. Therefore, in a case where a warning display has been performed so far, the warning display is ended.

Furthermore, in a case where the process moves from step S1014 on to step S2010, the timer has passed the time while the user operation (particularly, a state in which the operation amount is 0) continues without leaving the dead zone, and therefore, the warning display is ended, though the warning display has been displayed until then.

In the above manner, the user can recognize an operation in a dead zone from a warning display.

Also, a warning display is ended when a valid operation to move out of a dead zone is performed, an operation is not performed thereafter, or a reverse operation is performed. That is, a warning is displayed only when an operation leading to insertion or removal of the variable neutral density filter 102 is performed, so that the display is effective for the user.

Next, another example of a warning display regarding an operation in a dead zone is described.

Figure 15:
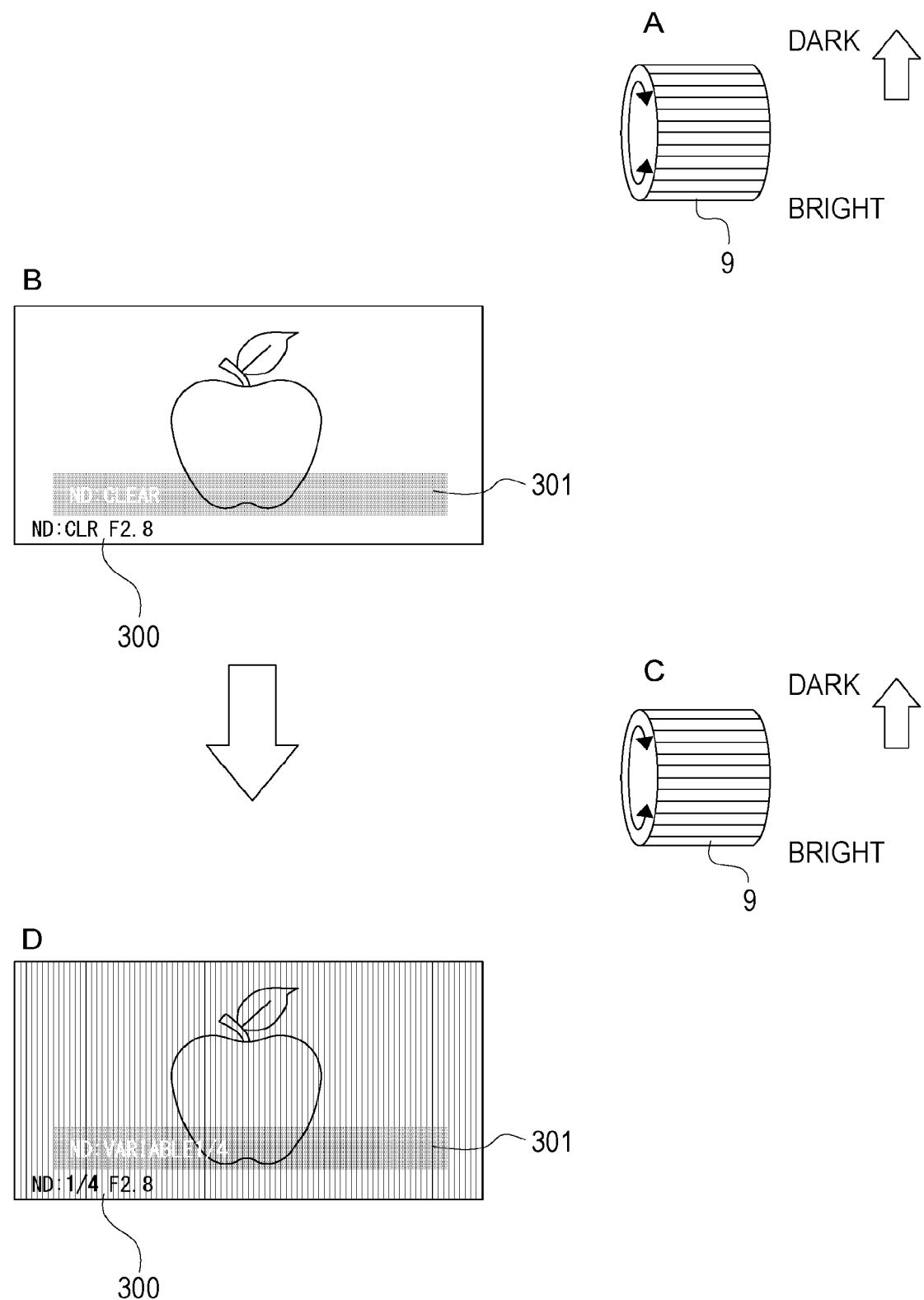
FIG. 15 is diagrams for explaining another example warning display (at a time of insertion) according to the third embodiment.

FIG. 15 illustrates a case where an operation to lower the transmittance is performed when the variable neutral density filter 102 is in a removed state.

As shown in FIG. 15A, when the variable neutral density filter 102 is in a removed state, the transmittance operator 9 is rotated counterclockwise in an operation to lower the transmittance. This is an operation in a dead region.

At this point of time, a message such as "ND: CLEAR" is displayed by the pop-up display 301 as shown in FIG. 15B, for example. This message indicates that the current transmittance is "1/1" (a removed state), and is displayed at a time of an operation in the direction for inserting the variable neutral density filter 102. Thus, this message notifies the user that:

the variable neutral density filter 102 is currently at the removal position; and if the operation is continued in the direction for lowering the transmittance, the variable neutral density filter 102 will be inserted. This message also has a meaning as an insertion warning display to warn that the variable neutral density filter 102 will be inserted.

Note that, if any operation is not performed after that, the pop-up display 301 in FIG. 15B disappears when a predetermined time has elapsed.

If the user continues to rotate the transmittance operator 9 counterclockwise as shown in FIG. 15C and performs an operation with a cumulative rotation amount beyond the dead region, a message such as "ND: VARIABLE ¼" is displayed by the pop-up display 301 as shown in FIG. 15D, for example, and the variable neutral density filter 102 is inserted. This message display in FIG. 15D indicates that the variable neutral density filter 102 has been inserted, and the current transmittance is "¼".

Note that the value indicating the transmittance, such as "ND: ¼ F2.8", is also changed in the transmittance display 300.

Figure 16:
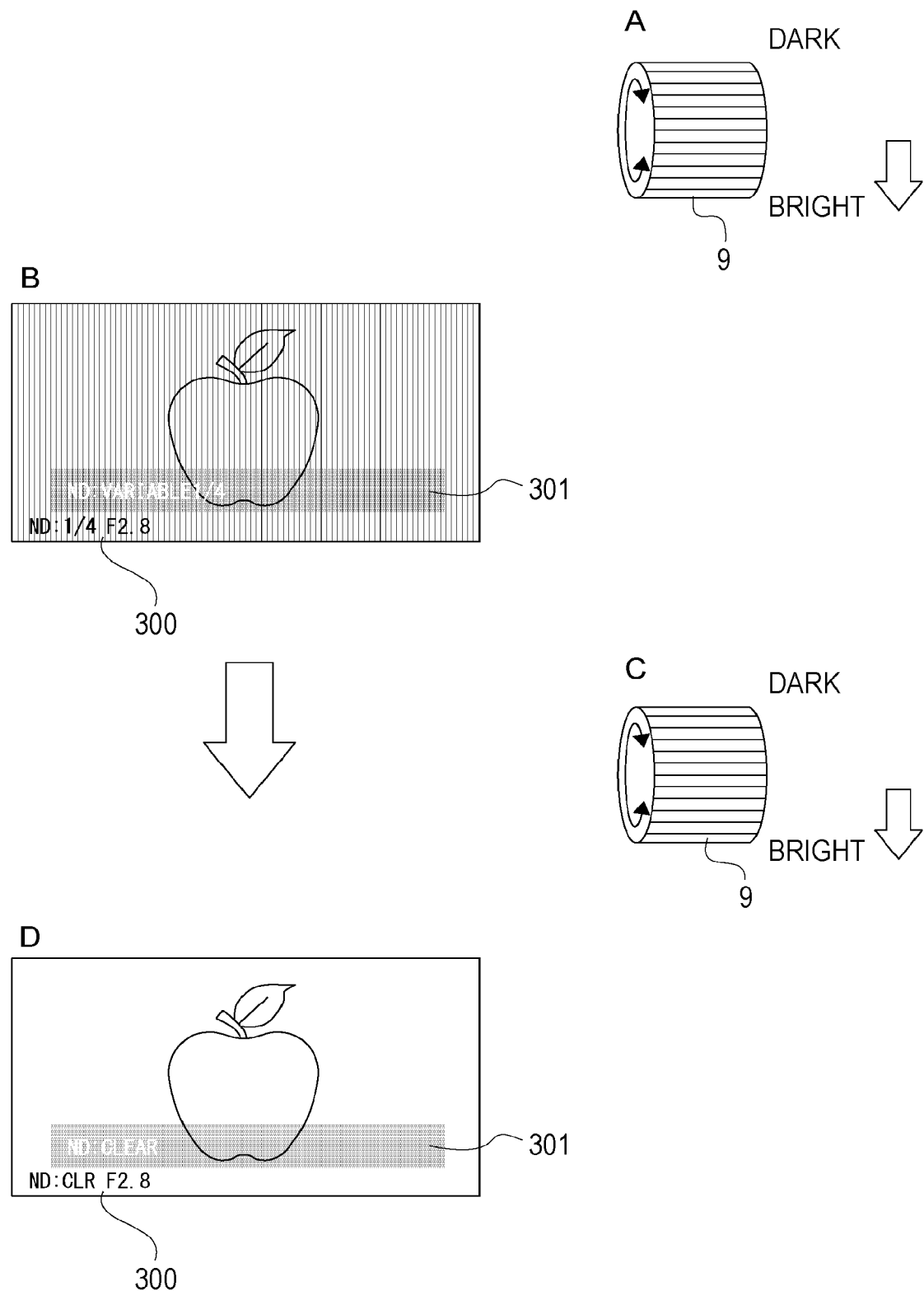
FIG. 16 is diagrams for explaining another example warning display (at a time of removal) according to the third embodiment.

FIG. 16 illustrates a case where an operation to raise the transmittance is performed when the variable neutral density filter 102 is in an inserted state and has the maximum transmittance.

In this case, as shown in FIG. 16A, the transmittance operator 9 is rotated clockwise in an operation in the direction for raising the transmittance. This is an operation in a dead region.

At this point of time, a message such as "ND: VARIABLE ¼" is displayed by the pop-up display 301 as shown in FIG. 16B, for example. This message indicates that the current transmittance is "¼" in an inserted state, and is displayed at a time of an operation in the direction for removing the variable neutral density filter 102. Thus, this message notifies the user that:

the variable neutral density filter 102 is currently at the insertion position, and has the maximum transmittance; and if the operation is continued in the direction for raising the transmittance, the variable neutral density filter 102 will be removed. This message also has a meaning as a removal warning display to warn that the variable neutral density filter 102 will be removed.

Note that, if any operation is not performed after that, the pop-up display 301 in FIG. 16B disappears when a predetermined time has elapsed.

If the user continues to rotate the transmittance operator 9 clockwise as shown in FIG. 16C and performs an operation with a cumulative rotation amount beyond the dead region, a message such as "ND: CLEAR" is displayed by the pop-up display 301 as shown in FIG. 16D, for example, and the variable neutral density filter 102 is removed. This message display in FIG. 16D indicates that the variable neutral density filter 102 has been removed, and the current transmittance is "1/1".

Note that the value indicating the transmittance, such as "ND: CLR F2.8", is also changed in the transmittance display 300.

Figure 17:
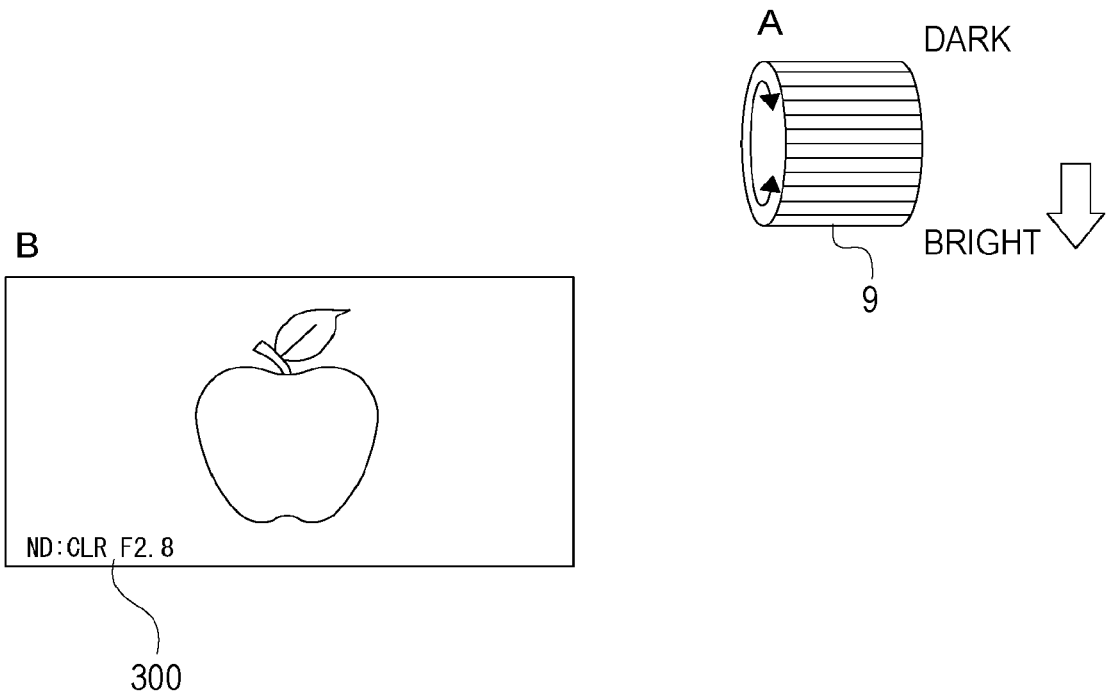
FIG. 17 is diagrams for explaining another example warning display (no warnings displayed) according to the third embodiment.
Figure 18:
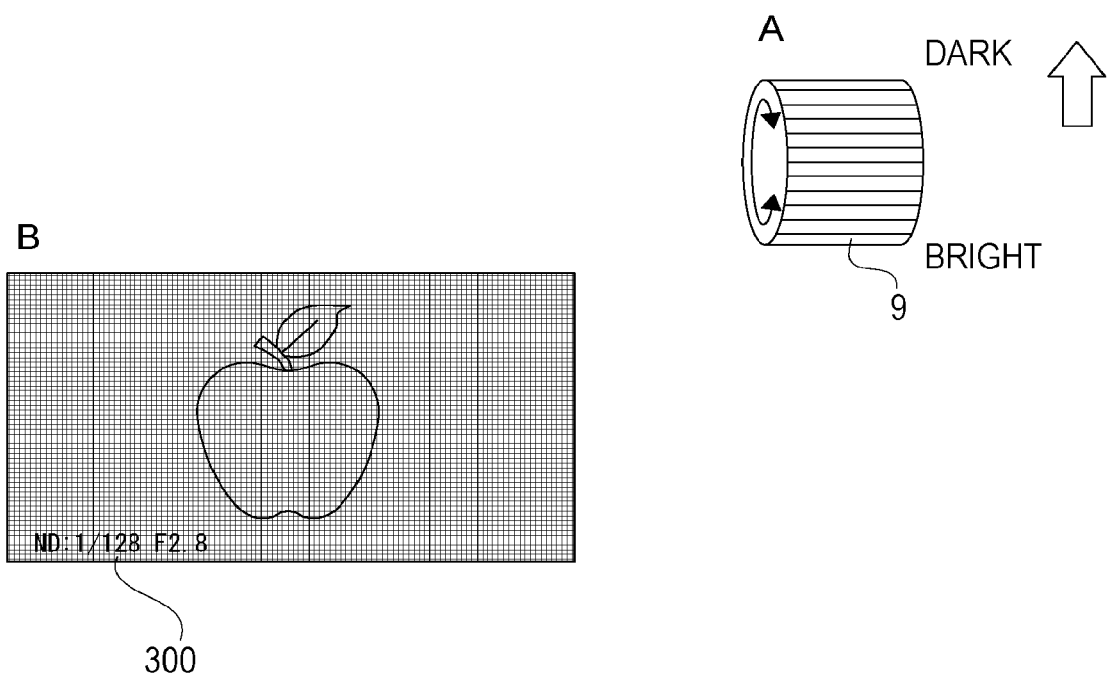
FIG. 18 is diagrams for explaining another example warning display (no warnings displayed) according to the third embodiment.

FIGS. 17 and 18 illustrate a case where the pop-up display 301 for a warning as described above is not displayed.

FIG. 17A shows that the transmittance operator 9 is rotated clockwise in an operation to raise the transmittance, when the variable neutral density filter 102 is in a removed state. In this case, the transmittance does not change any further, and therefore, the pop-up display 301 is not performed, as shown in FIG. 17B.

FIG. 18A shows that the transmittance operator 9 is rotated counterclockwise in an operation to lower the transmittance, when the variable neutral density filter 102 is in an inserted state and has the minimum transmittance ($1/128$). In this case, the transmittance does not change any further, and therefore, the pop-up display 301 is not performed either, as shown in FIG. 18B.

Examples of warning displays described above with reference to FIGS. 15, 16, 17, and 18 are realized as follows in the flowcharts shown in FIGS. 13, 8, and 14 described above.

The pop-up display 301 ("ND: CLEAR") in FIG. 15B is performed as the insertion warning display in step S2021 in FIG. 14.

The pop-up display 301 ("ND: VARIABLE ¼") in FIG. 15D is only required to be displayed in place of the insertion warning display, when the process moves from step S1018 in FIG. 14 on to steps S1006 and S2010 in FIG. 13.

The pop-up display 301 ("ND: VARIABLE ¼") in FIG. 16B is performed as the removal warning display in step S2022 in FIG. 14.

The pop-up display 301 ("ND: CLEAR") in FIG. 16D is only required to be displayed in place of the removal warning display, when the process moves from step S1019 in FIG. 14 on to steps S1006 and S2010 in FIG. 13.

The pop-up display 301 is not performed as in FIG. 17, because any waning display is not to be performed in a case corresponding to the case where the process moves from step S1005 on to step S1006 in FIG. 13.

The pop-up display 301 is not performed as in FIG. 18, because any warning display is not to be performed in a case corresponding to the case where the process moves from step S1010 in FIG. 8 to step S1006 in FIG. 13.

Note that message content as warning displays are of course not limited to the above examples.

Also, in the above examples, the pop-up display 301 is performed in the sense of a warning display according to an operation in a dead region. However, the pop-up display 301 indicating the transmittance may be performed not only at a time of an operation in a dead region but also for presenting a transmittance change.

For example, in a case where an operation to further lower the transmittance is performed after the state switches to an inserted state as shown in FIG. 15D, the pop-up display 301, such as "ND: VARIABLE ⅛", "ND: VARIABLE ¹⁄₁₆", . . . , and "ND: VARIABLE ¹⁄₁₂₈", may be displayed every time the transmittance changes. Conversely, as the transmittance is raised in an inserted state, the change in the transmittance is of course presented by the pop-up display 301.

Such a pop-up display 301 is displayed for a predetermined time, such as three seconds, for example, and is then erased.

Even with this arrangement, for example, a display "ND: CLEAR" as shown in FIG. 15B indicates to the user that "the variable neutral density filter 102 is currently at the removal position, but, if the operation is continued as it is, the variable neutral density filter 102 will be inserted". That is, the display can function as a warning display.

4. Fourth Embodiment

An example in which a dead zone is expanded during recording is now described as a fourth embodiment.

As described above, a dead zone is provided to make it difficult for the user to inadvertently perform insertion or removal. Furthermore, insertion and removal should be avoided most during recording. Therefore, during recording of a moving image, for example, the dead zone is made larger than in an operation not related to recording, so that it becomes difficult for the user to insert or remove the variable neutral density filter 102.

Figure 19:
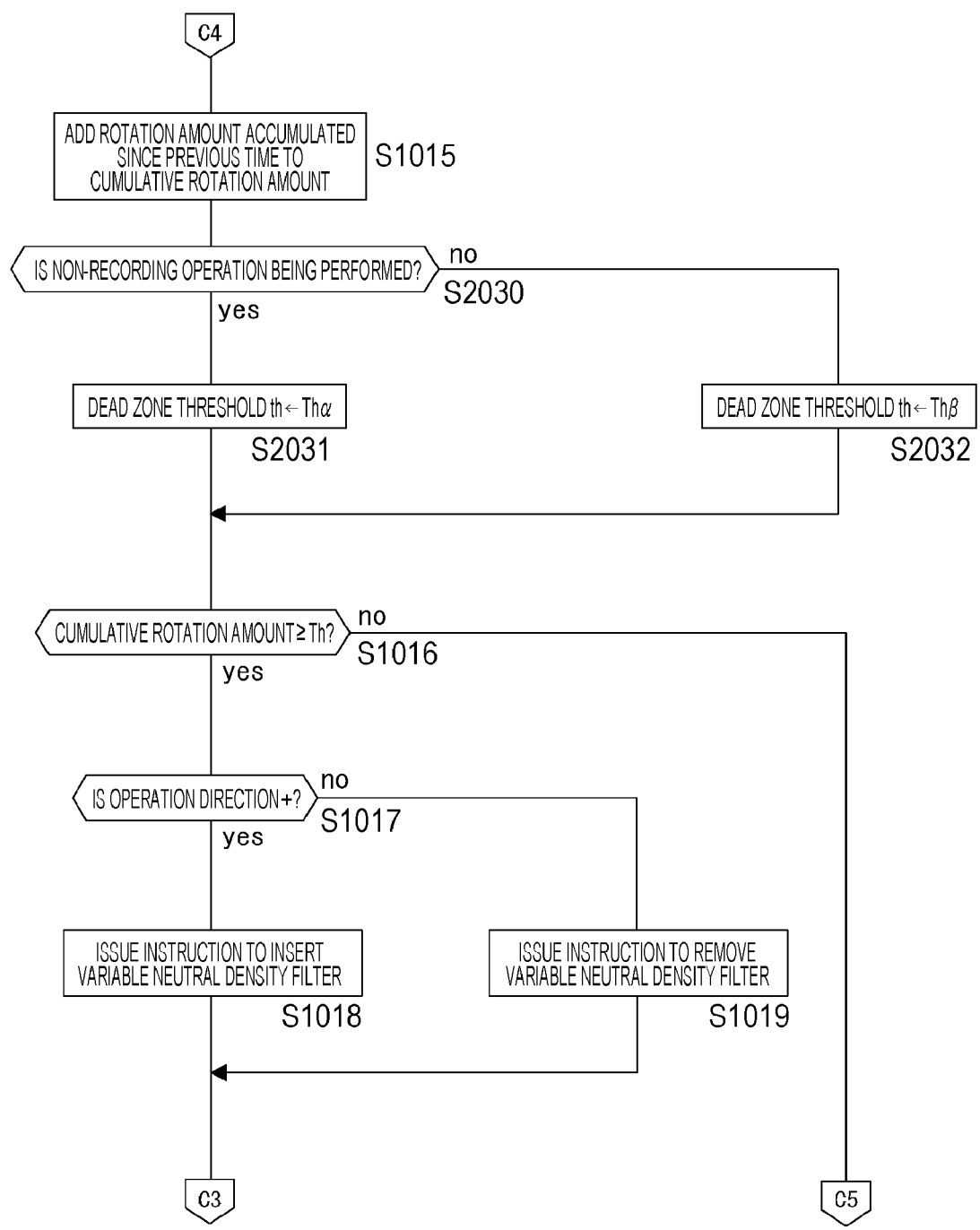
FIG. 19 is a flowchart of an operation handling process according to a fourth embodiment.

FIG. 19 shows an example process.

Note that FIG. 19 is a process replacing FIG. 9, and accordingly, example processes according to the fourth embodiment are shown in the flowcharts in FIGS. 7, 8, and 19.

In FIG. 19, steps S2030, S2031, and S2032 are added to the process shown in FIG. 9.

After adding the operation amount (the displacement amount of the rotation amount) accumulated since the previous time to the cumulative rotation amount in step S1015, the filter control unit 110 moves on to step S2030, and determines whether or not a non-recording operation is being performed (recording is not being performed). The process then branches.

If a non-recording operation is being performed, the filter control unit 110 moves on to step S2031, and assigns a value Thα to the dead zone threshold Th.

If a non-recording operation is not being performed (that is, if recording is being performed), on the other hand, the filter control unit 110 moves on to step S2032, and assigns a value Thβ to the dead zone threshold Th.

Here, Thα<Thβ. For example, Thβ=2*Thα.

After that, in step S1016, the filter control unit 110 determines whether or not the cumulative rotation amount is equal to or larger than the dead zone threshold Th.

The steps that follow are similar to those in FIG. 9.

According to the fourth embodiment described above, the variable neutral density filter 102 is neither inserted nor removed during recording, unless the user consciously performs an operation with a large rotation amount in a short time. Accordingly, it is possible to increase the possibility of avoiding a situation in which the user forgets that the recording is being performed and inserts or removes the variable neutral density filter 102 by a usual operation.

5. Fifth Embodiment

Figure 20:
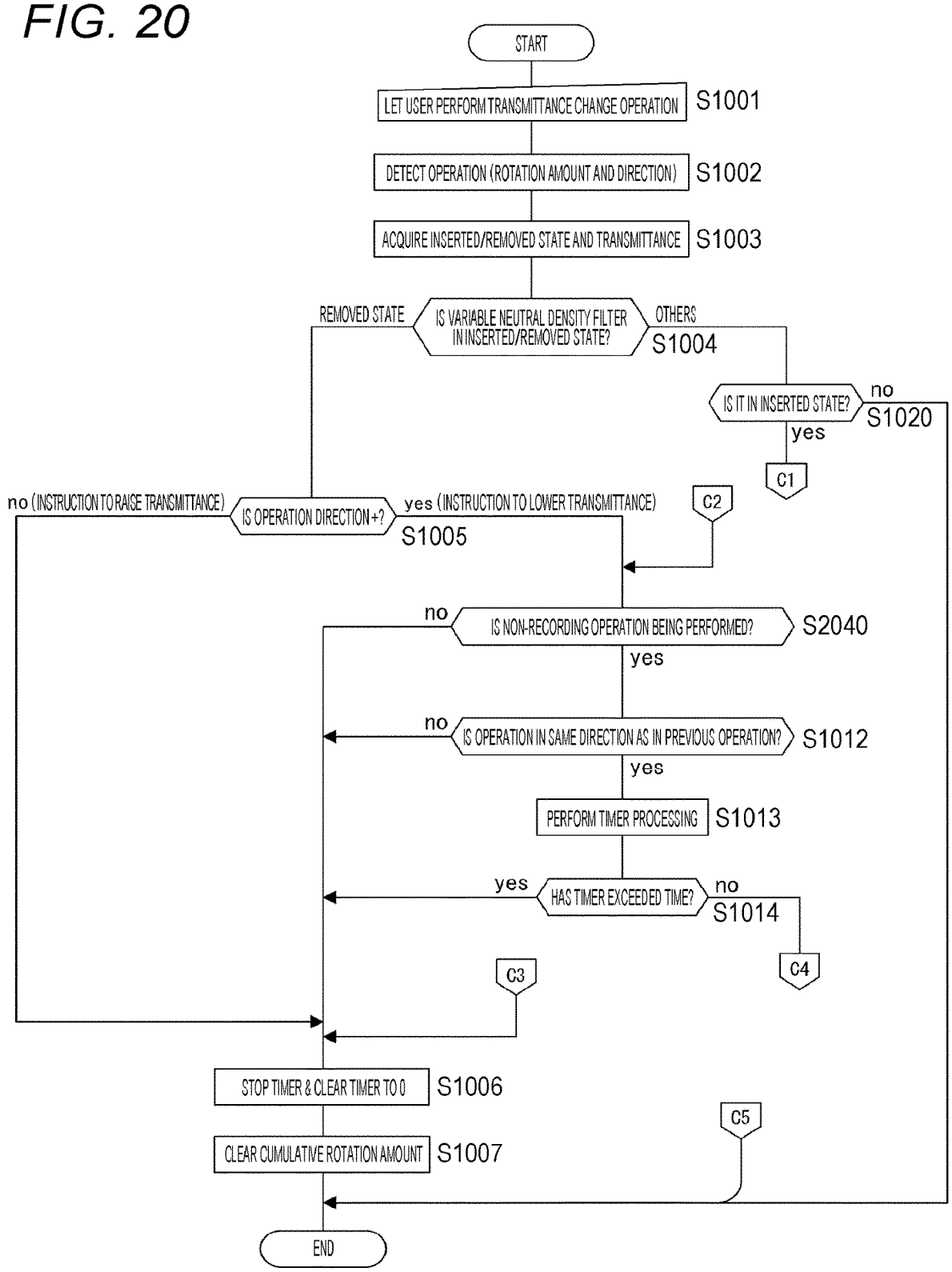
FIG. 20 is a flowchart of an operation handling process according to a fifth embodiment.

FIG. 20 shows an example process according to a fifth embodiment. Note that FIG. 20 is a process replacing FIG. 7, and accordingly, example processes according to the fifth embodiment are shown in the flowcharts in FIGS. 20, 8, and 9. The fifth embodiment is an example in which insertion and removal of the variable neutral density filter 102 is prohibited during recording.

FIG. 20 differs from FIG. 7 in that step S2040 is added.

The route in which the process being performed by the filter control unit 110 moves on to step S2040 is only from step S1005 and from step S1009 in FIG. 8.

The transition from step S1005 on to step S2040 occurs in a case where the variable neutral density filter 102 is in a removed state and is operated in the direction for lowering the transmittance.

The transition from step S1009 on to step S2040 occurs in a case where the variable neutral density filter 102 is in an inserted state and in the maximum transmittance state and is operated in the direction for raising the transmittance.

In step S2040, the filter control unit 110 determines whether or not a non-recording operation is currently being performed (recording is not being performed). The process then branches.

If a non-recording operation is being performed, the filter control unit 110 moves on to step S1012. The steps that follow are similar to those in FIG. 7.

If a non-recording operation is not being performed (that is, if recording is being performed), on the other hand, the filter control unit 110 performs the processes in steps S1006 and S1007, and then ends the sequence of one polling process. That is, during recording, when the variable neutral density filter 102 is in a removed state, the variable neutral density filter 102 is not inserted no matter how much the transmittance operator 9 is operated in the direction for lowering the transmittance.

Also, during recording, when the variable neutral density filter 102 is in an inserted state, the variable neutral density filter 102 is not removed no matter how much the transmittance operator 9 is operated in the direction for raising the transmittance.

Since neither insertion nor removal is not performed during recording as above, the influence of insertion/removal is prevented from appearing in the recorded image or sound.

6. Optical Block Mechanism Including a Variable Neutral Density Filter

The following is a description of the configuration of an optical block 10 including the variable neutral density filter 102 (see FIGS. 21 to 27).

Note that, in the description below, the forward, rearward, vertical, and transverse directions are as viewed from the imaging apparatus operator, with the lens barrel 8 attached to the main frame unit 3 of the imaging apparatus 1. Accordingly, the object side is the front side, and the imaging apparatus operator side is the rear side.

Note that the forward, rearward, vertical, and transverse directions described below are used for ease of explanation, and implementations of the present technology are not limited to these directions.

Figure 21:
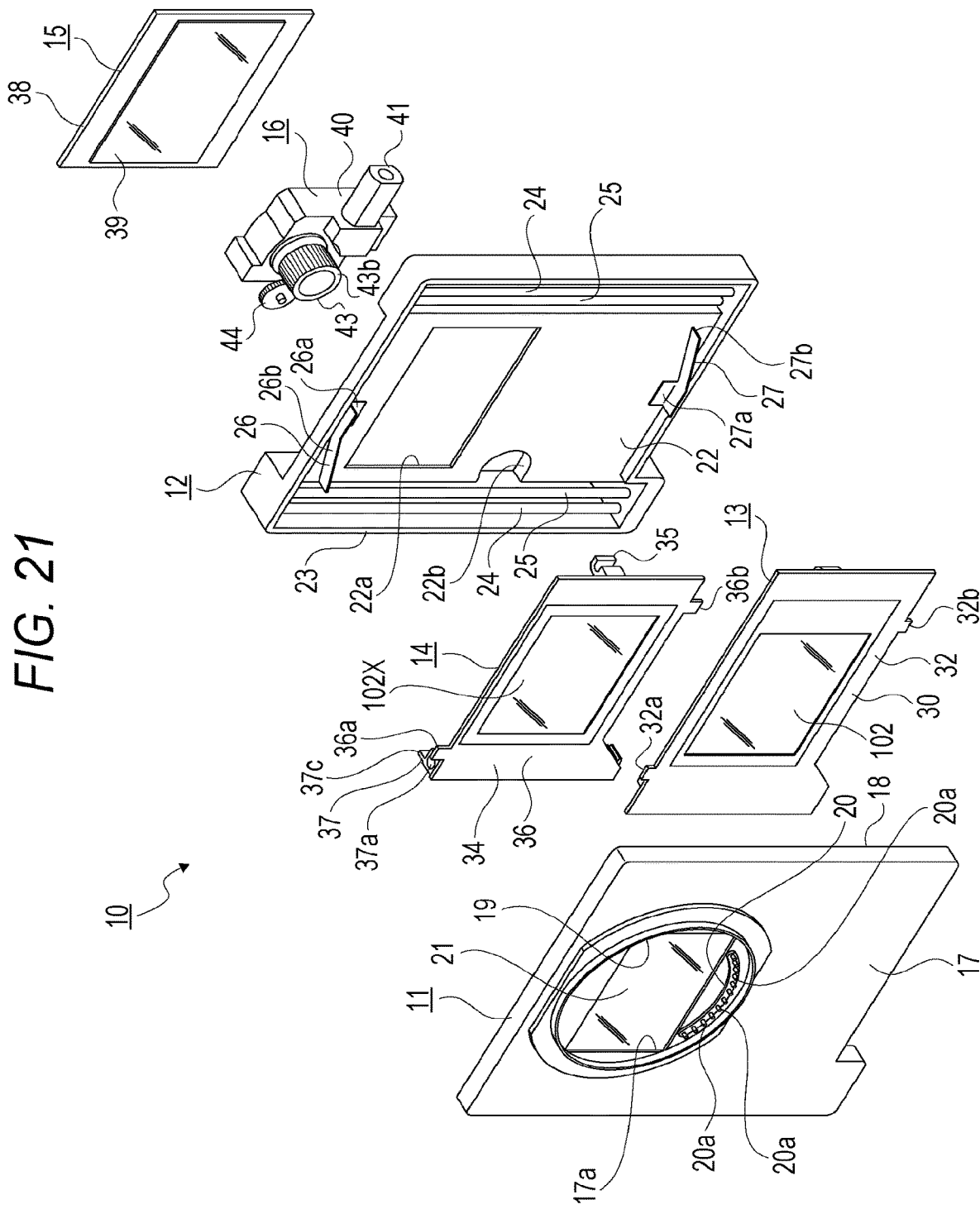
FIG. 21 is an exploded perspective view of an optical block according to an embodiment.
Figure 22:
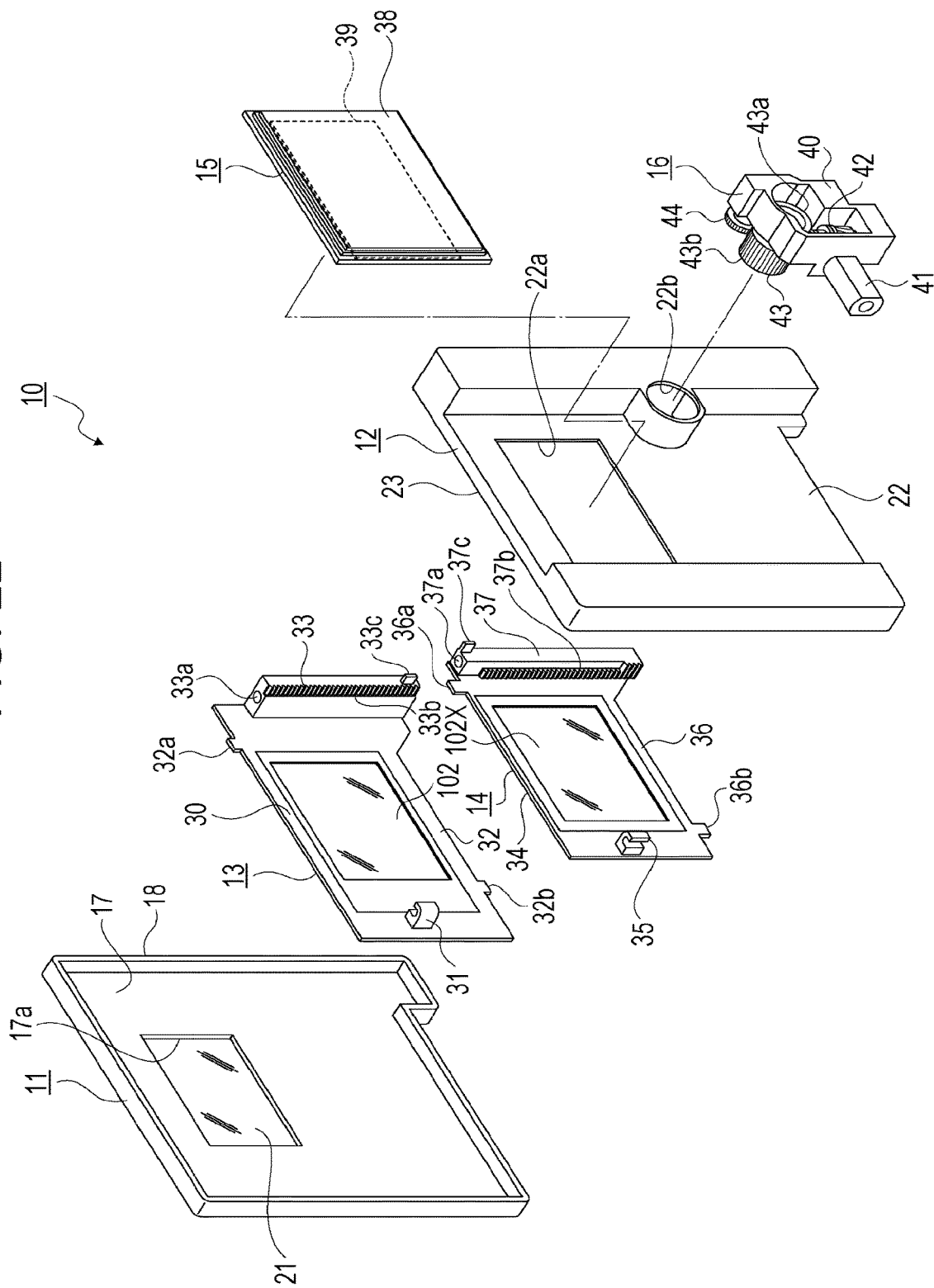
FIG. 22 is an exploded perspective view of the optical block as viewed from a direction different from that in FIG. 17.
Figure 23:
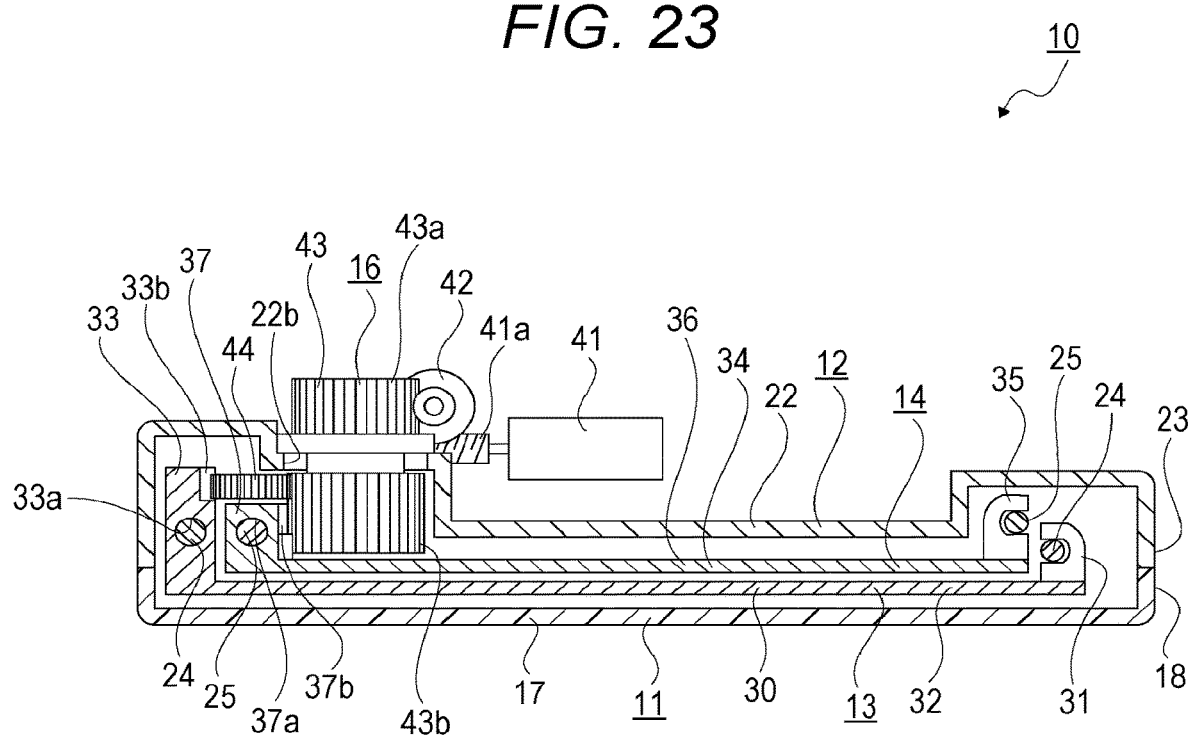
FIG. 23 is a cross-sectional view of the optical block, cut at a position including the drive mechanism.

The optical block 10 is disposed immediately behind the panel unit 4 inside the main frame unit 3, and includes a front base 11, a rear base 12, a first movable unit 13, a second movable unit 14, a device unit 15, and a drive mechanism 16 (see FIGS. 21 to 23).

The front base 11 includes: a base surface portion 17 that is formed in a substantially rectangular plate-like shape facing the front and rear sides; and a joining frame portion 18 that protrudes rearward from the outer peripheral portion of the base surface portion 17. The front base 11 has a rectangular transmission opening 17a in the upper half of the base surface portion 17. An annular portion 19 that protrudes forward is formed around the transmission opening 17a of the front base 11. A terminal placement portion 20 is provided on the inner peripheral side of the lower end portion of the annular portion 19, and a plurality of connection terminals 20a is disposed side by side in the circumferential direction in the terminal placement portion 20.

In a state where the lens barrel 8 is attached to the main frame unit 3, a plurality of electrode portions (not shown) provided on the rear end surface of the lens barrel 8 is connected to the respective connection terminal portions 20a. Thus, the main frame unit 3 and the lens barrel 8 are electrically connected to each other, and transmission and reception of signals and the like become possible between the main frame unit 3 and the lens barrel 8.

An infrared cut filter 21 is attached to the front base 11 so as to cover the transmission opening 17a from the rear side. The infrared cut filter 21 absorbs the light in the infrared region of external light taken in through the lens barrel 8, and the light suitable for imaging travels in the direction of the imaging device unit 104.

The rear base 12 includes: an attachment base portion 22 that is formed in a substantially rectangular plate-like shape facing the front and rear sides; and an outer frame portion 23 that protrudes forward from the outer peripheral portion of the attachment base portion 22. The rear base 12 has a rectangular incidence opening 22a in the upper half of the attachment base portion 22. In the attachment base portion 22, an insertion hole 22b penetrating forward and rearward is formed immediately below the incidence opening 22a. The insertion hole 22b is formed at a position closer to one end portion of the attachment base portion 22 in the transverse direction.

In the rear base 12, placement spaces 12a and 12b that are open on the front side are formed at both right and left end portions, respectively.

Figure 24:
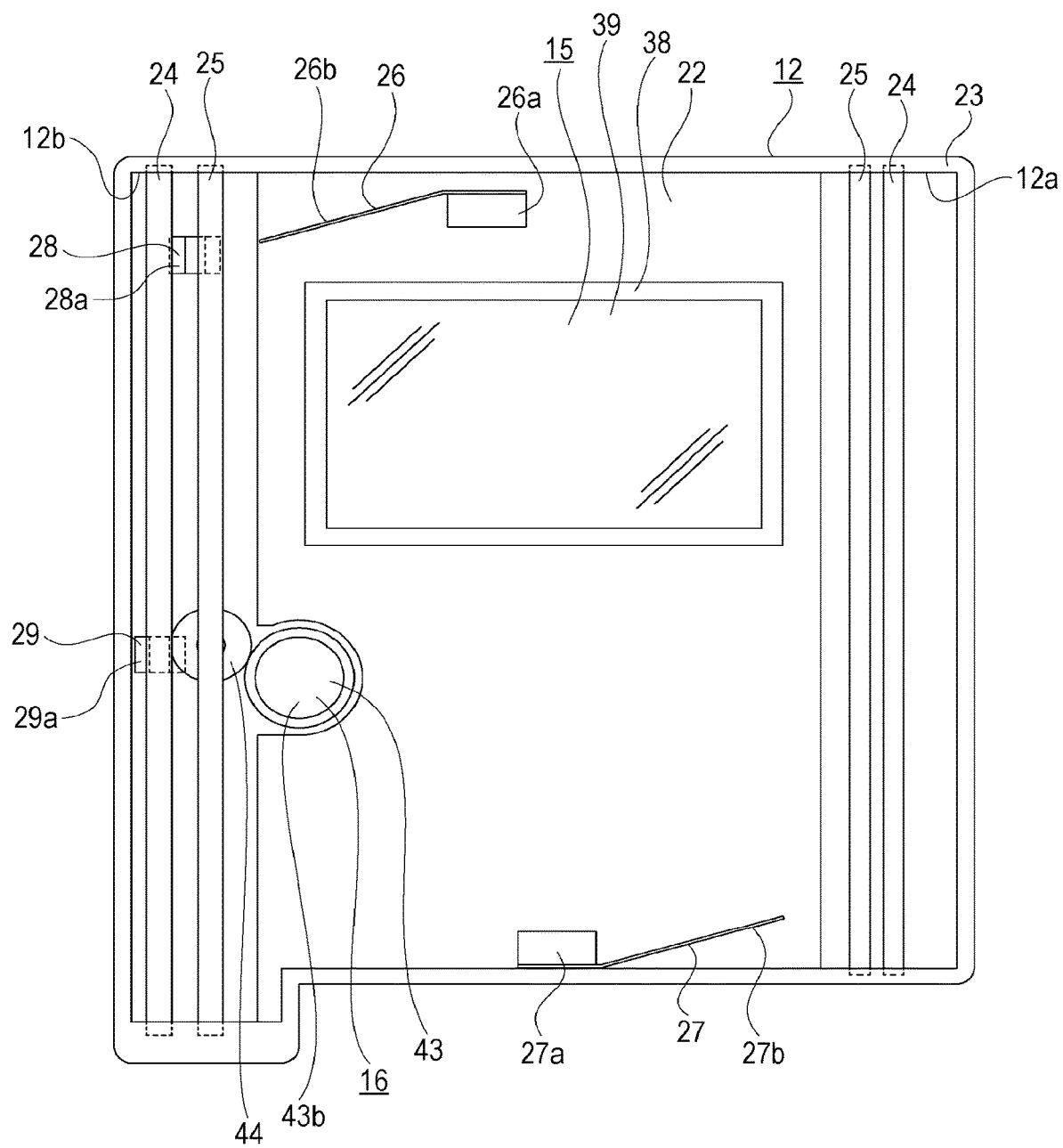
FIG. 24 is a front view of the optical block, with the first movable unit and the second movable unit being supported.

First guide shafts 24 and 24 and second guide shafts 25 and 25 are attached to the rear base 12 (see FIGS. 23 and 24).

The axial direction of the first guide shafts 24 and 24 are the vertical direction, and the first guide shafts 24 and 24 are attached to the rear base 12, as the upper and lower end portions are attached to the upper and lower end portions of the outer frame portion 23, respectively. The first guide shafts 24 and 24 are disposed in the placement spaces 12a and 12b, respectively.

The axial direction of the second guide shafts 25 and 25 is the vertical direction, and the second guide shafts 25 and 25 are attached to the rear base 12, as the upper and lower end portions are attached to the upper and lower end portions of the outer frame portion 23, respectively. The second guide shafts 25 and 25 are located in the placement spaces 12a and 12b, on the inner side of the first guide shafts 24 and 24, respectively.

A first spring 26 and a second spring 27 are attached to upper and lower end portions of the front surface of the attachment base portion 22, respectively.

The first spring 26 and the second spring 27 are leaf springs, for example, and include attached portions 26a and 27a and elastic deformation portions 26b and 27b, respectively. In the first spring 26, the attached portion 26a is attached to the upper end portion of the attachment base portion 22, and the elastic deformation portion 26b is elastically deformable in a substantially vertical direction with respect to the attached portion 26a.

In the second spring 27, the attached portion 27a is attached to the lower end portion of the attachment base portion 22, and the elastic deformation portion 27b is elastically deformable in a substantially vertical direction with respect to the attached portion 27a.

The elastic deformation portion 26b of the first spring 26 and the elastic deformation portion 27b of the second spring 27 are positioned closer to both end portions in the transverse direction of the attachment base portion 22.

The photodetector 28 and the photodetector 29 are attached to one end portion of the attachment base portion 22 in the transverse direction, and are separated from each other in the vertical. The photodetectors 28 and 29 are attached to the attachment base portion 22, penetrating the attachment base portion 22 in the forward/rearward direction. The front end portions thereof serve as detection portions 28a and 29a, respectively. The detection portions 28a and 29a are located in the placement space 12b, and each include a pair of protrusions separated from each other in the transverse direction.

The first movable unit 13 includes a filter holding portion 30, the variable neutral density filter 102, and a bearing 31 (see FIGS. 21 and 22).

The filter holding portion 30 includes a holding frame 32 having a substantially rectangular shape, and a guided projection 33 that projects rearward from one end portion of the holding frame 32 in the transverse direction.

The holding frame 32 includes an upper protruding portion 32a that protrudes upward, and a lower protruding portion 32b that protrudes downward. The upper protruding portion 32a is disposed at a position closer to one end portion in the transverse direction, and the lower protruding portion 32b is disposed at a position closer to the other end portion in the transverse direction.

A bearing hole 33a that vertically penetrates the guided projection 33 is formed in the guided projection 33. A rack portion 33b is formed on one surface of the guided projection 33 in the transverse direction. A detection target piece 33c protruding rearward is formed at the lower end portion of the guided projection 33.

The outer peripheral portion of the variable neutral density filter 102 is attached to the inner peripheral portion of the holding frame 32 in the filter holding portion 30, and the thickness direction of the variable neutral density filter 102 matches the optical axis direction (the forward/rearward directions) in the first movable unit 13. The variable neutral density filter 102 is a neutral density (ND) filter, and functions as a variable electronic filter whose light transmittance changes when a voltage is applied.

The bearing 31 is attached to the rear surface of the other end portion of the holding frame 32 in the transverse direction, and is open on the side of the rack portion 33b.

The second movable unit 14 includes a filter holding portion 34, a transparent filter 102X, and a bearing 35. The filter holding portion 34 includes a holding frame 36 having a substantially rectangular shape, and a guided projection 37 that projects rearward from one end portion of the holding frame 36 in the transverse direction. The size of the second movable unit 14 in the transverse direction is smaller than the size of the first movable unit 13 in the transverse direction, and the amount of projection of the guided projection 37 from the holding frame 36 is smaller than the amount of projection of the guided projection 33 from the holding frame 32 in the first movable unit 13.

The holding frame 36 includes an upper protruding portion 36a that protrudes upward, and a lower protruding portion 36b that protrudes downward. The upper protruding portion 36a is disposed at a position closer to one end portion in the transverse direction, and the lower protruding portion 36b is disposed at a position closer to the other end portion in the transverse direction.

A bearing hole 37a that vertically penetrates the guided projection 37 is formed in the guided projection 37. A rack portion 37b is formed on one surface of the guided projection 37 in the transverse direction. A detection target piece 37c protruding rearward is formed at the upper end portion of the guided projection 37.

The outer peripheral portion of the transparent filter 102K is attached to the inner peripheral portion of the holding frame 36 in the filter holding portion 34, and the thickness direction of the transparent filter 102X matches the optical axis direction in the second movable unit 14. No voltage is applied to the transparent filter 102X, and the transparent filter 102X does not have the functions of a variable electronic filter.

The bearing 35 is attached to the rear surface of the other end portion of the holding frame 36 in the transverse direction, and is open on the opposite side from the rack portion 37b.

Figure 25:
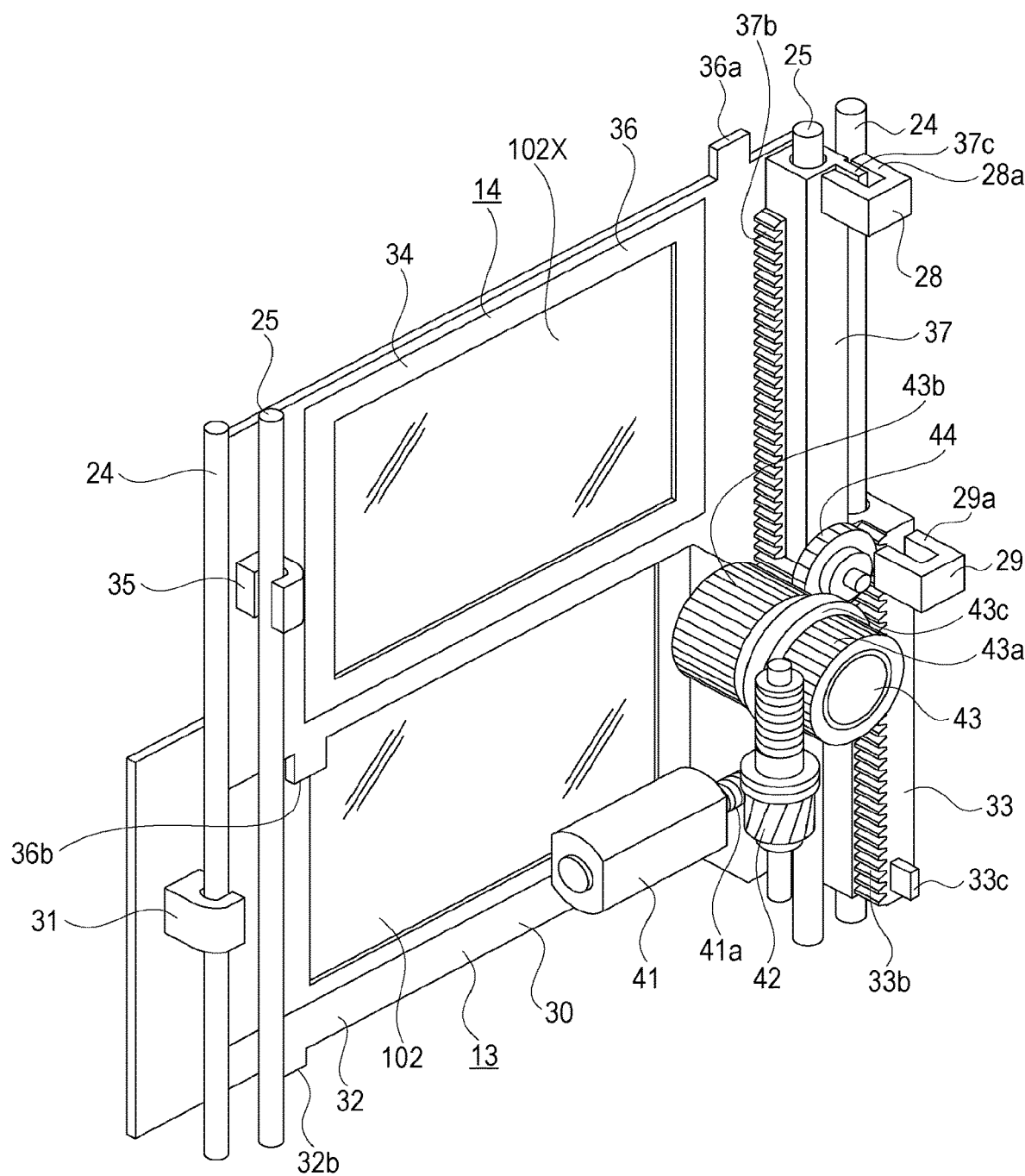
FIG. 25 is a perspective view of the optical block, excluding some of the components.

In the first movable unit 13, one first guide shaft 24 is inserted into the bearing hole 33a, the other first guide shaft 24 is inserted into the bearing 31, and the guided projection 33 and the bearing 31 are guided by the first guide shafts 24 and 24, respectively, so that the first movable unit 13 can be moved in the vertical direction with respect to the rear base 12 (see FIG. 25).

Also, in the second movable unit 14, one second guide shaft 25 is inserted into the bearing hole 37a, the other second guide shaft 25 is inserted into the bearing 35, and the guided projection 37 and the bearing 35 are guided by the second guide shafts 25 and 25, respectively, so that the second movable unit 14 can be moved in the vertical direction with respect to the rear base 12.

In the first movable unit 13 at this stage, the filter holding portion 30 is located on the front side of the filter holding portion 34 of the second movable unit 14, and the guided projection 33 and the bearing 31 are located on the outer side of the guided projection 37 and the bearing 35 of the second movable unit 14 in the transverse direction. Accordingly, the first movable unit 13 and the second movable unit 14 do not interfere with each other, and can be movable independently of each other in the vertical direction with respect to the rear base 12.

In a state where the first movable unit 13 and the second movable unit 14 are movable in the vertical direction with respect to the rear base 12, the joining frame portion 18 of the front base 11 and the outer frame portion 23 of the rear base 12 are brought into contact with each other in the forward/rearward direction and are joined, and the first movable unit 13 and the second movable unit 14 are made movable in the vertical direction between the front base 11 and the rear base 12 (see FIG. 23).

The device unit 15 includes the imaging device unit 104, and has a holding frame 38 formed in a rectangular frame-like shape and an imaging device 39 held by the holding frame 38 (see FIGS. 21 and 22).

The drive mechanism 16 is formed with the respective necessary components attached to or supported by a case member 40, and includes a drive motor 41, a worm gear 42, a drive gear 43, and a reversing gear 44 (see FIGS. 22 and 25).

The axial direction of the motor shaft of the drive motor 41 is the transverse direction, and a gear 41a is fixed to the motor shaft. The gear 41a is engaged with the drive gear 43 via the worm gear 42 whose axial direction is the vertical direction.

The drive gear 43 has its axial direction in the forward/rearward direction, and includes a transmission gear portion 43a and a power gear portion 43b that are coaxially arranged. The transmission gear portion 43a and the power gear portion 43b are joined by a joining member 43c, and the transmission gear portion 43a and the power gear portion 43b are rotated integrally and synchronously with the joining member 43c.

The reversing gear 44 is engaged with the power gear portion 43b, and is rotated in a direction opposite to the power gear portion 43b, in conjunction with the rotation of the power gear portion 43b.

In the drive mechanism 16, the case member 41 is attached to the rear surface of the attachment base portion 22 in the rear base 12, the joining member 43c is inserted into the insertion hole 22b, and the reversing gear 44 and the power gear portion 43b are disposed on the front surface side of the attachment base portion 22 (see FIGS. 23 to 25).

The reversing gear 44 is engaged with the rack portion 33b of the first movable unit 13, and the power gear portion 43b is engaged with the rack portion 37b of the second movable unit 14. Accordingly, the first movable unit 13 is moved in the vertical direction as the reversing gear 44 is rotated by the driving force of the drive motor 41, and the second movable unit 14 is moved in the vertical direction as the power gear portion 43b is rotated by the driving force of the drive motor 41.

The upper moving ends of the first movable unit 13 and the second movable unit 14 are located in front of the imaging device 39, and are the light transmission positions at which light entering the variable neutral density filter 102 or the transparent filter 102X via the infrared cut filter 21 can be transmitted.

The lower moving ends of the first movable unit 13 and the second movable unit 14 are retraction positions for retracting downward from the front side of the imaging device 39, and light is not transmitted through the variable neutral density filter 102 or the transparent filter 102X at the retraction positions.

Since the reversing gear 44 and the power gear portion 43b are rotated in opposite directions to each other when the drive motor 41 is driven, the moving direction of the first movable unit 13 and the moving direction of the second movable unit 14 are opposite directions. When the first movable unit 13 is moved upward, the second movable unit 14 is moved downward in synchronization with the first movable unit 13. When the first movable unit 13 is moved downward, the second movable unit 14 is moved upward in synchronization with the first movable unit 13. Also, the first movable unit 13 and the second movable unit 14 are moved in opposite directions in the vertical direction while passing each other in the optical axis direction.

The first movable unit 13 and the second movable unit 14 are moved on the basis of control according to an operation of the transmittance operator 9 as described above.

Figure 26:
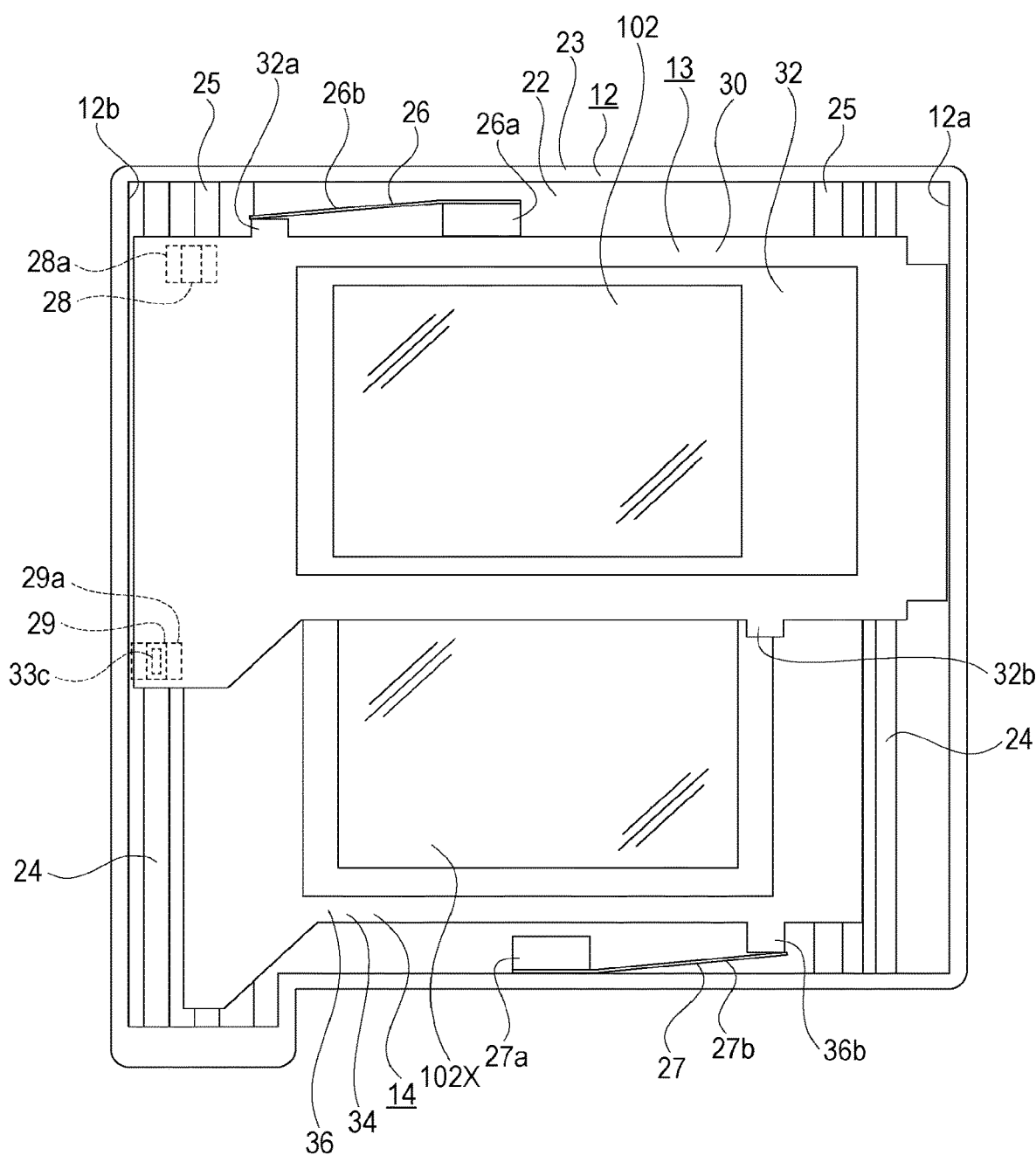
FIG. 26 is a front view of the optical block in a state in which the first movable unit is moved to the light transmission position, and the second movable unit is moved to the retraction position.
Figure 27:
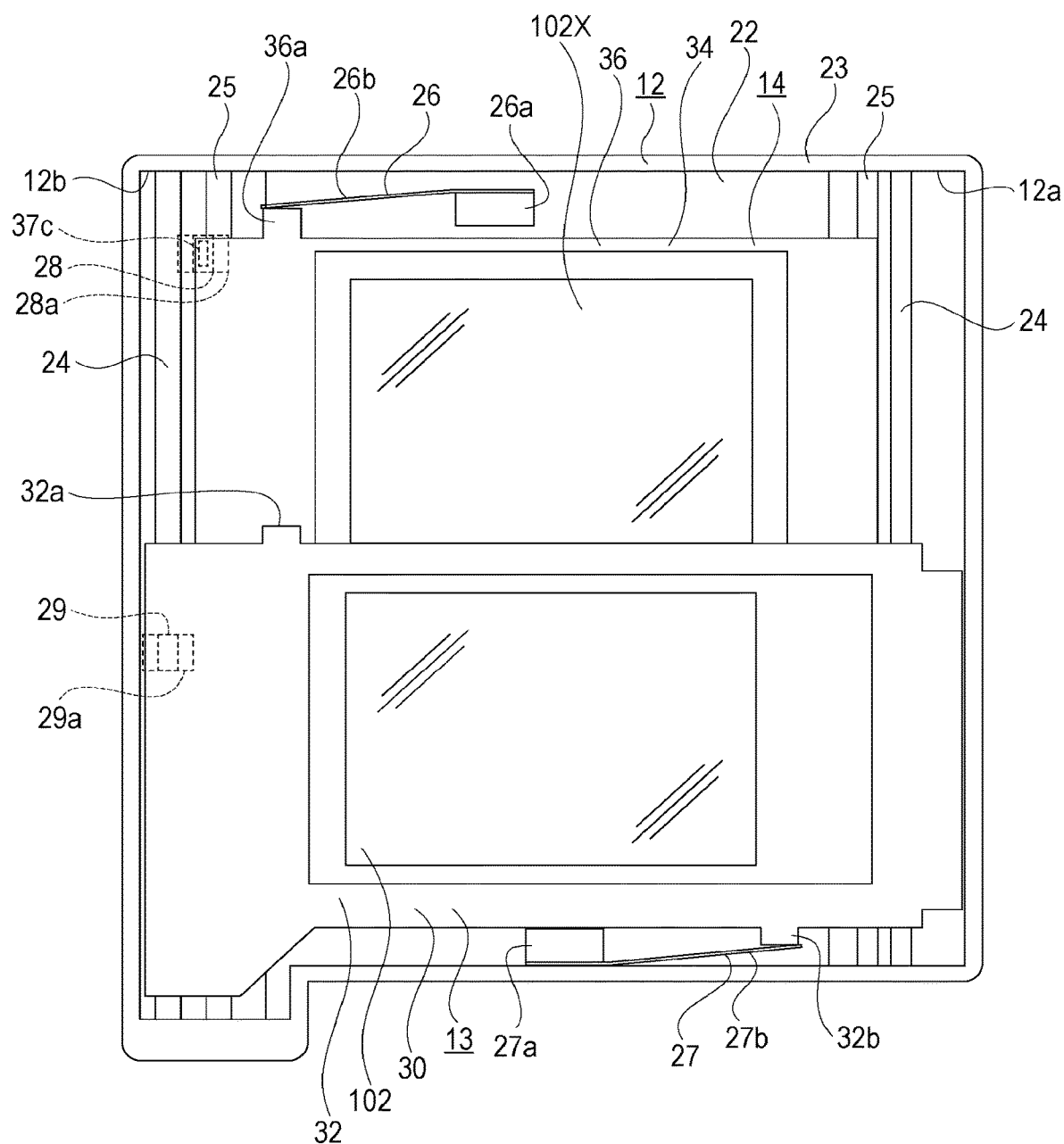
FIG. 27 is a front view of the optical block in a state in which the second movable unit is moved to the light transmission position, and the first movable unit is moved to the retraction position.

When the first movable unit 13 is moved upward and the detection target piece 33c is inserted between the pair of protrusions of the detection portion 29a by an operation performed on the transmittance operator 9, the photodetector 29 detects the first movable unit 13 moved to the light transmission position, the driving of the drive motor 41 is stopped, and the first movable unit 13 is held at the light transmission position (see FIG. 26).

When the first movable unit 13 is moved upward to the light transmission position, the driving of the drive motor 41 is stopped. At this point of time, the upper protruding portion 32a is brought into contact with the elastic deformation portion 26b of the first spring 26 from below, and a downward biasing force generated by the first spring 26 is applied to the first movable unit 13. Thus, the gear teeth of the reversing gear 44 are pressed against the rack teeth of the rack portion 33b, and the occurrence of backlash is prevented.

In this case, the second movable unit 14 is moved downward to the retraction position, the lower protruding portion 36b is brought into contact with the elastic deformation portion 27b of the second spring 27 from above, and an upward biasing force generated by the second spring 27 is applied to the second movable unit 14. Thus, the gear teeth of the power gear portion 43b are pressed against the rack teeth of the rack portion 37b, and the occurrence of backlash is prevented.

On the other hand, when the second movable unit 14 is moved upward and the detection target piece 37c is inserted between the pair of protrusions of the detection portion 28a as the transmittance operator 9 is operated again, the photodetector 28 detects the second movable unit 14 moved to the light transmission position, the driving of the drive motor 41 is stopped, and the second movable unit 14 is held at the light transmission position. When the second movable unit 14 is moved upward to the light transmission position, the driving of the drive motor 41 is stopped. At this point of time, the upper protruding portion 36a is brought into contact with the elastic deformation portion 26b of the first spring 26 from below, and a downward biasing force generated by the first spring 26 is applied to the second movable unit 14. Thus, the gear teeth of the power gear portion 43b are pressed against the rack teeth of the rack portion 37b, and the occurrence of backlash is prevented.

In this case, the first movable unit 13 is moved downward to the retraction position, the lower protruding portion 32b is brought into contact with the elastic deformation portion 27b of the second spring 27 from above, and an upward biasing force generated by the second spring 27 is applied to the first movable unit 13. Thus, the gear teeth of the reversing gear 44 are pressed against the rack teeth of the rack portion 33b, and the occurrence of backlash is prevented.

As described above, in a state where the first movable unit 13 and the second movable unit 14 are moved to the light transmission position and the retraction position, backlash between the rack portions 37b and 33b and the reversing gear 44 or the power gear portion 43b is prevented. Accordingly, there are no periods of time during which power is not transmitted from the drive motor 41 to the first movable unit 13 and the second movable unit 14 at the start of movement of the first movable unit 13 and the second movable unit 14 from the light transmission position or the retraction position to the retraction position or the light transmission position. Thus, it is possible to ensure high positional accuracy regarding the movement zones of the first movable unit 13 and the second movable unit 14.

Also, as the occurrence of backlash is prevented by the first spring 26 and the second spring 27, the structure for preventing the occurrence of backlash is simple, and it is possible to ensure high positional accuracy regarding the movement zones of the first movable unit 13 and the second movable unit 14 while ensuring the simplification of the structure of the optical block 10.

As described above, in a state where the first movable unit 13 is moved to the light transmission position (which is an inserted state of the variable neutral density filter 102), the light transmittance changes with a voltage applied to the variable neutral density filter 102, and the quantity of light entering the imaging device 39 is controlled, so that the use of the variable neutral density filter 102 can reduce the quantity of light entering the imaging device 39, without affecting color development.

As the variable neutral density filter 102 is used in this manner, it is possible to reduce the quantity of light entering the imaging device 39, without affecting color development. Accordingly, even if the shutter speed is lowered, for example, overexposure hardly occurs, so-called blown out highlights that are white portions in an image are prevented, and the image quality of the image to be captured can be increased.

Further, the light transmittance in the variable neutral density filter 102 can be set to a desired transmittance by an operation of the rotating member in the transmittance operator 9, and the second movable unit 14 is moved to the light transmission position (that is, the variable neutral density filter 102 is put into a removed state), so that the quantity of light to be transmitted to the imaging device 39 can be maximized with the transparent filter 102X.

Accordingly, the variable neutral density filter 102 and the transparent filter 102X can increase the fluctuation range of the amount of light to be transmitted to the imaging device 39, and it is possible to capture a desired image in accordance with the use and preference of the user. Thus, it is possible to increase the usability of the imaging apparatus 1 while increasing image quality.

Further, the optical block 10 includes the drive mechanism 16 that synchronously moves the first movable unit 13 and the second movable unit 14 in opposite directions, and one of the first movable unit 13 and the second movable unit 14 is moved to the retraction position while the other is moved to the light transmission position.

Accordingly, when the first movable unit 13 is moved to the light transmission position by the drive mechanism 16, the second movable unit 14 is moved to the retraction position. When the second movable unit 14 is moved to the light transmission position by the drive mechanism 16, the first movable unit 13 is moved to the retraction position. As a result, the first movable unit 13 and the second movable unit 14 are moved to the light transmission position or the retraction position by one drive mechanism 14. Thus, the structure of the imaging apparatus 1 is simplified, and both the first movable unit 13 and the second movable unit 14 can be moved to predetermined positions.

Further, both the first movable unit 13 and the second movable unit 14 are moved between the light transmission position and the retraction position, and accordingly, the first movable unit 13 and the second movable unit 14 are moved in the same moving range. Therefore, there is no need to set the moving ranges of the first movable unit 13 and the second movable unit 14 independently of each other, and the moving ranges of the first movable unit 13 and the second movable unit 14 can be minimized. Thus, the imaging apparatus 1 can be made smaller in size.

Furthermore, the first movable unit 13 and the second movable unit 14 are moved toward the light transmission position or the retraction position while passing each other.

Accordingly, the first movable unit 13 and the second movable unit 14 are moved to the light transmission position or the retraction position while moving in proximity to each other. Thus, the movement space of the first movable unit 13 and the movement space of the second movable unit 14 are small, and the size of the imaging apparatus 1 can be reduced further.

Further, in the first movable unit 13, the thickness direction of the variable neutral density filter 102 coincides with the optical axis direction. In the second movable unit 14, the thickness direction of the transparent filter 102X coincides with the optical axis direction. The first movable unit 13 and the second movable unit 14 are moved in a direction orthogonal to the optical axis direction.

Accordingly, the first movable unit 13 and the second movable unit 14 are moved in a direction orthogonal to the optical axis direction, while the thickness directions coincide with the optical axis directions. Thus, the first movable unit 13 and the second movable unit 14 do not need any movement space in the optical axis direction, and the imaging apparatus 1 can be made smaller in size in the optical axis direction.

Referring now to FIGS. 28 and 29, the timing to control insertion/removal of the variable neutral density filter 102 by driving the first movable unit 13 is described.

FIG. 28 is a timing chart in a case where the variable neutral density filter 102 is moved from the removal position to the insertion position. FIG. 29 is a timing chart in a case where the variable neutral density filter 102 is moved from the insertion position to the removal position.

Each chart shows a switching instruction from the filter control unit 110, the rotation state of the drive motor 41 in the insertion/removal drive unit 115, the power supply state in the insertion/removal detection unit 116 for the photodetectors 28 and 29, the detection output of the photodetector 28, and the detection output of the photodetector 29.

An operation at a time of insertion of the variable neutral density filter 102 is described with reference to FIG. 28.

At time t0, a filter insertion switch instruction is issued. At this point of time, power supply to the photodetectors 28 and 29 is started. Note that, when insertion/removal is not being performed, the power supply to the photodetectors 28 and 29 is turned off to reduce unnecessary power consumption.

As the power supply is started at time t0, the photodetectors 28 and 29 output detection signals corresponding to the state at that time. At this point of time, the variable neutral density filter 102 (the first movable unit 13) is at the removal position, and accordingly, the output of the photodetector 28 is at the high level in an open state (a state where there are no objects that shield the photointerrupter from light). Meanwhile, the output of the photodetector 29 is at the low level in a shielded state (a state where there is an object that shields the photointerrupter from light).

Note that the drive motor 41 is in a standby state (shown as "SB").

A period between time t0 and time t1 is regarded as a position check time. The removal control unit 117 checks the positional state of the first movable unit 13 with the detection signals from the photodetectors 28 and 29.

When the removal control unit 117 confirms that the first movable unit 13 is at the removal position through the check, the removal control unit 117 causes the drive motor 41 to perform counterclockwise rotation (shown as "CCW") from time t1.

Movement of the first movable unit 13 to the insertion position is started at time t1 by the counterclockwise rotation of the drive motor 41. After that, at time t2, the first movable unit 13 moves upward, and the photodetector 29 is no longer shielded from light. As a result, the output switches to the high level.

After that, the first movable unit 13 moves upward, and reaches the position at which the photodetector 28 is shielded from light at time t3. As a result, the output of the photodetector 28 switches to the low level.

When the output of the photodetector 28 switches to the low level at time t3, the insertion/removal control unit 117 performs brake control on the drive motor 41. In practice, due to a control delay time, it is time t4 when the counterclockwise rotation of the drive motor 41 stops, and the drive motor 41 enters a standby state.

The period from time t4 to time t5 is regarded as a position check time after movement. That is, the insertion/removal control unit 117 confirms that the output of the photodetector 28 is at the low level, and the output of the photodetector 29 is at the high level.

After the check, the insertion/removal control unit 117 performs control to turn off the power supply to the photodetectors 28 and 29 at time t6.

Next, an operation at a time of removal of the variable neutral density filter 102 is described with reference to FIG. 29.

At time t10, an instruction to switch from filter insertion to clearance (a removed state) is issued. At this point of time, power supply to the photodetectors 28 and 29 is started.

As the power supply is started, the photodetectors 28 and 29 output detection signals corresponding to the state at that time. At this point of time, the variable neutral density filter 102 (the first movable unit 13) is at the insertion position, and accordingly, the output of the photodetector 28 is at the high level in a shielded state. Meanwhile, the output of the photodetector 29 is at the low level in an open state.

The period between time t10 and time t11 is regarded as a position check time, and the removal control unit 117 confirms the positional state of the first movable unit 13 with detection signals from the photodetectors 28 and 29.

When the removal control unit 117 confirms that the first movable unit 13 is at the insertion position through the check, the removal control unit 117 causes the drive motor 41 to perform clockwise rotation (shown as "CW") from time tn.

Movement of the first movable unit 13 to the removal position is started at time t11 by the clockwise rotation of the drive motor 41. After that, at time t12, the first movable unit 13 moves downward, and the photodetector 28 is no longer shielded from light. As a result, the output switches to the high level.

After that, the first movable unit 13 moves downward, and reaches the position at which the photodetector 29 is shielded from light at time t13. As a result, the output of the photodetector 29 switches to the low level.

When the output of the photodetector 29 switches to the low level at time t13, the insertion/removal control unit 117 performs brake control on the drive motor 41. In practice, due to a control delay time, it is time t14 when the clockwise rotation of the drive motor 41 stops, and the drive motor 41 enters a standby state.

The period from time t14 to time t15 is regarded as a position check time after movement. That is, the insertion/removal control unit 117 confirms that the output of the photodetector 28 is at the high level, and the output of the photodetector 29 is at the low level.

After the check, the insertion/removal control unit 117 performs control to turn off the power supply to the photodetectors 28 and 29 at time t16.

Through the above control, the first movable unit (the variable neutral density filter 102) is inserted and removed. As described above with reference to FIG. 3, when the variable neutral density filter 102 moves from the removal position to the insertion position, the output of the photodetector 28 switches to the low level at the insertion detection position before the insertion position. Also, when the variable neutral density filter 102 moves from the insertion position to the removal position, the output of the photodetector 29 switches to the low level at the removal detection position before the removal position. As a result, safe movement control is performed. Further, through the position check processes before and after movement, accurate movement control is performed.

7. Summary and Modifications

With the above embodiments, the effects described below are achieved.

An imaging apparatus 1 of an embodiment includes: the variable neutral density filter 102 having a variable transmittance; the imaging device unit 104 on which object light via the variable neutral density filter 102 forms an image; the variable transmittance drive unit 108 that changes the transmittance of the variable neutral density filter in accordance with a transmittance control value; the transmittance operator 9 capable of performing a transmittance lowering operation and a transmittance raising operation; the filter insertion/removal unit 130 capable of removing the variable neutral density filter 102 from the incident light path of the object light and inserting the variable neutral density filter 102 into the incident light path; and the filter control unit 110. The filter control unit 110 instructs the filter insertion/removal unit 130 to insert the variable neutral density filter 102 into the incident light path and instructs the variable transmittance drive unit 108 to lower the transmittance of the variable neutral density filter, both on the basis of detection of a transmittance lowering operation of the transmittance operator 9. The filter control unit 110 also instructs the variable transmittance drive unit 108 to raise the transmittance of the variable neutral density filter 102 and instructs the filter insertion/removal unit 130 to remove the variable neutral density filter 102 from the incident light path, both on the basis of detection of a transmittance raising operation of the transmittance operator 9.

The quantity of transmitted light is adjusted by changing the transmittance of the variable neutral density filter 102 and inserting/removing the variable neutral density filter 102, but the operation system for adjusting the quantity of transmitted light (changing the transmittance and performing insertion/removal) is formed only with the transmittance operator 9.

This increases user-friendliness. That is, as the operation system for the amount of transmitted light is completed with one component, troublesomeness is eliminated. Also, as the necessary operating unit is simplified with the single transmittance operator 9, for example, cost reduction is facilitated in terms of the number of components and the number of manufacturing steps.

Although the transmittance operator 9 as a dial having a rotating member has been described as a transmittance operating unit, various forms of operating units can be conceived.

For example, a slider may be used, and the transmittance may be changed by a slider operation. Alternatively, a button or a key may be adopted, and the transmittance may be changed with the number of times the button or the key is pressed. Further, an example in which the operating unit is formed as a touch panel operating unit is also conceivable.

Also, examples in which a dead zone is set for operations have been described in the embodiments, but it is also conceivable that dead zone is not set in some cases. For example, the user may be allowed to choose whether to set or receive a dead zone.

In the embodiments, the filter control unit 110 instructs the filter insertion/removal unit 130 to insert the variable neutral density filter into the incident light path, in response to a transmittance lowering operation at a time when the variable neutral density filter 102 is in a state in which the variable neutral density filter 102 has been removed from the incident light path. The filter control unit 110 also instructs the variable transmittance drive unit 108 to lower the transmittance of the variable neutral density filter 102, in response to a transmittance lowering operation at a time when the variable neutral density filter 102 is in an inserted state in the incident light path.

The filter control unit 110 also instructs the variable transmittance drive unit 108 to raise the transmittance of the variable neutral density filter 102, in response to a transmittance raising operation at a time when the variable neutral density filter 102 is in an inserted state in the incident light path and does not have the maximum transmittance. The filter control unit 110 also instructs the filter insertion/removal unit to remove the variable neutral density filter 102 from the incident light path, in response to a transmittance raising operation at a time when the variable neutral density filter 102 is in an inserted state in the incident light path and has the maximum transmittance (see FIGS. 7, 8, and 9).

As a result, in the case of a transmittance lowering operation, control is performed in a direction from insertion of the variable neutral density filter 102 toward a transmittance decrease in an inserted state.

Meanwhile, in the case of a transmittance raising operation, control is performed in a direction from a transmittance increase in an inserted state of the variable neutral density filter 102 toward removal of the variable neutral density filter.

For example, by a transmittance lowering operation (an operation in the counterclockwise direction, for example) of the transmittance operator 9, the transmittance is lowered in a series of processes from insertion of the variable neutral density filter to a transmittance decrease in an inserted state, and variable control from "1/1" to "1/128" in transmittance is performed in accordance with a series of rotating operations. Also, by a transmittance raising operation (an operation in the clockwise direction, for example) of the transmittance operator 9, the transmittance is raised in a series of processes from a transmittance increase in an inserted state of the variable neutral density filter 102 to removal of the variable neutral density filter after the transmittance becomes the maximum value, and variable control from "1/128" to "1/1" in transmittance is performed in accordance with a series of operations. Accordingly, the user is enabled to designate the transmittance range from the maximum to the minimum by performing continuous operations to change the transmittance and perform insertion/removal, using the same operating unit.

In the examples described in the embodiments, the filter control unit 110 sets a dead zone that invalidates any operation related to a transmittance raising operation at a time when the variable neutral density filter 102 is in an inserted state in the incident light path and has the maximum transmittance, and instructs the filter insertion/removal unit 130 to remove the variable neutral density filter from the incident light path in response to a transmittance raising operation beyond the dead zone (see FIGS. 7, 8, and 9).

By setting a dead zone related to transmittance raising operations, removal of the variable neutral density filter 102 from the incident light path due to an erroneous operation can be avoided as much as possible.

When the variable neutral density filter 102 is removed from the incident light path, a shadow of the variable neutral density filter 102 appears in a captured image, or the sound of a removal operation is included a recorded sound. Also, the quantity of incident light greatly changes. Therefore, it is necessary to insert the variable neutral density filter 102 at a timing intended by the user. In other words, it is desirable to prevent the user from unintentionally performing a removal operation.

Therefore, a dead zone is set, so that the variable neutral density filter 102 will not be removed even if the user unintentionally turns the transmittance operator 9 even by a small amount. In this manner, unnecessary file removal is not easily performed.

As unnecessary removal can be avoided, power consumption loss due to removal can also be avoided.

In the examples described in the embodiments, the filter control unit 110 sets a dead zone that invalidates any operation related to a transmittance lowering operation at a time when the variable neutral density filter 102 is in a state in which the variable neutral density filter 102 has been removed from the incident light path, and instructs the filter insertion/removal unit 130 to insert the variable neutral density filter into the incident light path in response to a transmittance lowering operation beyond the dead zone (see FIGS. 7, 8, and 9).

By setting a dead zone related to transmittance lowering operations, insertion of the variable neutral density filter 102 into the incident light path due to an erroneous operation can be avoided as much as possible.

When the variable neutral density filter 102 is inserted into the incident light path, a shadow of the variable neutral density filter 102 appears in a captured image, or the sound of an insertion operation is included a recorded sound, as in the above described removal of the variable neutral density filter 102. Also, the quantity of incident light greatly changes. In view of this, it is desirable to prevent the user from unintentionally performing an insertion operation. Therefore, a dead zone is set, so that the variable neutral density filter 102 will not be unnecessarily inserted even if the user unintentionally turns the transmittance operator 9 even by a small amount.

As unnecessary insertion can be avoided, power consumption loss due to insertion can also be avoided.

In the examples described in the embodiments, a dead zone is set as the operation amount range of a transmittance raising operation (see steps S1015 and S1016 in FIG. 9). That is, the operation amount range from the cumulative rotation amount of zero to the dead zone threshold Th is set as a dead zone.

Accordingly, when the variable neutral density filter 102 is in an inserted state in the incident light path and has the maximum transmittance, even if the user performs a transmittance raising operation with the transmittance operator 9 by a small amount, the variable neutral density filter 102 is not removed (S1015, S1016). This increases the possibility that inconvenience (such as reflection of a shadow, an operation sound, or an increase in increased power consumption) due to unintentional removal by the user will be avoided.

In the examples described in the embodiments, a dead zone is set as a time for invalidating an operation related to a transmittance raising operation (see steps S1013 and S1014 in FIG. 9). That is, an operation is valid only in a case where the necessary operation is performed before the timer exceeds the time.

For example, when the variable neutral density filter 102 is in an inserted state in the incident light path, and the transmittance has reached the maximum value through a transmittance raising operation, a transmittance raising operation is invalidated unless the necessary operation is performed within the period before the timer exceeds the time. Accordingly, removal of the variable neutral density filter 102 is avoided in a case where a transmittance raising operation is unintentionally performed. That is, removal due to excessive rotation of the transmittance operator 9 unintentionally operated by the user is avoided as much as possible, and inconvenience (such as reflection of a shadow, an operation sound, or an increase in power consumption) due to removal is not easily caused.

Note that, in the examples of the first embodiment shown in FIGS. 7, 8, and 9, for example, a dead zone in the time axis direction is set in steps S1013 and S1014, and a dead zone as an operation amount is set in steps S1015 and S1016. As for a transmittance raising operation, however, an example in which only a dead zone of the operation amount is set is also conceivable.

As for a dead zone depending on time, on the other hand, the condition for invalidating an operation is that a predetermined cumulative rotation amount is not obtained within a predetermined time before the timer exceeds the time. However, a time condition with a different meaning may be set. For example, in a state where the variable neutral density filter 102 has reached the maximum transmittance at the insertion position, operations are invalidated for a predetermined time (two seconds, for example) after the start of a transmittance raising operation.

Also, in the examples of the first embodiment shown in FIGS. 7, 8, and 9, dead zones are set with respect to both a transmittance raising operation and a transmittance lowering operation. However, in some examples, a dead zone in the time axis direction and/or a dead zone of the operation amount may be set only for a transmittance raising operation.

Alternatively, in some other examples, a dead zone in the time axis direction and a dead zone of the operation amount may be set for a transmittance raising operation, and only a dead zone in the time axis direction may be set for a transmittance lowering operation.

Further, in some examples, a dead zone in the time axis direction and a dead zone of the operation amount may be set for a transmittance raising operation, and only a dead zone of the operation amount may be set for a transmittance lowering operation.

Alternatively, in some other examples, one of a dead zone in the time axis direction and a dead zone of the operation amount may be set for a transmittance raising operation, and the other one of the dead zones may be set for a transmittance lowering operation.

In the examples described in the embodiments, a dead zone is set as the operation amount range of a transmittance lowering operation (see steps S1015 and S1016 in FIG. 9).

That is, the operation amount range from the cumulative rotation amount of zero to the dead zone threshold Th is set as a dead zone.

Accordingly, when the variable neutral density filter 102 is in a removed state, the variable neutral density filter 102 is not inserted even if the user performs a transmittance lowering operation by a small amount with the transmittance operator 9. Thus, this increases the possibility that inconvenience (such as reflection of a shadow, an operation sound, or an increase in power consumption) due to filter insertion not intended by the user will be avoided.

In the examples described in the embodiments, a dead zone is set as a time for invalidating an operation related to a transmittance lowering operation (see steps S1013 and S1014 in FIG. 9). That is, an operation is valid only in a case where the necessary operation is performed before the timer exceeds the time.

As a result, when the variable neutral density filter 102 is in a removed state, a transmittance lowering operation within a predetermined time is invalidated. Accordingly, even if the user rotates the transmittance operator 9 by a small amount, immediate insertion of the variable neutral density filter 102 is avoided. That is, insertion of the variable neutral density filter 102 due to the user unintentionally touching the transmittance operator 9 is avoided, and this increases the possibility that inconvenience (such as reflection of a shadow, an operation sound, or an increase in power consumption) due to unintended filter insertion will be avoided.

Note that, in the examples of the first embodiment shown in FIGS. 7, 8, and 9, for example, a dead zone in the time axis direction is set in steps S1013 and S1014, and a dead zone as an operation amount is set in steps S1015 and S1016. As for a transmittance lowering operation, however, an example in which only a dead zone of the operation amount is set is also conceivable.

Also, as for a transmittance lowering operation depending on time, a time condition having a different meaning may be set as a dead zone in the time axis direction. For example, when the variable neutral density filter 102 is at the removal position, any operation is invalidated for a predetermined time (two seconds, for example) after the start of a transmittance lowering operation.

Also, in the examples of the first embodiment shown in FIGS. 7, 8, and 9, dead zones are set with respect to both a transmittance raising operation and a transmittance lowering operation. However, in some examples, a dead zone in the time axis direction and/or a dead zone of the operation amount may be set only for a transmittance lowering operation.

Alternatively, in some other examples, a dead zone in the time axis direction and a dead zone of the operation amount may be set for a transmittance lowering operation, and only a dead zone in the time axis direction may be set for a transmittance raising operation.

Further, in some examples, a dead zone in the time axis direction and a dead zone of the operation amount may be set for a transmittance lowering operation, and only a dead zone of the operation amount may be set for a transmittance raising operation.

Figure 12:
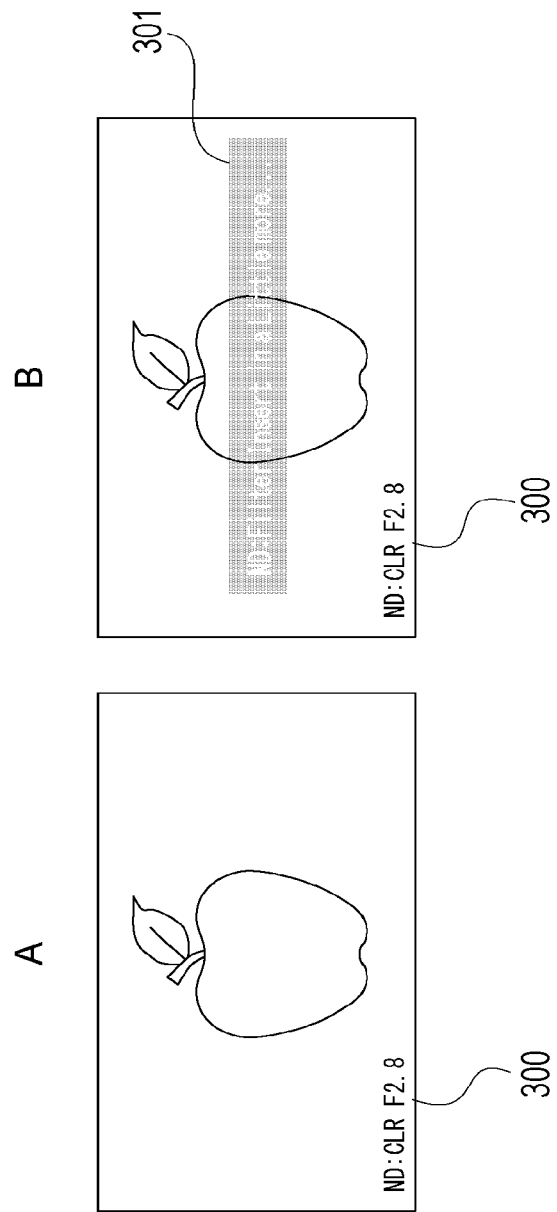
FIG. 12 is diagrams for explaining warning displays according to a third embodiment.

In the example described in the third embodiment, a warning display indicating that the variable neutral density filter 102 will be removed from the incident light path by a transmittance raising operation, or the variable neutral density filter 102 will be inserted into the incident light path by a transmittance lowering operation is performed at a predetermined timing (see FIGS. 12, 13, and 14).

With this arrangement, it is possible to cause the user to stop operating the transmittance operator 9 any further, and prevent unnecessary removal or insertion.

Particularly, when a transmittance raising operation or a transmittance lowering operation is being performed in a dead region, the variable neutral density filter 102 will be removed or inserted if the operation is continued. Therefore, it is appropriate to display a warning at a time of an operation in a dead region.

Note that, instead of a warning display, a warning sound message or a warning sound may be output, or a warning may be issued by vibration or the like. However, if an image is being recorded, sound or vibration might affect the image or sound being recorded, and therefore, a warning by display is most desirable.

In the example described in the second embodiment, the filter control unit 110 sets a dead zone that invalidates any operation related to a transmittance raising operation at a time when the variable neutral density filter 102 is in an inserted state in the incident light path and has the maximum transmittance and/or a transmittance lowering operation at a time when the variable neutral density filter 102 is in a removed state outside the incident light path. The vibration generation unit 201 that applies vibration to the transmittance operator 9 is also included. When an operation is performed in a dead zone, the vibration generation unit 201 generates predetermined vibration (see FIGS. 10 and 11).

A situation in which an operation is being performed in a dead zone is a situation in which the variable neutral density filter 102 will be inserted or removed if the operation is continued. Therefore, the vibration generation unit 201 generates vibration when the transmittance operator 9 is operated, to notify the user that it is an operation leading to insertion/removal. With this arrangement, it is possible to cause the user to determine whether or not insertion/removal is necessary (determine whether or not to continue the operation), and to prevent unnecessary removal or insertion.

Notifying the user through vibration has a high notification effect, because the user recognizes the notification when actually touching the transmittance operator 9. However, it is desirable to design the vibration level and the like so that the vibration will not affect recorded images and sounds.

In the second embodiment, the predetermined vibration is vibration that is generated when a short pulse is applied to the actuator in the vibration generation unit 201 at the natural frequency of the actuator.

With this arrangement, the user can feel a clicking feeling when operating the transmittance operator 9 in a dead region, and recognize that the operation is about to lead to insertion/removal of the variable neutral density filter 102.

Note that some other technique may be used to cause the user to recognize that the current operation is about to lead to insertion/removal of the variable neutral density filter 102. For example, the transmittance operator 9, which is a rotating member, includes a rotating member torque adjustment unit that is capable of adjusting the load torque of the rotating member.

When the transmittance operator 9 is operated in a dead zone, the rotating member torque adjustment unit increases the load torque of the rotating member. With this arrangement, the user feels heavy in the operation, and can recognize that the variable neutral density filter 102 will be inserted or removed if the operation is continued. Particularly, causing the user to feel heavy properly urges the user to perform a careful operation.

In the example described in the fourth embodiment, the filter control unit 110 sets a dead zone that invalidates any operation related to a transmittance raising operation at a time when the variable neutral density filter 102 is in an inserted state in the incident light path and has the maximum transmittance and/or a transmittance lowering operation at a time when the variable neutral density filter 102 is in a removed state outside the incident light path, and also makes the dead zone larger during image recording than that at a time when no recording is being performed (see FIG. 19).

During recording, insertion/removal of the variable neutral density filter 102 causes reflection of a shadow in a recorded image and inclusion of an operation sound in a recorded sound. Therefore, insertion/removal of the variable neutral density filter 102 must be conducted with extra care. Therefore, the dead zone is expanded. As a result, the variable neutral density filter 102 is less likely to be inserted/removed than at a time of non-recording, and the possibility of avoiding insertion/removal not intended by the user is increased. Thus, it is possible to prevent unintended insertion/removal from affecting recorded images and sounds as much as possible.

In the fifth embodiment, the filter control unit 110 does not cause the filter insertion/removal unit 130 to insert the variable neutral density filter 102 into the incident light path or remove the variable neutral density filter 102 from the incident light path, during image recording (see FIG. 20).

If insertion/removal of the variable neutral density filter 102 is conducted during recording, a shadow might be reflected in a recorded image, and an operation sound might be included in a recorded sound. To completely avoid this, neither insertion nor removal of the variable neutral density filter 102 is conducted during recording, regardless of how the transmittance operator 9 is operated. Thus, filter insertion/removal is prevented from affecting recorded images and sounds.

In the operations described in the embodiments, during a process of inserting the variable neutral density filter 102 into the incident light path and a process of removing the variable neutral density filter 102 from the incident light path, the filter insertion/removal unit 130 detects that the variable neutral density filter 102 has reached the detection position before reaching the stop position, and performs a stop operation. That is, during an insertion process and a removal process, the filter position is detected at the detection position before the stop position, and brake control is performed (see FIGS. 3, 28, and 29).

Thus, the variable neutral density filter 102 can stop at the appropriate stop position without colliding with any mechanical end. That is, stable insertion and removal operations are performed.

Note that, although the filter control unit 110 is included in the imaging apparatus 1 in the examples described in the above embodiment, a device configuration separate from the imaging apparatus 1 can be adopted as the filter control unit.

For example, a configuration including the transmittance operator 9 and the filter control unit 110 can be adopted as a remote controller that is capable of designating a transmittance for the imaging apparatus 1.

A program according to an embodiment is a program for causing a CPU, a DSP, or the like, or a device including the CPU, the DSP, or the like, for example, to perform the processes shown in FIGS. 7, 8, and 9, the processes shown in FIGS. 7, 8, and 11, the processes shown in FIGS. 13, 8, and 14, the processes shown in FIGS. 7, 8, and 19, or the processes shown in FIGS. 20, 8, and 9.

That is, the program according to an embodiment is a program for causing an information processing device to perform: a process of instructing the filter insertion/removal unit 130 to insert the variable neutral density filter 102 into the incident light path, and instructing the variable transmittance drive unit 108 to lower the transmittance of the variable neutral density filter 102, both on the basis of detection of a transmittance lowering operation of the transmittance operator 9; and a process of instructing the variable transmittance drive unit 108 to raise the transmittance of the variable neutral density filter 102, and instructing the filter insertion/removal unit 130 to remove the variable neutral density filter 102 from the incident light path, both on the basis of detection of a transmittance raising operation of the transmittance operator 9.

It is assumed that an information processing device such as a microcomputer in the imaging apparatus 1, an information processing device in an operation device (such as a remote controller, for example) independent of the imaging apparatus 1, or the like operates according to such a program.

Such a program can be recorded beforehand in an HDD as a recording medium in a device such as a computer device, a ROM in a microcomputer including a CPU, or the like.

Alternatively, the program can be temporarily or permanently stored (recorded) in a removable recording medium, such as a flexible disk, a compact disc read only memory (CD-ROM), a magnet-optical (MO) disk, a digital versatile disc (DVD), a Blu-ray Disc (registered trademark), a magnetic disk, a semiconductor memory, or a memory card. Such a removable recording medium can be provided as so-called packaged software.

Alternatively, such a program can be installed from a removable recording medium into a personal computer or the like, or can be downloaded from a download site via a network such as a local area network (LAN) or the Internet.

Also, such a program is suitable for providing image processing apparatuses according to the embodiments in a wide range. For example, by downloading the program into a personal computer, a portable information processing device, a mobile telephone, a game device, a video device, a personal digital assistant (PDA), or the like, the personal computer or the like can be made to function as an image processing apparatus of the present disclosure.

Note that the advantageous effects described in this specification are merely examples, and the advantageous effects of the present technology are not limited to them and may include other effects.

Note that the present technology may also be embodied in the configurations described below.

(1)

An imaging apparatus including:

a variable neutral density filter that has a variable transmittance;

an imaging device unit on which object light via the variable neutral density filter forms an image;

a variable transmittance drive unit that changes the transmittance of the variable neutral density filter in accordance with a transmittance control value;

an operating unit that is capable of a transmittance lowering operation and a transmittance raising operation;

a filter insertion/removal unit that is capable of removing the variable neutral density filter from an incident light path of the object light and inserting the variable neutral density filter into the incident light path; and a filter control unit that instructs the filter insertion/removal unit to insert the variable neutral density filter into the incident light path and instructs the variable transmittance drive unit to lower the transmittance of the variable neutral density filter, both on the basis of detection of the transmittance lowering operation of the operating unit, and instructs the variable transmittance drive unit to raise the transmittance of the variable neutral density filter and instructs the filter insertion/removal unit to remove the variable neutral density filter from the incident light path, both on the basis of detection of the transmittance raising operation of the operating unit.

(2)

The imaging apparatus according to (1), in which the filter control unit instructs the filter insertion/removal unit to insert the variable neutral density filter into the incident light path, in response to the transmittance lowering operation at a time when the variable neutral density filter is in a state in which the variable neutral density filter has been removed from the incident light path, instructs the variable transmittance drive unit to lower the transmittance of the variable neutral density filter, in response to the transmittance lowering operation at a time when the variable neutral density filter is in an inserted state in the incident light path, instructs the variable transmittance drive unit to raise the transmittance of the variable neutral density filter, in response to the transmittance raising operation at a time when the variable neutral density filter is in an inserted state in the incident light path and does not have the maximum transmittance, and instructs the filter insertion/removal unit to remove the variable neutral density filter from the incident light path, in response to the transmittance raising operation at a time when the variable neutral density filter is in an inserted state in the incident light path and has the maximum transmittance.

(3)

The imaging apparatus according to (1) or (2), in which the filter control unit sets a dead zone that invalidates an operation related to the transmittance raising operation at a time when the variable neutral density filter is in an inserted state in the incident light path and has the maximum transmittance.

(4)

The imaging apparatus according to any one of (1) to (3), in which the filter control unit sets a dead zone that invalidates an operation related to the transmittance lowering operation at a time when the variable neutral density filter is in a removed state in which the variable neutral density filter has been removed from the incident light path.

(5)

The imaging apparatus according to (3), in which the dead zone is set as an operation amount range of the transmittance raising operation.

(6)

The imaging apparatus according to (3) or (5), in which the dead zone is set as a time to invalidate an operation for the transmittance raising operation.

(7)

The imaging apparatus according to (4), in which the dead zone is set as an operation amount range of the transmittance lowering operation.

(8)

The imaging apparatus according to (4) or (7), in which the dead zone is set as a time to invalidate an operation for the transmittance lowering operation.

(9)

The imaging apparatus according to any one of (1) to (8), in which a warning that the variable neutral density filter will be removed from the incident light path due to the transmittance raising operation, or that the variable neutral density filter will be inserted into the incident light path due to the transmittance lowering operation is displayed at a predetermined timing.

(10)

The imaging apparatus according to any one of (1) to (9), in which the filter control unit sets a dead zone that invalidates an operation for at least one of the transmittance raising operation at a time when the variable neutral density filter is in an inserted state in the incident light path and has the maximum transmittance, or the transmittance lowering operation at a time when the variable neutral density filter is in a state in which the variable neutral density filter has been removed from the incident light path, the imaging apparatus further includes a vibration generator that applies vibration to the operating unit, and the vibration generation unit generates predetermined vibration when an operation is performed in the dead zone.

(11)

The imaging apparatus according to (10), in which the predetermined vibration is vibration that is generated when a short pulse is applied to an actuator in the vibration generation unit at a natural frequency of the actuator.

(12)

The imaging apparatus according to any one of (1) to (11), in which the filter control unit sets a dead zone that invalidates an operation for at least one of the transmittance raising operation at a time when the variable neutral density filter is in an inserted state in the incident light path and has the maximum transmittance, or the transmittance lowering operation at a time when the variable neutral density filter is in a state in which the variable neutral density filter has been removed from the incident light path, and makes the dead zone larger during image recording than the dead zone during a non-recording time.

(13)

The imaging apparatus according to any one of (1) to (11), in which the filter control unit does not cause the filter insertion/removal unit to insert the variable neutral density filter into the incident light path or remove the variable neutral density filter from the incident light path, during image recording.

(14)

The imaging apparatus according to any one of (1) to (13), in which, during a process of inserting the variable neutral density filter into the incident light path and during a process of removing the variable neutral density filter from the incident light path, the filter insertion/removal unit detects that the variable neutral density filter has reached a detection position before reaching a stop position, and performs a stop operation.

(15)

The imaging apparatus according to any one of (1) to (14), further including:

a first movable unit that includes the variable neutral density filter, and is movable between a light transmission position at which light can be transmitted toward an imaging device and a retraction position at which retraction from the imaging device is performed;

a second movable unit that includes a transparent filter, and is movable between the light transmission position and the retraction position; and a drive mechanism that synchronously moves the first movable unit and the second movable unit in opposite directions, in which one of the first movable unit and the second movable unit is moved to the light transmission position, while the other one of the first movable unit and the second movable unit is moved to the retraction position.

(16)

The imaging apparatus according to (15), in which the first movable unit and the second movable unit pass each other, to be moved to the light transmission position or the retraction position.

(17)

The imaging apparatus according to (15) or (16), in which in the first movable unit, a thickness direction of the variable neutral density filter matches an optical axis direction, in the second movable unit, a thickness direction of the transparent filter matches the optical axis direction, and the first movable unit and the second movable unit are moved in a direction orthogonal to the optical axis direction.

(18)

A control device including a filter control unit that instructs a filter insertion/removal unit to insert a variable neutral density filter having a variable transmittance into an incident light path of object light to an imaging device unit, and instructs a variable transmittance drive unit to lower the transmittance of the variable neutral density filter, both on the basis of detection of a transmittance lowering operation of an operating unit, the filter insertion/removal unit being capable of removing the variable neutral density filter from the incident light path and inserting the variable neutral density filter into the incident light path, the variable transmittance drive unit being designed to change the transmittance of the variable neutral density filter in accordance with a transmittance control value, and instructs the variable transmittance drive unit to raise the transmittance of the variable neutral density filter, and instructs the filter insertion/removal unit to remove the variable neutral density filter from the incident light path, both on the basis of detection of a transmittance raising operation of the operating unit.

(19)

A filter control method implemented in an imaging apparatus that includes:

a variable neutral density filter that has a variable transmittance;

an imaging device unit on which object light via the variable neutral density filter forms an image;

a variable transmittance drive unit that changes the transmittance of the variable neutral density filter in accordance with a transmittance control value;

an operating unit that is capable of a transmittance lowering operation and a transmittance raising operation; and a filter insertion/removal unit that is capable of removing the variable neutral density filter from an incident light path of the object light and inserting the variable neutral density filter into the incident light path, the filter control method including:

instructing the filter insertion/removal unit to insert the variable neutral density filter into the incident light path and instructing the variable transmittance drive unit to lower the transmittance of the variable neutral density filter, both on the basis of detection of the transmittance lowering operation of the operating unit; and instructing the variable transmittance drive unit to raise the transmittance of the variable neutral density filter and instructing the filter insertion/removal unit to remove the variable neutral density filter from the incident light path, both on the basis of detection of the transmittance raising operation of the operating unit.

(20)

A program for causing an information processing device to perform:

a process of instructing a filter insertion/removal unit to insert a variable neutral density filter having a variable transmittance into an incident light path of object light to an imaging device unit, and instructing a variable transmittance drive unit to lower the transmittance of the variable neutral density filter, both on the basis of detection of a transmittance lowering operation of an operating unit, the filter insertion/removal unit being capable of removing the variable neutral density filter from the incident light path and inserting the variable neutral density filter into the incident light path, the variable transmittance drive unit being designed to change the transmittance of the variable neutral density filter in accordance with a transmittance control value; and a process of instructing the variable transmittance drive unit to raise the transmittance of the variable neutral density filter, and instructing the filter insertion/removal unit to remove the variable neutral density filter from the incident light path, both on the basis of detection of a transmittance raising operation of the operating unit.

REFERENCE SIGNS LIST

1 Imaging apparatus
2 Housing
3 Main frame unit
4 Panel unit
4a Mount portion
5 Display
5a Display surface
6 Operating unit
7 Grip portion
8 Lens barrel
9 Transmittance operator
10 Optical block
13 First movable unit
14 Second movable unit
15 Device unit
16 Drive mechanism
28 Photodetector
29 Photodetector
101 Operation amount/direction detection unit
102 Variable neutral density filter
102X Transparent filter
103 Diaphragm
104 Imaging device unit
105 AE detection unit
106 AE control unit
107 Diaphragm control unit
108 Variable transmittance drive unit
110 Filter control unit
114 Transmissive sensor
130 Filter insertion/removal unit
115 Insertion/removal drive unit
116 Insertion/removal detection unit
117 Insertion/removal control unit 118 Timer
121 Image signal processing unit
122 Display control unit
123 Recording unit
124 Communication unit
201 Vibration generation unit

The invention claimed is:

1. An imaging apparatus, comprising:
a variable neutral density filter that has a variable transmittance;
an imaging sensor on which object light via the variable neutral density filter forms an image;
a variable transmittance drive circuit that changes the transmittance of the variable neutral density filter in accordance with a transmittance control value;
an operating device, being one of a button, a knob, or a touch panel, and configured to receive instruction of a transmittance lowering operation and a transmittance raising operation;
a filter insertion/removal device including a drive actuator and configured to remove the variable neutral density filter from an incident light path of the object light and insert the variable neutral density filter into the incident light path; and
filter control circuitry configured to instruct the filter insertion/removal device to insert the variable neutral density filter into the incident light path and instruct the variable transmittance drive circuit to lower the transmittance of the variable neutral density filter, both based on detection of the transmittance lowering operation of the operating device, and instruct the variable transmittance drive circuit to raise the transmittance of the variable neutral density filter and instruct the filter insertion/removal device to remove the variable neutral density filter from the incident light path, both based on detection of the transmittance raising operation of the operating device.

2. The imaging apparatus according to claim 1, wherein the filter control circuitry is further configured to:
the filter insertion/removal device to insert the variable neutral density filter into the incident light path, in response to the transmittance lowering operation at a time when the variable neutral density filter is in a state in which the variable neutral density filter has been removed from the incident light path,
instruct the variable transmittance drive circuit to lower the transmittance of the variable neutral density filter, in response to the transmittance lowering operation at a time when the variable neutral density filter is in an inserted state in the incident light path,
instruct the variable transmittance drive circuit to raise the transmittance of the variable neutral density filter, in response to the transmittance raising operation at a time when the variable neutral density filter is in an inserted state in the incident light path and does not have the maximum transmittance, and
instruct the filter insertion/removal device to remove the variable neutral density filter from the incident light path, in response to the transmittance raising operation at a time when the variable neutral density filter is in an inserted state in the incident light path and has the maximum transmittance.

3. The imaging apparatus according to claim 1, wherein the filter control circuitry is further configured to set a dead zone that invalidates an operation related to the transmittance raising operation at a time when the variable neutral density filter is in an inserted state in the incident light path and has the maximum transmittance.

4. The imaging apparatus according to claim 3, wherein the filter control circuitry is further configured to set the dead zone as an operation amount range of the transmittance raising operation.

5. The imaging apparatus according to claim 3, wherein the filter control circuitry is further configured to set the dead zone as a time to invalidate an operation for the transmittance raising operation.

6. The imaging apparatus according to claim 1, wherein the filter control circuitry is further configured to set a dead zone that invalidates an operation related to the transmittance lowering operation at a time when the variable neutral density filter is in a state in which the variable neutral density filter has been removed from the incident light path.

7. The imaging apparatus according to claim 6, wherein the filter control circuitry is further configured to set the dead zone as an operation amount range of the transmittance lowering operation.

8. The imaging apparatus according to claim 6, wherein the filter control circuitry is further configured to set the dead zone as a time to invalidate an operation for the transmittance lowering operation.

9. The imaging apparatus according to claim 1, further comprising processing circuitry configured to cause a display to display, at a redetermined timing, a warning that the variable neutral density filter will be removed from the incident light path due to the transmittance raising operation, or that the variable neutral density filter will be inserted into the incident light path due to the transmittance lowering operation.

10. The imaging apparatus according to claim 1, wherein
the filter control circuitry is further configured to set a dead zone that invalidates an operation for at least one of the transmittance raising operation at a time when the variable neutral density filter is in an inserted state in the incident light path and has the maximum transmittance, or the transmittance lowering operation at a time when the variable neutral density filter is in a state in which the variable neutral density filter has been removed from the incident light path,
the imaging apparatus further comprises a vibration generator that applies vibration to the operating device, and
the vibration generator generates a predetermined vibration when an operation is performed in the dead zone.

11. The imaging apparatus according to claim 10, wherein the predetermined vibration is vibration that is generated when a short pulse is applied to an actuator in the vibration generator at a natural frequency of the actuator.

12. The imaging apparatus according to claim 1, wherein the filter control circuitry is further configured to set a dead zone that invalidates an operation for at least one of the transmittance raising operation at a time when the variable neutral density filter is in an inserted state in the incident light path and has a maximum transmittance, or the transmittance lowering operation at a time when the variable neutral density filter is in a state in which the variable neutral density filter has been removed from the incident light path, and makes the dead zone larger during image recording than the dead zone during a non-recording time.

13. The imaging apparatus according to claim 1, wherein the filter control circuitry is further configured to not cause the filter insertion/removal device to insert the variable neutral density filter into the incident light path or remove the variable neutral density filter from the incident light path, during image recording.

14. The imaging apparatus according to claim 1, wherein, during a process of inserting the variable neutral density filter into the incident light path and during a process of removing the variable neutral density filter from the incident light path, the filter insertion/removal device detects that the variable neutral density filter has reached a detection position before reaching a stop position, and performs a stop operation.

15. The imaging apparatus according to claim 1, further comprising:
- a first movable unit that includes a first holding frame that holds the variable neutral density filter, and is movable between a light transmission position at which light can be transmitted toward an imaging device and a retraction position at which retraction from the imaging device is performed;
- a second movable unit that includes a second holding frame that holds a transparent filter, and is movable between the light transmission position and the retraction position; and
- a drive mechanism that synchronously moves the first movable unit and the second movable unit in opposite directions,
- wherein one of the first movable unit and the second movable unit is moved to the light transmission position, while the other one of the first movable unit and the second movable unit is moved to the retraction position.

16. The imaging apparatus according to claim 15, wherein the first movable unit and the second movable unit pass each other, to be moved to the light transmission position or the retraction position.

17. The imaging apparatus according to claim 15, wherein
in the first movable unit, a thickness direction of the variable neutral density filter matches an optical axis direction,
in the second movable unit, a thickness direction of the transparent filter matches the optical axis direction, and
the first movable unit and the second movable unit are moved in a direction orthogonal to the optical axis direction.

18. A control device comprising:
filter control circuitry configured to
instruct a filter insertion/removal device including a drive actuator to insert a variable neutral density filter having a variable transmittance into an incident light path of object light to an imaging sensor, and instruct a variable transmittance drive circuit to lower the transmittance of the variable neutral density filter, both based on detection of a transmittance lowering operation of an operating device, being one of a button, a knob, or a touch panel, and configured to receive instruction of the filter insertion/removal device, being configured to remove the variable neutral density filter from the incident light path and insert the variable neutral density filter into the incident light path, the variable transmittance drive circuit being configured to change the transmittance of the variable neutral density filter in accordance with a transmittance control value, and
instruct the variable transmittance drive circuit to raise the transmittance of the variable neutral density filter, and instruct the filter insertion/removal device to remove the variable neutral density filter from the incident light path, both based on detection of a transmittance raising operation of the operating device.

19. A filter control method implemented in an imaging apparatus that includes a variable neutral density filter that has a variable transmittance; an imaging sensor on which object light via the variable neutral density filter forms an image; a variable transmittance drive circuit configured to change the transmittance of the variable neutral density filter in accordance with a transmittance control value; an operating device, being one of a button, a knob, or a touch panel, and configured to receive instruction of and configured to perform a transmittance lowering operation and a transmittance raising operation; and a filter insertion/removal device, including a drive actuator, and configured to remove the variable neutral density filter from an incident light path of the object light and insert the variable neutral density filter into the incident light path, the filter control method comprising:
instructing the filter insertion/removal device to insert the variable neutral density filter into the incident light path and instructing the variable transmittance drive circuit to lower the transmittance of the variable neutral density filter, both based on detection of the transmittance lowering operation of the operating device; and
instructing the variable transmittance drive circuit to raise the transmittance of the variable neutral density filter and instructing the filter insertion/removal device to remove the variable neutral density filter from the incident light path, both based on detection of the transmittance raising operation of the operating device.

20. A non-transitory computer-readable medium storing a program that, when executed by processing circuitry, causes the processing circuitry to perform a method, comprising:
instructing a filter insertion/removal device including a drive actuator and configured to insert a variable neutral density filter having a variable transmittance into an incident light path of object light to an imaging sensor, and instructing a variable transmittance drive circuit to lower the transmittance of the variable neutral density filter, both based on detection of a transmittance lowering operation of an operating device, being one of a button, a knob, or a touch panel, and configured to receive instruction of the filter insertion/removal device being configured to remove the variable neutral density filter from the incident light path and insert the variable neutral density filter into the incident light path, the variable transmittance drive circuit being configured to change the transmittance of the variable neutral density filter in accordance with a transmittance control value; and
instructing the variable transmittance drive circuit to raise the transmittance of the variable neutral density filter, and instructing the filter insertion/removal device to remove the variable neutral density filter from the incident light path, both based on detection of a transmittance raising operation of the operating device.

* * * * *